United States Patent [19]
Nozaki et al.

[11] Patent Number: 5,854,448
[45] Date of Patent: Dec. 29, 1998

[54] COORDINATE INPUT DEVICE USED FOR INPUTTING CHARACTERS AND DRAWINGS INTO A PERSONAL COMPUTER/WORD PROCESSOR

[75] Inventors: Kiyohiro Nozaki, Nara; Takao Tagawa, Kashihara, both of Japan

[73] Assignee: Sharp Kabushiki Kaisha, Osaka, Japan

[21] Appl. No.: 629,271

[22] Filed: Apr. 8, 1996

[30] Foreign Application Priority Data

Apr. 12, 1995 [JP] Japan .................................... 7-087184
Mar. 19, 1996 [JP] Japan .................................... 8-063472

[51] Int. Cl.⁶ .............................. G08C 21/00; G09G 5/00
[52] U.S. Cl. .................................... 178/18.01; 178/18.02; 178/18.05; 345/173; 345/174; 345/179
[58] Field of Search .................................. 178/18, 19, 20, 178/18.01, 18.02, 18.03, 18.05, 18.07, 19.01, 19.04, 20.01; 345/173, 174, 175, 179, 180

[56] References Cited

U.S. PATENT DOCUMENTS 4,492,818  1/1985  Abe .......................................... 178/18
5,194,852  3/1993  More et al. ............................... 178/19
5,451,724  9/1995  Nakazawa et al. ....................... 178/19
5,589,857  12/1996 Tanahashi et al. ...................... 345/173

FOREIGN PATENT DOCUMENTS

01187623 A   7/1989  Japan .
04322318 A  11/1992  Japan .
05233129 A   9/1993  Japan .

Primary Examiner—Vijay Shankar
Attorney, Agent, or Firm—David G. Conlin; Brian L. Michaelis

[57] ABSTRACT

A coordinate input device includes (1) a pen switch sensing circuit for providing a power supply to a pen switch in a position sensing pen, and for sensing that the pen switch is turned on and off and (2) a pen switch control circuit for controlling a timing of the power supply. The power supply is provided to the pen switch only when coordinate sensing operations are not affected. The power supply is stopped in order to avoid a voltage change happening to the pen switch when the coordinate sensing operation is affected. Therefore, the pen switch is neither turned on nor turned off during a coordinate sensing period. Consequently, it is possible to avoid a wrong sensing of a coordinate indicated with the position sensing pen.

15 Claims, 45 Drawing Sheets

COORDINATE INPUT DEVICE USED FOR INPUTTING CHARACTERS AND DRAWINGS INTO A PERSONAL COMPUTER/WORD PROCESSOR

FIELD OF THE INVENTION

The present invention relates to a coordinate input device, such as tablets used for inputting characters and drawings into a personal computer and a word processor.

BACKGROUND OF THE INVENTION

A coordinate input device having a liquid crystal display and a tablet has been put to practical use so far as means for inputting hand-written characters and drawings into a computer, a word processor and the like. Through the coordinate input device, an operator can input characters and drawings to be displayed in the liquid crystal display as if using ordinary stationary. There are various types of conventional tablets used for such a purpose, including an electrostatic induction type and an electromagnetic induction type.

The conventional electrostatic induction type tablet, generally, has transparent electrodes of indium oxide or the like on a transparent glass sheet or plastic film, and pulse voltages are applied sequentially to the electrodes. FIG. 33 shows an arrangement example of a tablet of this type.

A coordinate input area 111 of the electrostatic induction type tablet, provided on a liquid crystal display (not shown), is composed of two glass substrates 112 and 113. The glass substrate 112 has transparent electrodes X, or namely, X1, X2, . . . and Xm; the glass substrate 113 has transparent electrodes Y, or namely, Y1, Y2, . . . and Yn. The glass substrates 112 and 113 are provided so that the electrodes X and Y on the respective substrates face each other with small spacing in between.

The transparent electrodes X are connected to a column electrode shift register 114. The transparent electrodes Y are connected to a row electrode shift register 115. The shift registers 114 and 115 are connected to a control circuit 116. The control circuit 116 sends shift data and a clock signal to the shift registers 114 and 115. The column electrode shift register 114 applies pulse voltages shown in FIG. 34 sequentially to the transparent electrodes X. The row electrode shift register 115 applies pulse voltages shown in FIG. 34 sequentially to the transparent electrodes Y.

As a position sensing pen (hereafter, will be referred to simply as a sensing pen) 170 moves close to the surface of the coordinate input area 111, voltages are induced to a sensing electrode of the sensing pen 170 by capacities between the sensing electrode and the transparent electrodes X and between the sensing electrode and the transparent electrodes Y. The voltage induced to the sensing pen 170 is amplified by an amplifier 117 and inputted to an X-coordinate sensing circuit 118 and a Y-coordinate sensing circuit 119.

The X- and Y-coordinate sensing circuits 118 and 119 sense respectively an X-coordinate signal and a Y-coordinate signal in accordance with an output signal of the amplifier 117 and a timing signal of the control circuit 116. The liquid crystal display (not shown) then displays the position indicated with the sensing pen 170 in accordance with the X- and Y-coordinate signals from the electrostatic induction type tablet.

In the conventional example above, high sensing accuracy is not achieved in the periphery of the coordinate input area due to irregular potential thereof. Therefore, a software is used to carry out a correction and thus achieve enough accuracy in the periphery of the coordinate input area.

Alternatively, dummy electrodes $Sx_1$ to $Sx_6$ and $Cy_1$ to $Cy_6$ are provided along the edges of the coordinate input area 111 to compensate for the irregularities in the periphery of the coordinate input area. FIG. 35 shows such an example. The time period during which no ordinary electrode is being scanned will be hereafter referred to as a preparatory scanning period. High accuracy is achieved by using signals obtained only during an X-coordinate sensing period and a Y-coordinate sensing period after such a preparatory scanning period. In other words, high accuracy is achieved by discarding signals obtained during the preparatory scanning period. FIG. 36 is a timing chart showing such X-electrode scanning signals and Y-electrode scanning signals. FIG. 37 shows relation between the coordinate sensing periods and the preparatory scanning periods.

In addition, the electrostatic induction type tablet degrades quality of the liquid crystal display. The transparent electrodes X and Y are visible as grids through the liquid crystal device because the electrodes change reflectance and transmittance of the coordinate input area 111. To eliminate this shortcoming of the electrostatic induction type tablet, a tablet integrated with a display device has been recently put to practical use. FIG. 39 shows such an example.

The display-integrated tablet has electrodes functioning in two ways, as display electrodes of a liquid crystal display and as coordinate sensing electrodes of an electrostatic induction type tablet. Besides, the display-integrated tablet adopts a time sharing method. Namely, each frame period is, as shown in FIG. 40, divided into a display period for displaying an image and coordinate sensing periods for sensing coordinates indicated on the tablet.

The display-integrated tablet has advantages: (1) The display produces a clearer image than the liquid crystal display on which the electrostatic induction type tablet is stacked, because the transparent electrode grids are not visible. (2) Reducing the costs and the size is easy, because the display and the tablet share common components, including the electrodes and the drive circuit.

A display panel 131, as shown in FIG. 39, has pixels of n×m dots in a matrix form. Specifically, the display panel 131 has common electrodes Y, or namely, Y1, Y2, . . . and Yn; and segment electrodes X, or namely, X1, X2, . . . and Xm. The common and segment electrodes Y and X cross each other orthogonally and face each other with a small spacing in between filled with liquid crystal. Pixels are provided at the crossing points of the common and segment electrodes Y and X.

A common drive circuit 132 for driving the common electrodes Y, and a segment drive circuit 133 for driving the segment electrodes X are connected through a switching circuit 134 to a display control circuit 135 and a sensing control circuit 136.

The switching circuit 134 is controlled by a display and sensing switching control signal dsp outputted from a control circuit 137. During a display period, a high-level dsp is outputted so that the switching circuit 134 is switched to the display control circuit 135 and transmits a signal outputted from the display control circuit 135 to the common and segment drive circuits 132 and 133. Likewise, during a coordinate sensing period, a low-level dsp is outputted so that the switching circuit 134 is switched to the sensing control circuit 136 and transmits a signal outputted from the sensing control circuit 136 to the common and segment drive circuits 132 and 133.

FIG. 41 is a timing chart showing scanning signals during the coordinate sensing period of the display-integrated tablet. The coordinate sensing period is divided into an X-coordinate sensing period and a Y-coordinate sensing period. During the X-coordinate sensing period, pulse voltage signals as segment electrode scanning signals $x_1$ to $x_m$ are sequentially applied to the segment electrodes X. During the Y-coordinate sensing period, pulse voltage signals as common electrode scanning signals $y_1$ to $Y_n$ are sequentially applied to the common electrodes Y.

When the pulse voltage signals are applied, voltages are induced to a sensing pen 170 by capacities between the sensing electrode of the sensing pen 170 and the segment electrodes X and between the sensing electrode and the common electrodes Y. The voltage induced to the sensing pen 170 is amplified by an amplifier 138 and inputted to an X-coordinate sensing circuit 140 and a Y-coordinate sensing circuit 141.

The X-coordinate sensing circuit 140 and the Y-coordinate sensing circuit 141 sense respectively an X- and Y-coordinates of the position indicated with the sensing pen 170. More specifically, the coordinate sensing is carried out by measuring the time since the first pulse voltage signal is applied until the induced voltage reaches a maximum value in accordance with an output signal of the amplifier 138 and a timing signal from the control circuit 137.

The common sensing pen 170 is used for the electrostatic induction type tablets shown in FIGS. 33 and 35, and the display-integrated tablet shown in FIG. 39. Referring to FIG. 38, the following description will explain an inside arrangement of the sensing pen 170 and operations of a pen switch 173 of the sensing pen 170.

The sensing pen 170 is, mainly, composed of a pen tip 171, the sensing electrode 172, the pen switch 173 and an impedance converting circuit 174. The pen tip 171 slides in the axial direction of the sensing pen 170. A flag 175 is provided on the inside edge of the pen tip 171. The pen switch 173 is of a photo-coupler type composed of a light emitting element and a phototransistor. The phototransistor side terminal 176 is connected through a resistor R1' to a voltage of +5 volts. The light emitting element side terminal 177 is connected through a resistor R2" to a voltage of +5 volts. The sensing electrode 172 is connected through a signal line 178 to the impedance converting circuit 174.

As mentioned earlier, voltages are induced to the sensing electrode 172 by stray capacities between the sensing electrode 172 and the electrodes X and Y when scanning pulses are applied as the electrode scanning signals to the electrodes X and Y during the coordinate sensing periods. For this purpose, the sensing electrode 172 has a high impedance. The voltage signal induced to the sensing electrode 172 is sent through the impedance converting circuit 174 to the amplifier 117 or 138.

The following description will discuss in detail operations of the sensing pen 170 having the foregoing arrangement.

When the sensing pen 170 is pressed against the coordinate input surface, the pen tip 171 slides inwards, and the flag 175 moves into between the light emitting element and the phototransistor to block the light emitted from the light emitting element. The phototransistor is thus turned off, and the potential of the terminal 176 changes from the ground level to +5 volts. Consequently, the pen switch 173 is turned on, and it is sensed that the sensing pen 170 is pressed against the coordinate input surface.

On the other hand, when the sensing pen 170 is taken off from the coordinate input surface, the pen tip 171 slides outwards, and the flag 175 moves out of between the light emitting element and the phototransistor to allow the light emitted from the light emitting element to reach the phototransistor. Therefore, the phototransistor is turned on, and the potential of the terminal 176 changes from +5 volts to the ground level. Consequently, the pen switch is turned off, and it is sensed that the sensing pen 170 is taken off from the coordinate input surface.

FIG. 42 is an example of the conventional electromagnetic induction type tablet used as the above coordinate input device.

A coordinate input area 151 of the electromagnetic induction type tablet, provided under a liquid crystal display (not shown), is composed of a substrate. The substrate has electrodes X, or namely, X1, X2, . . . and Xm on the front side thereof; and electrodes Y, or namely, Y1, Y2, . . . and Yn on the back side thereof.

Each one of the electrodes X is connected, at one of the ends thereof, to a column electrode analogue switch 154 and at the other end thereof, to the other electrodes X. Any two of the electrodes X (e.g., the electrodes X1 and X2) thus form a loop, which hereafter will be referred to as a scanning electrode loop X. One of the two electrodes forming a scanning electrode loop X (e.g., the electrode X1) is connected through the column electrode analogue switch 154 to a high-frequency power source 160, and the other electrode (e.g., the electrode X2) is grounded.

Similarly, each one of the electrodes Y is connected, at one of the ends thereof, to a row electrode analogue switch 155 and at the other end thereof, to the other electrodes Y. Any two of the electrodes Y (e.g., the electrodes Y1 and Y2) thus form a loop, which hereafter will be referred to as a scanning electrode loop Y. One of the two electrodes forming a scanning electrode loop Y (e.g., the electrode Y1) is connected through the row electrode analogue switch 155 to the high-frequency power source 160, and the other electrode (e.g., the electrode Y2) is grounded.

A control circuit 156 sends a shift clock signal and a latch clock signal to a shift register 163. Column and row electrode decoders 162 and 161 then scan each electrode by sending selecting signals to the analogue switches 154 and 155 in accordance with the shift clock and latch clock signals.

As mentioned earlier, the analogue switches 154 and 155 are connected to the ground and the high-frequency power source 160. The analogue switches 154 and 155 select respectively two of the electrodes X1, X2, . . . and Xm; and two of the electrodes Y1, Y2, . . . and Yn sequentially either in these orders or in the reverse orders. The selected scanning electrode loops X and Y receive high-frequency signals and thus generate AC magnetic fields. The column and row electrodes X and Y are thus scanned through the magnetic fields.

As a sensing pen 180 moves close to the coordinate input area 151, a voltage is induced to a sensing coil 182 (see FIG. 45) of the sensing pen 180 by the AC magnetic fields generated along the scanning electrode loops X and Y. The voltage induced to the sensing pen 180 is amplified by an amplifier 157 and inputted to an X-coordinate sensing circuit 158 and a Y-coordinate sensing circuit 159. The X- and Y-coordinate sensing circuits 158 and 159 sense respectively an X-coordinate signal and a Y-coordinate signal in accordance with an output signal of the amplifier 157. The liquid crystal display (not shown) then displays the position indicated with the sensing pen 180 in accordance with the coordinate signal from the electromagnetic induction type tablet. The electromagnetic induction type tablet senses the X- and Y-coordinates alternately as shown in FIG. 43.

In the above conventional example shown in FIG. 42, similarly to the electrostatic induction type tablet, high sensing accuracy is not achieved in the periphery of the coordinate input area due to irregular magnetic fields thereof. Therefore, a software is used to carry out a correction and thus achieve enough accuracy in the periphery of the coordinate input area.

Alternatively, similarly to the electrostatic induction type tablet, dummy electrodes are provided along the edges of the coordinate input area 151 to compensate for the irregularities in the periphery of the coordinate input area. High accuracy is achieved by using signals obtained only during an X-coordinate sensing period and a Y-coordinate sensing period after a preparatory scanning period. In other words, high accuracy is achieved by discarding signals obtained during the preparatory scanning period. FIG. 44 shows such a relation between the coordinate sensing period and the preparatory scanning period.

Referring to FIG. 45, the following description will discuss the sensing pen 180.

The sensing pen 180 is, mainly, composed of a pen tip 181, the sensing coil 182, a pen switch 183 and an amplifier 184. The pen tip 181 slides in the axial direction of the sensing pen 180. The pen switch 183 is connected to the inside edge of the pen tip 181. The pen switch 183 has a conductive rubber 185 and pen switch terminals 186 and 187. The terminal 186 is connected through a resistor R3' to a voltage of +5 volts. The terminal 187 is grounded. The sensing coil 182 is connected through a signal line 188 to the amplifier 184.

The following description will discuss operations of the sensing pen 180 having the foregoing arrangement in detail.

When the sensing pen 180 is pressed against the liquid crystal panel surface, the pen tip 181 slides inwards, and the conductive rubber 185 touches the terminals 186 and 187. Therefore, the potential of the terminal 186 changes from +5 volts to the ground level. Consequently, the pen switch 183 is tuned on, and it is sensed that sensing pen 180 is pressed against the liquid crystal panel surface.

On the other hand, when the sensing pen 180 is taken off from the liquid crystal panel surface, the pen tip 181 slides outwards, and the conductive rubber 185 comes off from the terminals 186 and 187. Therefore, the potential of the terminal 186 changes from the ground level to +5 volts. Consequently, the pen switch 183 is turned off, and it is sensed that sensing pen 180 is taken off from the liquid crystal panel surface.

In addition to the above coordinate input devices, there is also an electromagnetic induction type tablet which is integrated with a display and has electrodes functioning in two way, as display electrodes of a liquid crystal display and as coordinate sensing electrodes of an electromagnetic induction type tablet. Besides, the display-integrated tablet adopts a time sharing method. Namely, each frame period is divided into a display period for displaying an image and coordinate sensing periods for sensing coordinates indicated on the tablet. The electromagnetic induction type display-integrated tablet adopts the same coordinate sensing period as the electrostatic induction type display-integrated tablet, and adopts the same coordinate sensing method as the electromagnetic induction type tablet. Therefore, any further explanation about the coordinate sensing period and method is omitted.

The above-described conventional coordinate input devices have the following shortcomings. As to the electrostatic induction type tablet and the electrostatic induction type display-integrated tablet, the sensing pen 170 has the pen switch 173 too closely to the sensing electrode 172 and to the signal line 178 connecting the sensing electrode 172 to the impedance converting circuit 174 as shown in FIG. 38. Besides, the signal line 178 has a high impedance.

Therefore, a turning-on and a turning-off of the pen switch 173 cause an abrupt change in the voltage at the terminal 176 of the pen switch 173 and in the voltage of a switch signal line 179 connected to the terminal 176 as shown in the graph A. Since the sensing electrode 172 and the signal line 178 are provided closely to the terminal 176 and the switch signal line 179, such an abrupt voltage change causes an induced voltage to the sensing electrode 172 and the signal line 178 as shown in the graph B.

The pen switch 173 is turned on and off during the coordinate sensing period. Accordingly, the induced voltage shown in the graph B, although being a noise signal to the coordinate sensing signal, is mistakenly processed as the coordinate sensing signal, thereby causing a wrong sensing. For example: the sensed coordinates become discontinuous even if the sensing pen 170 is moved continuously and smoothly on the coordinate input surface.

Moreover, the light emitting element side terminal 177 and a power source line 179' connected to the terminal 177 are provided closely to the sensing electrode 172 and the signal line 178. Consequently, a noise in the power supply of the light emitting element induces a power source noise in the sensing electrode 172 and the signal line 178, thereby affecting the S/N ratio of the coordinate sensing signal. Besides, the light emitting element, constantly provided with a power supply and consuming much electricity, is not adequate for being incorporated in a portable coordinate input device.

As to the electromagnetic induction type tablet and the electromagnetic induction type display-integrated tablet, the sensing pen 180 has the pen switch 183 too closely to the sensing coil 182 and to the signal line 188 connecting the sensing coil 182 to the amplifier 184 as shown in FIG. 45. Consequently, stray capacities are generated among them.

Therefore, a turning-on and a turning-off of the pen switch 183 (i.e., touching/coming-off of the conductive rubber 185 to/from the terminals 186 and 187) cause chattering and an abrupt change in the voltage at the terminal 186 of the pen switch 183 and in the voltage of a switch signal line 189 connected to the terminal 186 as shown in the graph A. Since the sensing coil 182 and the signal line 188 are provided closely to the terminal 186 and the switch signal line 189, such an abrupt voltage change causes an electrostatic noise shown in the graph B and an electromagnetic noise shown in the graph C to the sensing coil 182 and the signal line 188.

The pen switch 183 is turned on and off during the coordinate sensing period. Accordingly, the electrostatic noise and the electromagnetic noise, although being noise signals to the coordinate sensing signal, are mistakenly processed as the coordinate sensing signals, thereby causing a wrong sensing. For example: similarly to the electrostatic induction type tablet, the sensed coordinates become discontinuous even if the sensing pen 180 is moved continuously and smoothly on the coordinate input surface.

SUMMARY OF THE INVENTION

In view of the above problems, a first object of the present invention is to provide a coordinate input device which is free from a wrong sensing of coordinates of the position indicated by a sensing pen regardless of a noise signal caused by a voltage caused by turning-on and -off of a pen switch.

A second object of the present invention is to provide a coordinate input device which improves the S/N ratio of a coordinate sensing signal to a power source noise caused in a power supply line connected to a light emitting element, and uses electricity effectively to save electricity.

In order to accomplish the first object, a coordinate input device in accordance with the present invention has (1) a panel having a coordinate input area, (2) a stylus for indicating a position on the panel, (3) a coordinate sensing circuit for sensing coordinates of the position indicated with the stylus, (4) a switch, which is switched depending on whether the stylus is pressed against the panel, (5) a switch condition sensing circuit for providing the switch with an operational power supply, and for sensing whether the switch is in an 'ON' state or in an 'OFF' state and (6) a control circuit, connected to the switch condition sensing circuit, for controlling a switch sensing period during which the switch condition sensing circuit senses whether the switch is in the 'ON' state or in the 'OFF' state, the switch sensing period being provided separately from a coordinate sensing period during which the coordinate sensing circuit senses the coordinates, wherein the switch condition sensing circuit provides the switch with the operational power supply only during the switch sensing period.

With the arrangement, the coordinate sensing circuit senses the coordinates of the position indicated with the stylus. The switch condition sensing circuit, controlled by the switch control circuit, then provides the switch with the operational power supply only during the switch sensing period. Therefore, if the stylus is pressed against the panel during the switch sensing period, the switch is turned on. When the switch is turned on, there is an abrupt voltage change at a switch terminal and in a signal line connected to the switch. Such a voltage change induces a noise signal to the stylus. On the other hand, if the stylus is taken off from the panel during the switch sensing period, the switch is turned off. When the switch is turned off, another noise signal is induced. However, the switch sensing period is provided separately from the coordinate sensing period. In other words, the coordinate sensing operations are not carried out during the pen switch sensing period. Hence, the above noise signals are not mistakenly processed as coordinate sensing signals.

Meanwhile, during a non-switch sensing period, for example, during the coordinate sensing period, the switch is not provided with the operational power supply. If the stylus is pressed against the panel during the coordinate sensing period, there is no voltage change in the switch. Therefore, no noise signal is induced to the stylus. If the switch is taken off from the panel during the coordinate sensing period, since the operational power supply is not provided to the switch, there is no voltage change in the switch. No noise signal is thus induced to the stylus during the coordinate sensing period.

Accordingly, during the switch sensing period, the turning-on and -off of the switch cause the voltage change which then induces the noise signal to the stylus. However, during the coordinate sensing period, no noise signal occurs. The present invention thus minimizes affection from the noise signals and improves coordinate sensing accuracy, thereby solving a conventional problem of the discontinuous sensed coordinates.

In order to accomplish the second object, the switch of the coordinate input device has (1) a light emitting element, (2) a photo sensor for receiving light emitted by the light emitting element when the stylus is away from the panel and (3) a block for blocking the light emitted by the light emitting element toward the photo sensor when the stylus touches the panel. Besides, the switch condition sensing circuit provides the photo sensor with an operational power supply. Moreover, the coordinate input device has an element power supply circuit for providing the light emitting element with the operational power supply only during the switch sensing period.

With the arrangement, since the element power supply circuit provides the light emitting element with the operational power supply only during the switch sensing period controlled by the switch control circuit, the light emitting element is not provided with the operational power supply during the coordinate sensing period. Therefore, during the coordinate sensing period, no power source noise occurs from the power supply line connected to the light emitting element. Thus, the S/N ratio of sensing signals is improved without affecting the stylus. Besides, since the light emitting element is supplied with the operational power supply only during the switch sensing period, the coordinate sensing device consumes less electricity.

For a fuller understanding of the nature and advantages of the invention, reference should be made to the ensuing detailed description taken in conjunction with the accompanying drawings.

DESCRIPTION OF THE EMBODIMENTS

[FIRST EMBODIMENT]

Referring to FIGS. 1 through 15, the following description will discuss an embodiment of a coordinate input device of an electrostatic induction type in accordance with the present invention.

Figure 1:
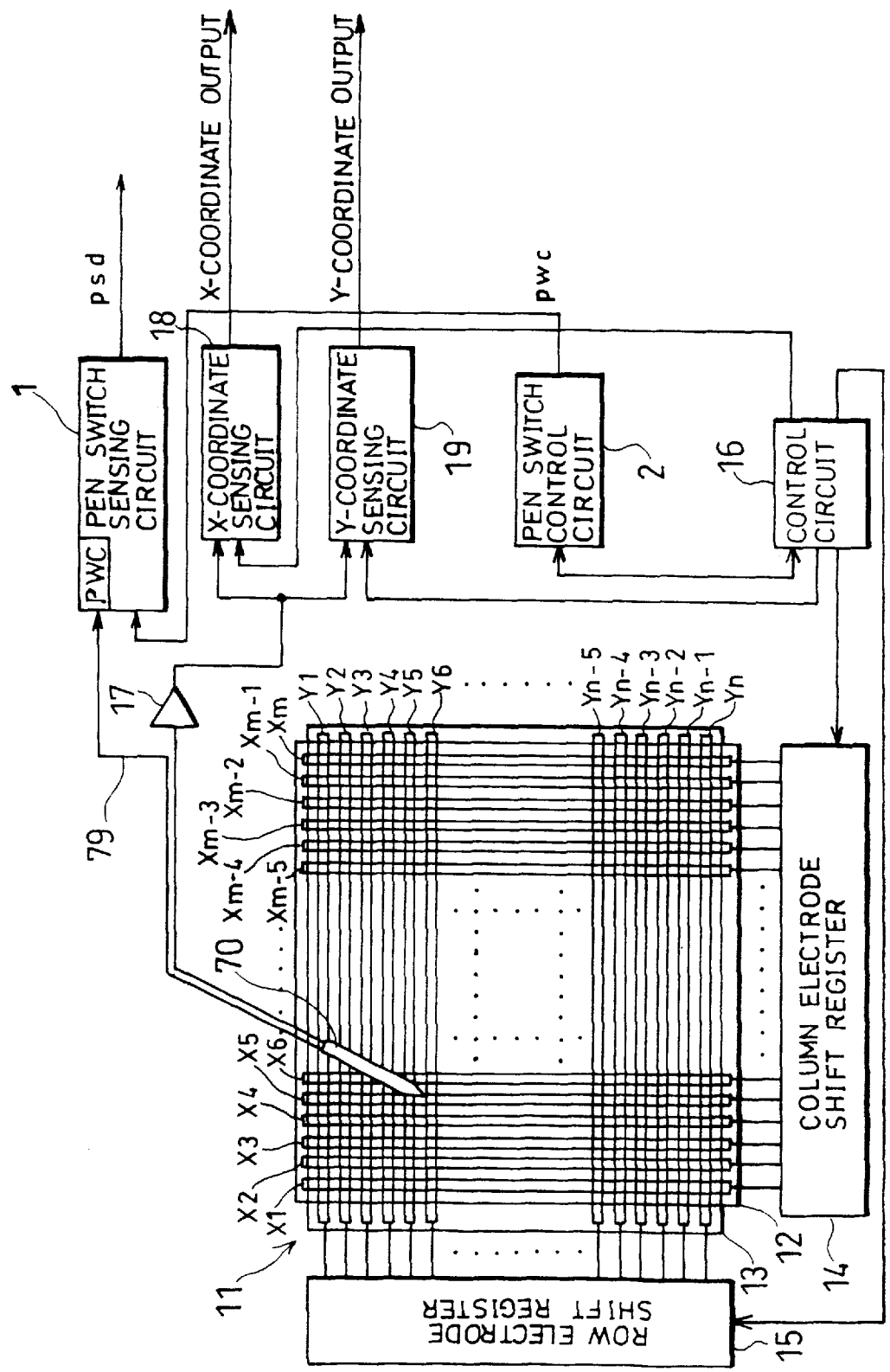
FIG. 1 is a block diagram showing an arrangement of a coordinate input device of an electrostatic induction type of a first embodiment in accordance with the present invention.

The coordinate input device, as shown in FIG. 1, has a coordinate input area (panel) 11 on a liquid crystal display (not shown). The coordinate input area 11 is composed of two glass substrates 12 and 13. The glass substrate 12 has transparent electrodes X, or namely, X1, X2, . . . and Xm; the glass substrate 13 has transparent electrodes Y, or namely, Y1, Y2, . . . and Yn. The glass substrates 12 and 13 are provided so that the electrodes X and Y on the respective substrates face each other with small spacing in between. The electrodes X and Y are provided orthogonal to each other.

The coordinate input device further includes a column electrode shift register 14, a row electrode shift register 15, a control circuit 16, an amplifier 17, an X-coordinate sensing circuit 18, a Y-coordinate sensing circuit 19, a position sensing pen (hereafter, will be referred to simply as a sensing pen) 70, a pen switch sensing circuit 1 and a pen switch control circuit 2.

The transparent electrodes X are connected to the column electrode shift register 14. The transparent electrodes Y are connected to the row electrode shift register 15. The shift registers 14 and 15 are connected to the control circuit 16. The control circuit 16 sends shift data and a clock signal to the shift registers 14 and 15.

Figure 2:
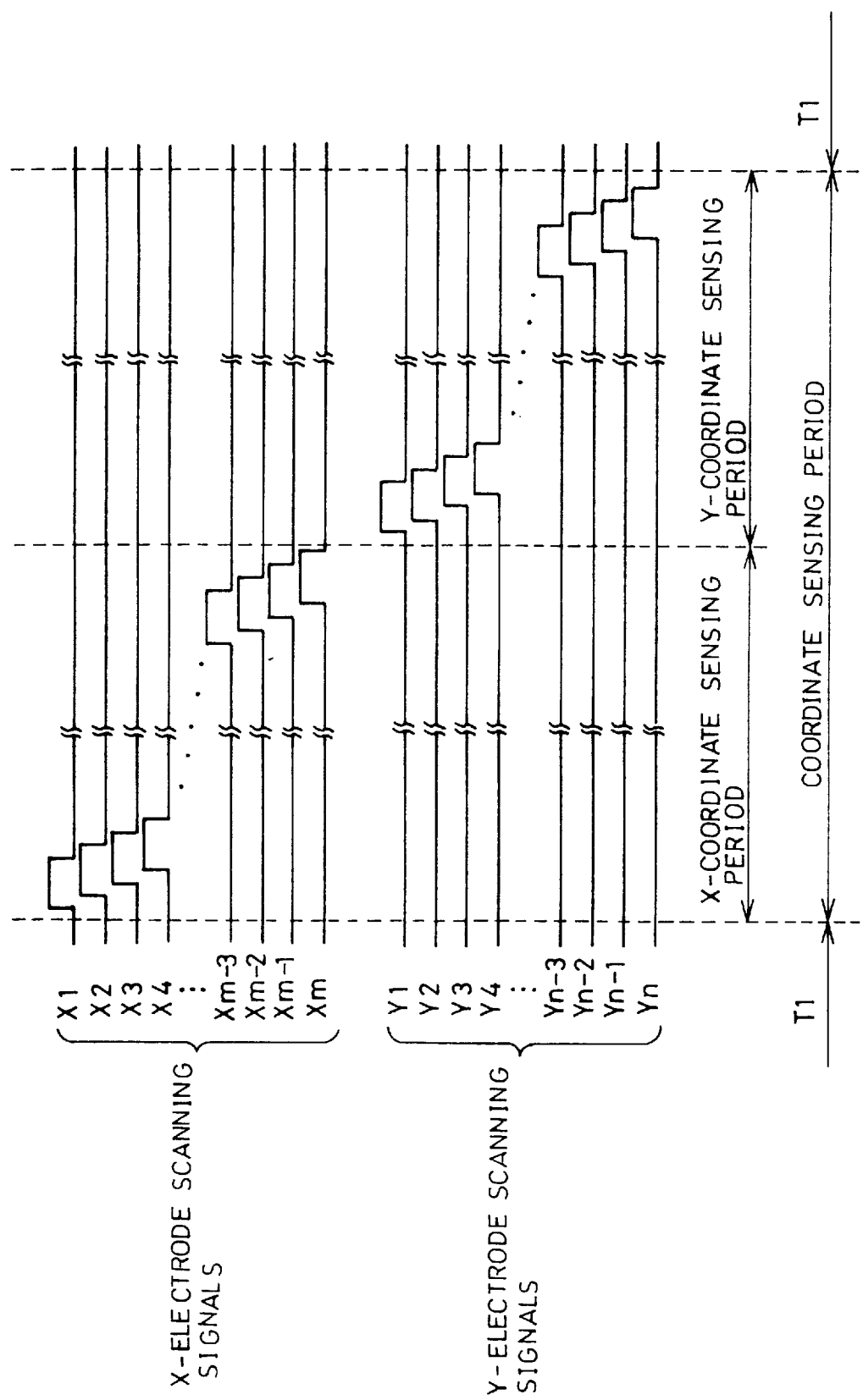
FIG. 2 is a timing chart of electrode scanning signals showing the coordinate input device.
Figure 34:
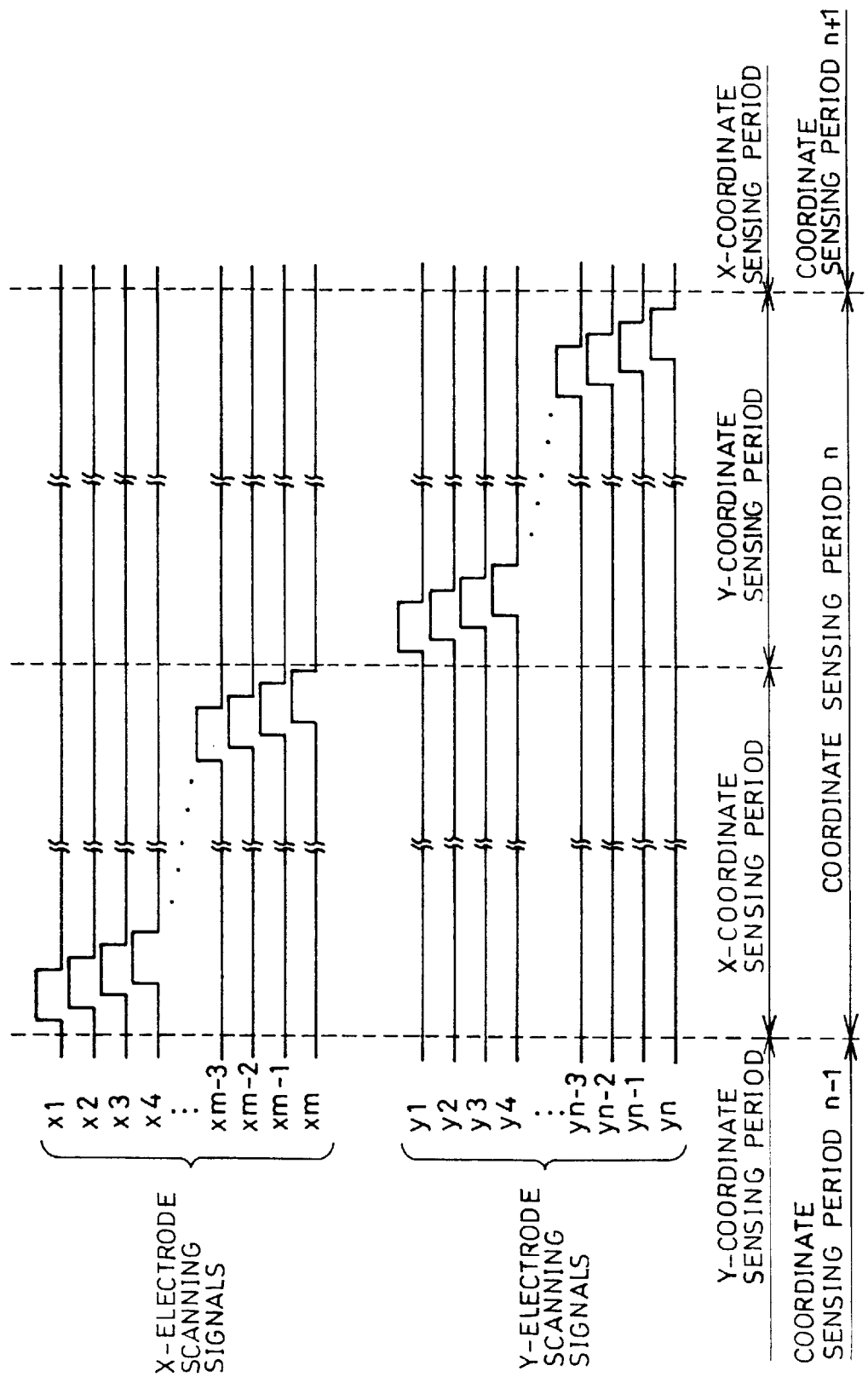
FIG. 34 is a timing chart showing electrode scanning signals of the coordinate input device shown in FIG. 33.

The column electrode shift register 14 applies pulse voltages shown in FIG. 2, which sequentially shift in respect of time, to each of the transparent electrodes X during an X-coordinate sensing period. Similarly, the row electrode shift register 15 applies pulse voltages shown in FIG. 2, which sequentially shift in respect of time, to each of the transparent electrodes Y during a Y-coordinate sensing period. The scanning pulse signals of the present embodiment shown in FIG. 2 is of the same type as the scanning pulse signals of the conventional example shown in FIG. 34. However, a pen switch sensing period T1 follows the coordinate sensing periods of the present embodiment. The pen switch sensing period T1 will be discussed later in detail.

As shown in FIG. 1, the sensing pen (indicating means) 70 such as a stylus is connected to the amplifier 17 and to a terminal PWC of the pen switch sensing circuit 1 through a switch signal line 79. The amplifier 17 is connected to the X- and Y-coordinate sensing circuits 18 and 19. The pen switch control circuit (switch control means) 2, connected to the other input terminal (i.e., the non-PWC input terminal) of the pen switch sensing circuit 1, controls the pen switch sensing circuit 1 through a pen switch control signal pwc. The pen switch sensing circuit (switch sensing means) 1 outputs a pen switch signal psd in accordance with the pen switch control signal pwc and a voltage signal from a pen switch 73 (see FIG. 5) in the sensing pen 70. The pen switch 73 will be discussed later in detail. The control circuit 16 is connected to and controls the X- and Y-coordinate sensing circuits 18 and 19, and the pen switch control circuit 2.

With the above arrangement, as the sensing pen 70 touches or comes close to the surface of the coordinate input area 11, voltages are induced to a sensing electrode 72 (see FIG. 5) of the sensing pen 70 by capacities between the sensing electrode 72 and the transparent electrodes X and between the sensing electrode 72 and the transparent electrodes Y. The voltage induced to the sensing pen 70 is amplified by the amplifier 17 and inputted to the X- and Y-coordinate sensing circuits 18 and 19.

The X- and Y-coordinate sensing circuits (coordinate sensing means) 18 and 19 sense respectively an X-coordinate signal and a Y-coordinate signal in accordance with an output signal of the amplifier 17 and a timing signal from the control circuit 16. The liquid crystal display (not shown) then displays the position indicated with the sensing pen 70 in accordance with the X- and Y-coordinate sensing signals.

Figure 4:
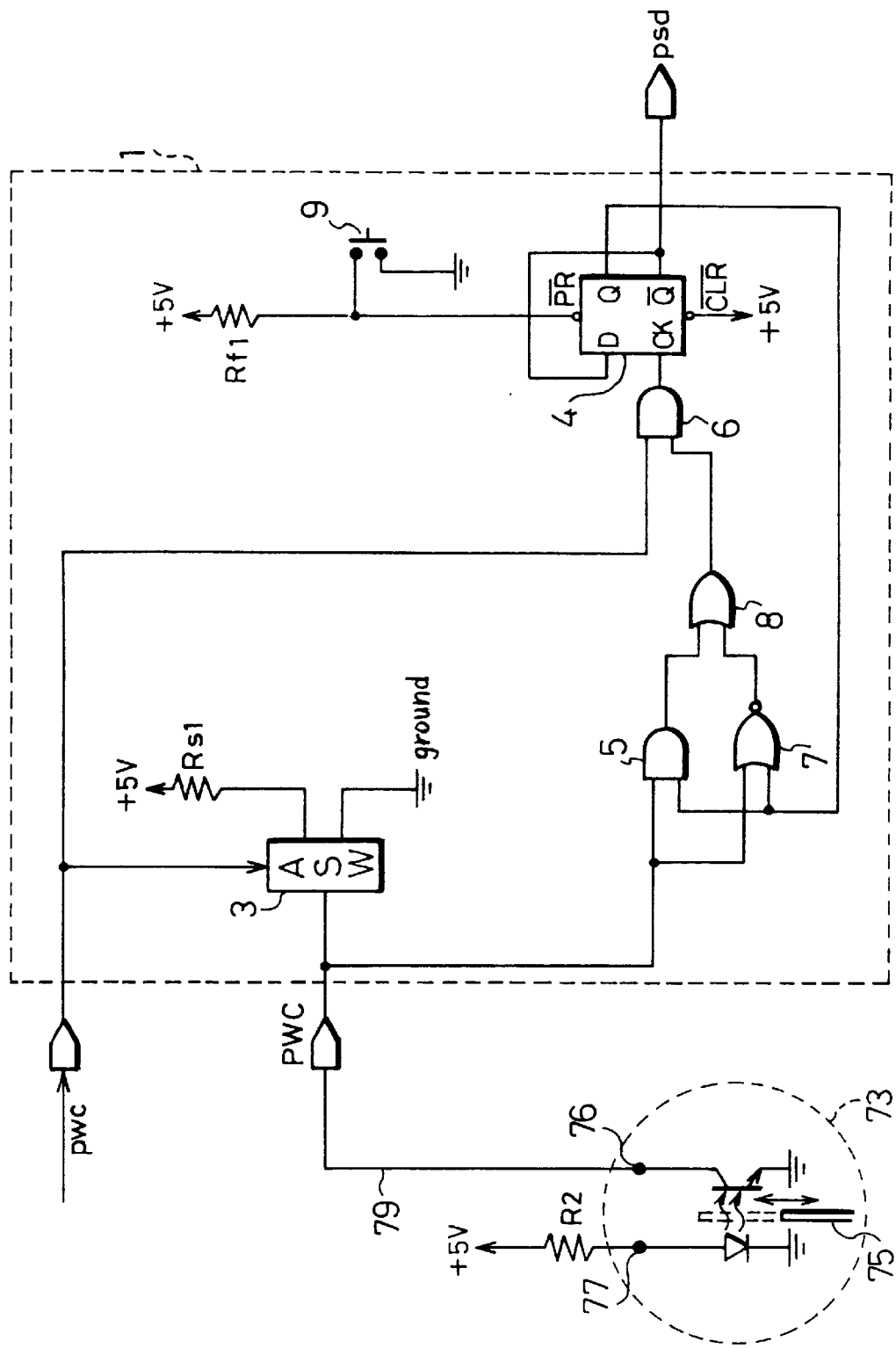
FIG. 4 is a circuit diagram showing an arrangement of a pen switch sensing circuit.
Figure 5:
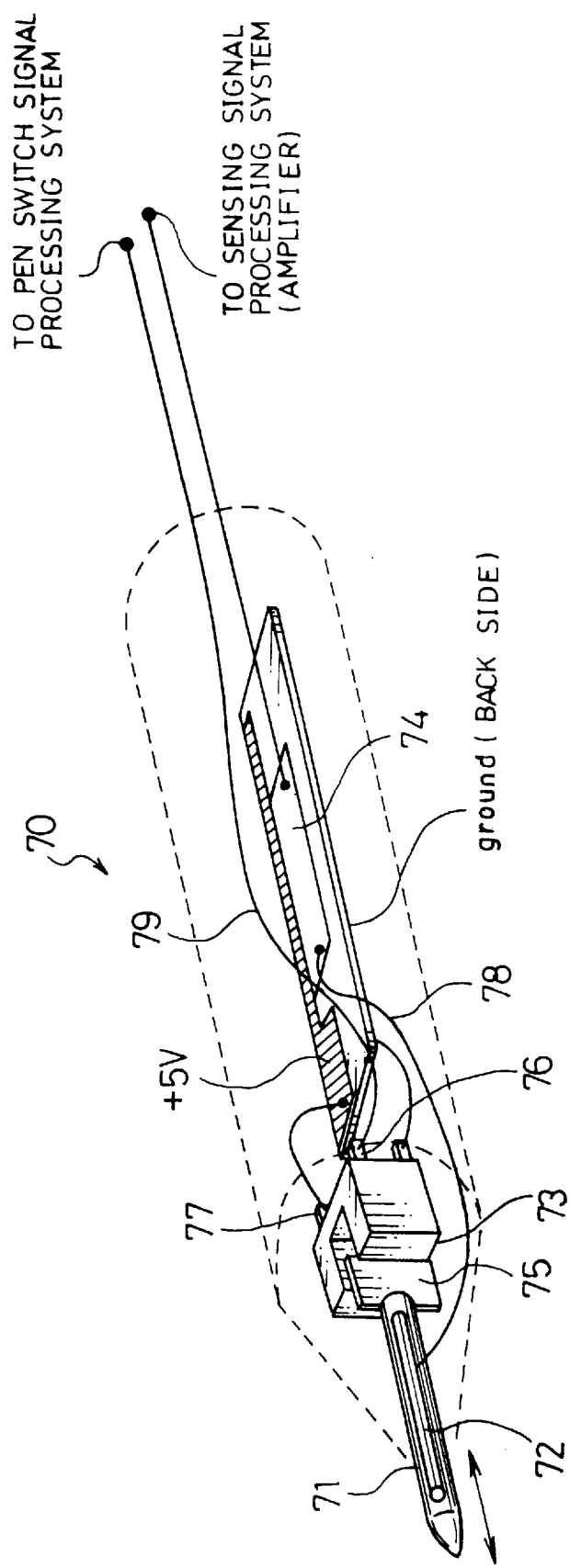
FIG. 5 is a schematic view showing an inside arrangement of a sensing pen.

Referring to FIGS. 4 and 5, the following description will discuss an inside arrangement of the sensing pen 70.

As shown in FIG. 5, the sensing pen 70 is, mainly, composed of a pen tip 71, the sensing electrode 72, the pen switch 73 and an impedance converting circuit 74. p The pen tip 71 slides in the axial direction of the sensing pen 70. A flag (blocking means) 75 is provided on a back edge of the pen tip 71 inside the sensing pen 70. The pen switch (switch means) 73 is of a photocoupler type composed of a light emitting element (a light emitting element) and a phototransistor (a photo sensor) as shown in FIG. 4. A pen switch terminal 76 on the phototransistor side is connected through the switch signal line 79 to the terminal PWC input terminal of the pen switch sensing circuit 1. A pen switch terminal 77 on the light emitting element side is connected through a resistor R2 to a voltage of +5 volts.

As shown in FIG. 5, the sensing electrode 72 is a point electrode provided in the pen tip 71. The sensing electrode 72 is connected through a signal line 78 to the impedance converting circuit 74 which is connected to the amplifier 17. As mentioned earlier, voltages are induced to the sensing electrode 72 by capacities between the sensing electrode 72 and the electrodes X and Y if the scanning pulse signals are applied to the transparent electrodes X and Y during the coordinate sensing periods. For this purpose, the sensing electrode 72 has a high impedance. The voltage signal induced to the sensing electrode 72 is sent through the impedance converting circuit 74 to the amplifier 17.

Figure 3:
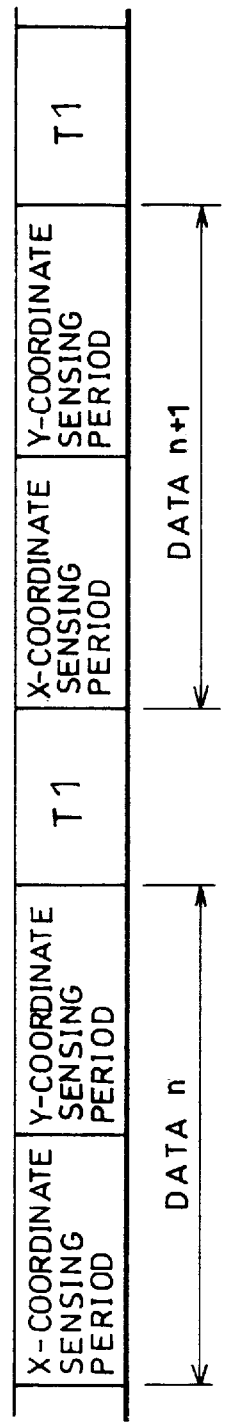
FIG. 3 is an explanatory drawing showing a relation between coordinate sensing periods and pen switch sensing periods.

A feature of the present embodiment is that the pen switch sensing circuit 1 and the pen switch control circuit 2 are provided to carry out the pen switch sensing operations (i.e., the turning-on and -off operations of the pen switch 73) in any desirable period. To be more specific, the pen switch sensing period T1 is provided after the coordinate sensing periods. For example, as shown in FIG. 3, the pen switch sensing period T1 is provided after the X- and Y-coordinates of the data n are detected. The pen switch sensing period T1 is again provided after the X- and Y-coordinates of the data n+1 are detected.

FIG. 4 shows an arrangement of the pen switch sensing circuit 1.

The pen switch sensing circuit 1 is composed of an analogue switch 3, a flip-flop 4, AND circuits 5 and 6, an NAND circuit 7, an OR circuit 8, a reset switch 9, and resistors Rs1 and Rf1.

An input terminal of the analogue switch (selecting means) 3 is connected to the terminal PWC whereas one of the two output terminals is connected to the resistor Rs1, and the other output terminal is grounded. The analogue switch 3 is connected to and controlled by the pen switch control circuit 2 through the pen switch control signal pwc. If the pen switch control signal pwc is in a high level, the terminal PWC is switched to be connected to a voltage of +5 volts through the resistor Rs1. On the other hand, if the pen switch control signal pwc is in a low level, the terminal PWC is switched to be grounded.

The terminal PWC is connected to, besides the analogue switch 3 as mentioned above, one of the two input terminals of the AND circuit 5 and one of the two input terminals of the NAND circuit 7. The other input terminals of the AND circuit 5 and of the NAND circuit 7 are connected to an output terminal Q of the flip-flop 4. An output terminal of the AND circuit 5 and an output terminal of the NAND circuit 7 are connected to respective input terminals of the OR circuit 8.

One of the two input terminals of the AND circuit 6 is connected to an output terminal of the OR circuit 8. The other input terminal of the AND circuit 6, connected to the pen switch control circuit 2, receives the pen switch control signal pwc. An output terminal of the AND circuit 6 is connected to a clock input terminal CK of the flip-flop 4.

A terminal Bar PR of the flip-flop 4 (Bars are denoted by overlines in drawings) is connected to one of the two terminals of the reset switch 9 and to a voltage of +5 volts through the resistor Rf1. The other terminal of the reset switch 9 is grounded. A terminal Bar CLR is connected to a voltage of +5 volts. An output terminal Bar Q is connected to a data input terminal D. The pen switch signal psd is outputted through the output terminal Bar Q. The flip-flop 4 is reset by reducing the voltage applied to the terminal Bar PR to a low level with the reset switch 9. Under a normal operation condition, the terminal Bar PR of the flip-flop 4 is used in a high level. The pen switch sensing circuit 1 may be any logical circuit having the functions mentioned below.

The following description will discuss in detail operations of the pen switch sensing circuit 1 having the foregoing arrangement.

The pen switch control circuit 2, interlocked with the control circuit 16, sends the pen switch control signal pwc to the pen switch sensing circuit 1. During the pen switch sensing period T1, the pen switch control signal pwc is a high-level control signal, which makes the pen switch sensing circuit 1 connect the pen switch terminal 76 to the +5 volt voltage through the resistor Rs1. However, during the non-T1 period, the pen switch control signal pwc is a low-level control signal, which makes the pen switch sensing circuit 1 to ground the pen switch terminal 76.

Figure 6:
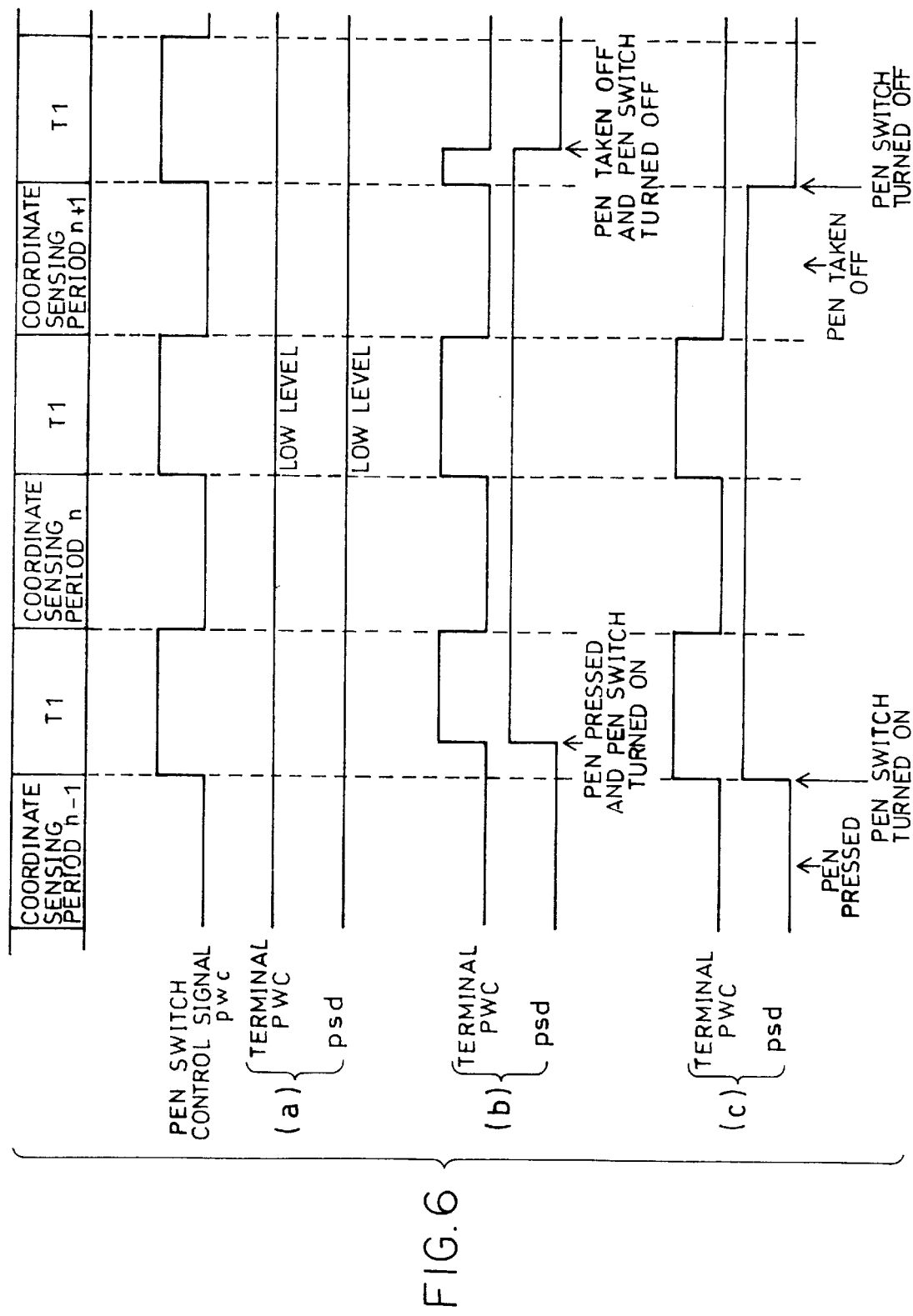
FIG. 6 is a timing chart showing pen switch sensing operations by the pen switch sensing circuit.

The timing chart in FIG. 6 shows the resulting operations of the pen switch sensing circuit 1: (a) Assume that the pen switch 73 is turned off and that the sensing pen 70 is neither pressed against nor taken off from the coordinate input area 11. In this case, the voltage level of the terminal PWC remains low regardless of whether the pen switch control signal pwc is in the low level or in the high level. Consequently, the pen switch signal psd remains in the low level.

(b) Assume that the pen switch 73 is pressed against the coordinate input area 11 during the pen switch sensing period T1. In this case, only if (1) the pen switch control signal pwc is in the high level, (2) the voltage of the terminal PWC rises from the low level to the high level, and (3) the pen switch signal psd is in the low level, the pen switch signal psd rises from the low level to the high level. Therefore, the pen switch 73 is turned on. The pen switch signal psd does not change with other combinations of the high level and the low level.

Next, assume that the pen switch 73 is taken off during the pen switch sensing period T1, In this case, only if (1) the pen switch control signal pwc is in the high level, (2) the voltage of the terminal PWC drops from the high level to the low level, and (3) the pen switch signal psd is in the high level, the pen switch signal psd drops from the high level to the low level. Therefore, the pen switch 73 is thus turned off. The pen switch signal psd does not change with other combinations of the high level and the low level.

(c) Assume that the pen switch 73 is pressed during the coordinate sensing period. In this case, the voltage of the terminal PWC is in the low level until the pen switch control signal pwc rises from the low level to the high level. However, as soon as the pen switch control signal pwc rises from the low level to the high level (i.e., the pen switch sensing period T1 starts), the voltage of the terminal PWC rises from the low level to the high level. Therefore, the pen switch signal psd rises from the low level to the high level. Consequently, the pen switch 73 is turned on. Next, assume that the pen switch 73 is taken off during the coordinate sensing period. In this case, the the pen switch signal psd is in the high level until the coordinate sensing period is over. Even after the pen switch control signal pwc rises from the low level to the high level, the voltage of the terminal PWC is still in the low level during the pen switch sensing period T1. Therefore, the pen switch signal psd drops from the high level to the low level. Consequently, the pen switch 73 is turned off.

With the foregoing arrangement, the following description will discuss in detail the pen switch sensing operations during the pen switch sensing period T1.

The pen switch terminal 76 is connected to the +5 volt voltage during the pen switch sensing period T1. If the sensing pen 70 is pressed against the coordinate input area 11 during the pen switch sensing period T1, the pen tip 71 slides inwards. The flag 75 on the back edge of the pen tip 71 moves into between the light emitting element and the phototransistor to block the light emitted from the light emitting element. The phototransistor thus turns off, and the potential of the pen switch terminal 76 changes from the ground level to +5 volts. Consequently, the pen switch 73 is turned on. The pen switch sensing circuit 1 thus senses through the terminal PWC that the sensing pen 70 is pressed against the surface of the coordinate input area 11, and raises the pen switch signal psd, which is to be outputted to the main body, into the high level.

Figure 38:
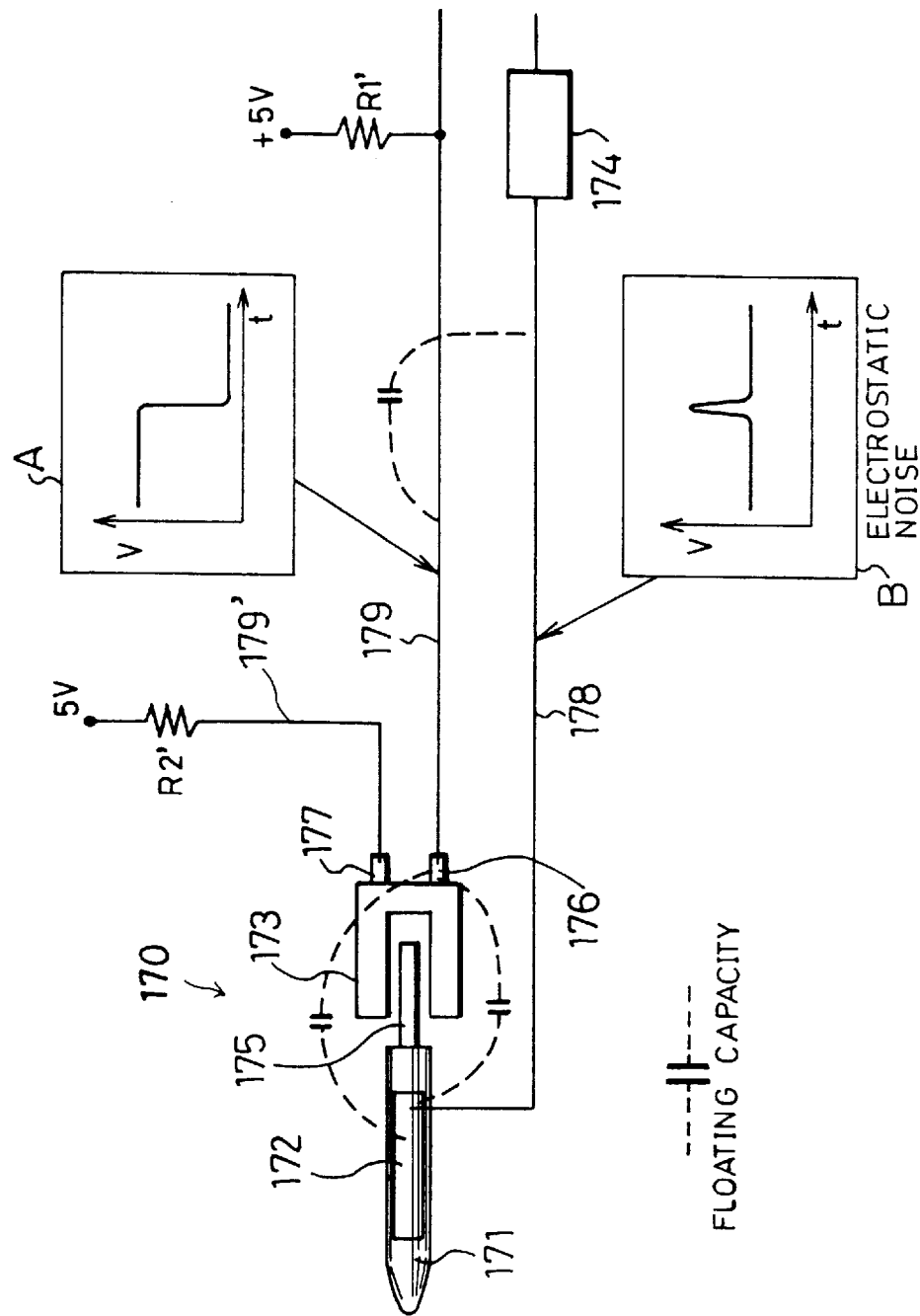
FIG. 38 is an explanatory drawing showing an arrangement of a sensing pen of the coordinate input devices shown in FIGS. 33, 35 and 39.
Figure 39:
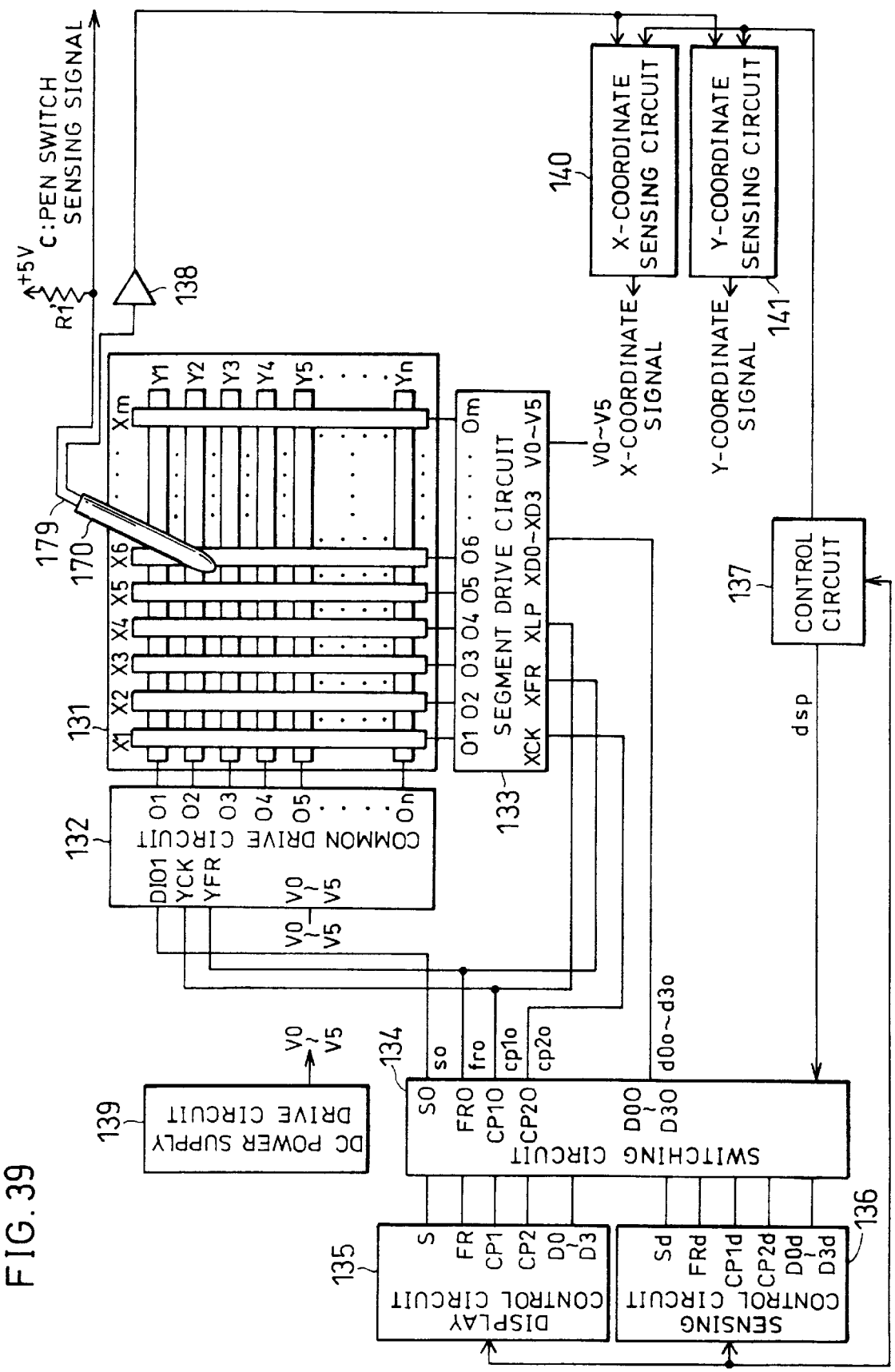
FIG. 39 is a block diagram showing an arrangement of a conventional coordinate input device integrated with a display device.
Figure 40:
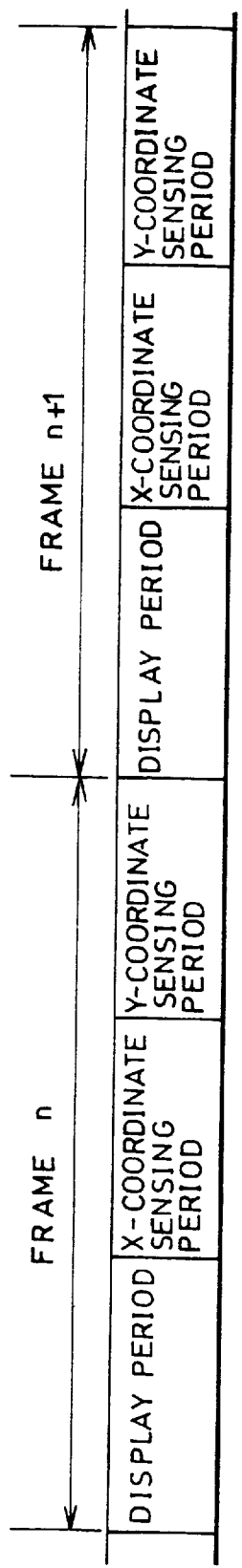
FIG. 40 is an explanatory drawing showing a relation between display periods and coordinate sensing periods of the coordinate input device shown in FIG. 39.
Figure 41:
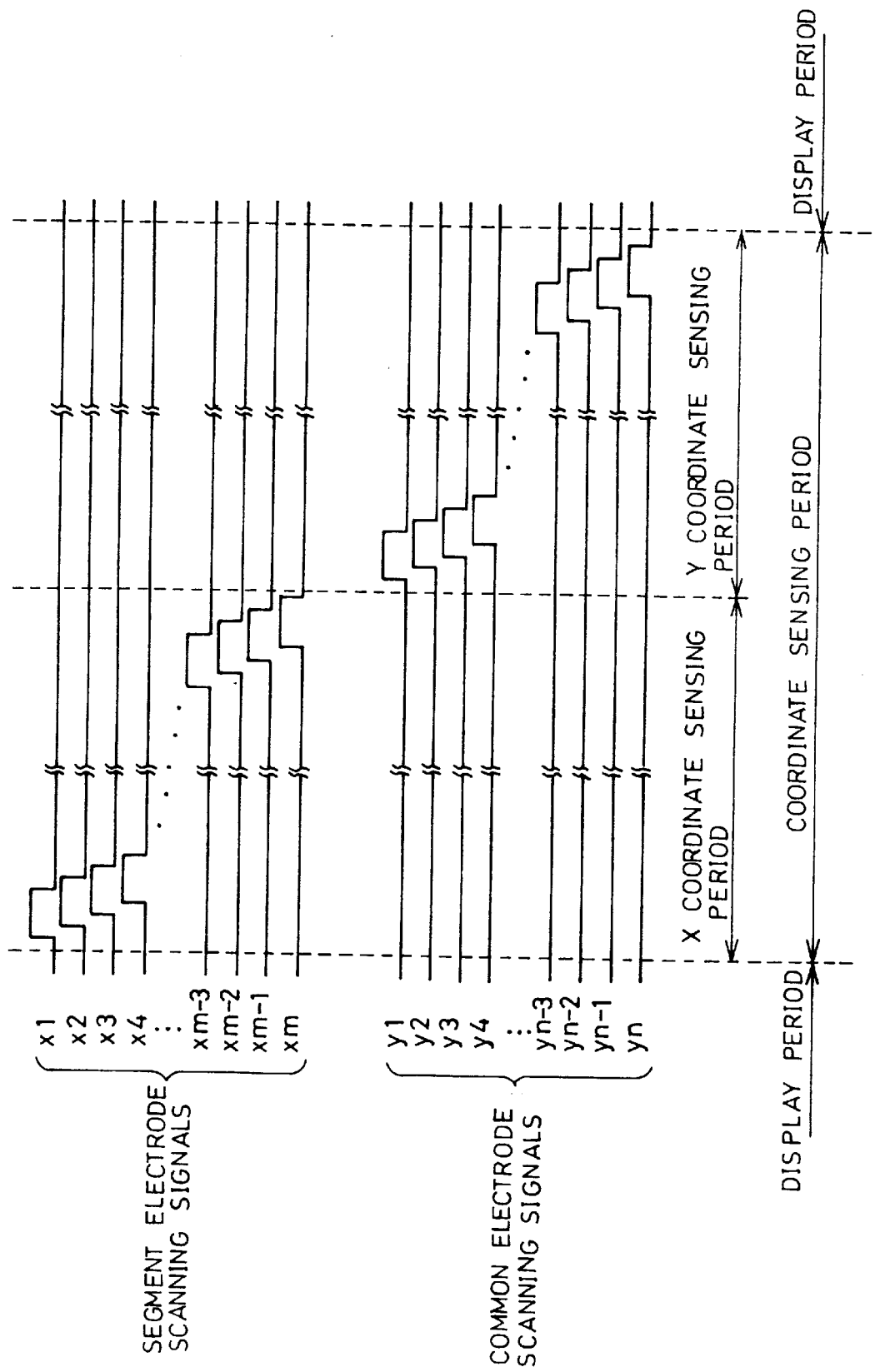
FIG. 41 is a timing chart showing segment electrode scanning signals and common electrode scanning signals of the coordinate input device shown in FIG. 39.
Figure 42:
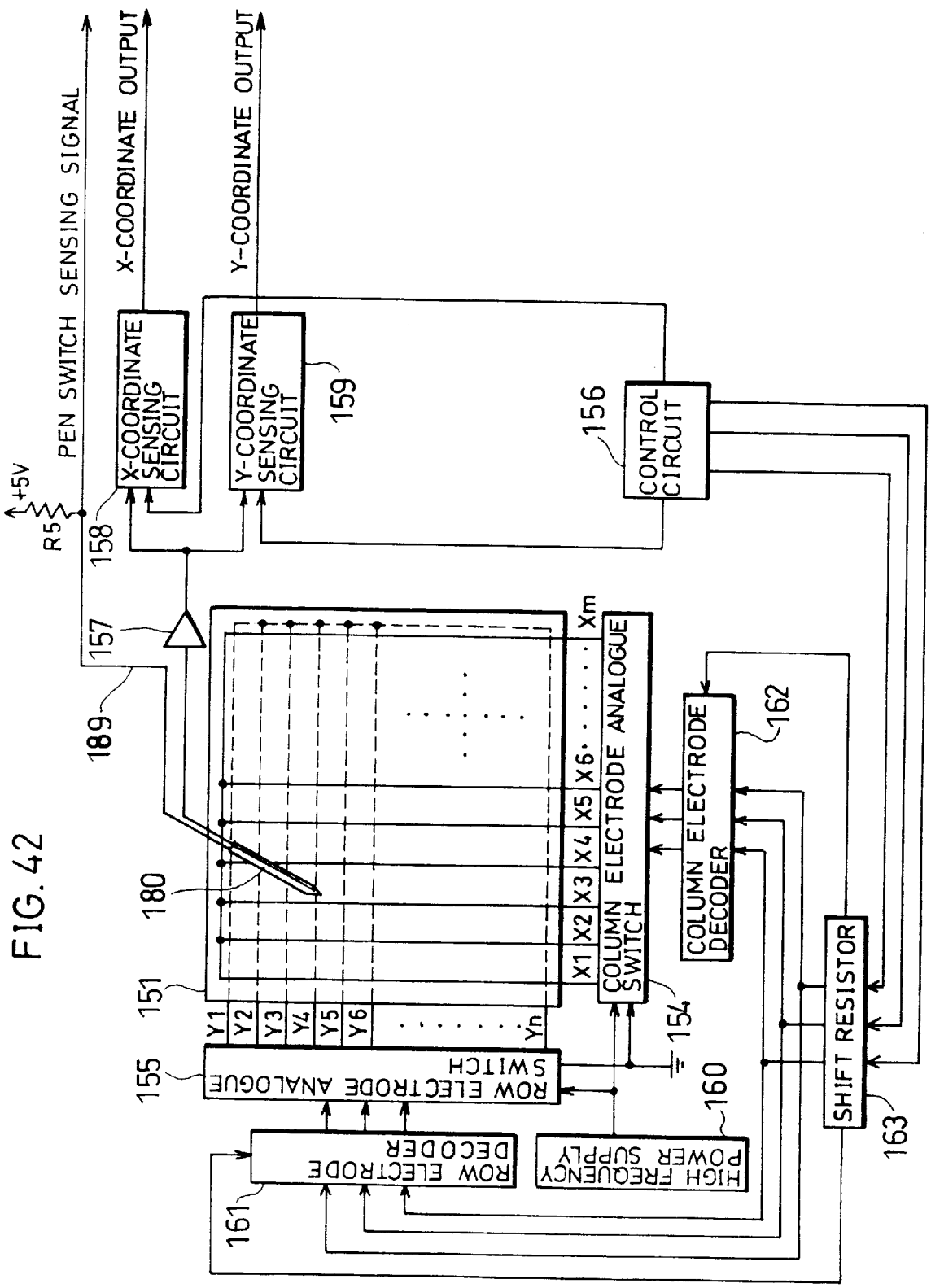
FIG. 42 is a block diagram showing an arrangement of a conventional coordinate input device of an electromagnetic induction type.
Figure 43:
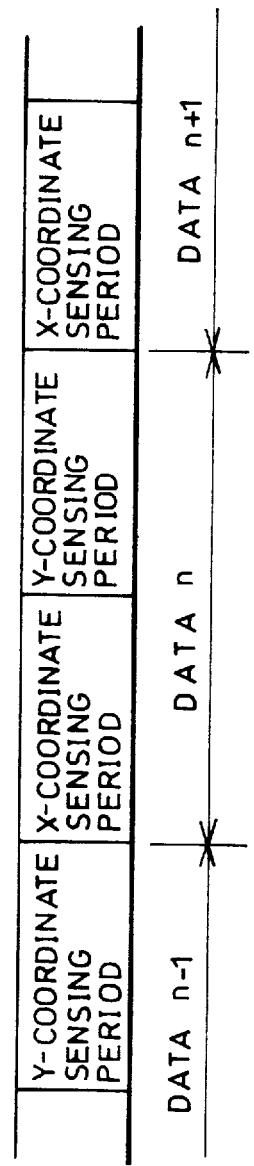
FIG. 43 is an explanatory drawing showing coordinate sensing periods of the coordinate input device shown in FIG. 42.

A turning-on of the pen switch 73 causes an abrupt change in the voltage at the pen switch terminal 76 of the pen switch 73 and in the voltage of the switch signal line 79 connected to the pen switch terminal 76 in the same manner as the conventional examples. Since the sensing electrode 72 and the signal line 78 have high impedances and are provided closely to the pen switch terminal 76 and the switch signal line 79, a noise signal is induced to the sensing electrode 72 and the signal line 78 as in the conventional examples (see FIG. 38 showing the conventional example).

On the other hand, if the sensing pen 70 is taken off from the coordinate input area 11 during the pen switch sensing period T1, the pen tip 71 slides outwards. The flag 75 then moves out of between the light emitting element and the phototransistor, thus allowing the light emitted from the light emitting element to reach the phototransistor. The phototransistor thus conducts, and the potential of the pen switch terminal 76 changes from +5 volts to the ground level. Consequently, the pen switch 73 is turned off. The pen switch sensing circuit 1 thus senses through the terminal PWC that the sensing pen 70 is taken off from the coordinate input area 11, and drops the pen switch signal psd, which is to be outputted to the main body, into the low level. A turning-off of the pen switch 73 causes an abrupt change in the voltage at the pen switch terminal 76 of the pen switch 73 and in the voltage of the switch signal line 79 connected to the pen switch terminal 76 in the same manner as above. Since the sensing electrode 72 and the signal line 78 have high impedances and are provided closely to the pen switch terminal 76 and the switch signal line 79, a noise signal is induced to the sensing electrode 72 and the signal line 78 as in the conventional examples.

However, since the coordinate sensing operations are not carried out during the pen switch sensing period T1, the above noise signals are not mistakenly processed as the coordinate sensing signals, thereby not affecting the coordinate sensing operations.

Meanwhile, the pen switch terminal 76 is connected to the ground during the non-T1 period. Therefore, even if the sensing pen 70 is pressed against the coordinate input area 11 during the non-T1 period, the pen switch sensing operations are not carried out. More specifically, even if the pen tip 71 slides inwards, and the flag 75 moves into between the light emitting element and the phototransistor, the potential of the pen switch terminal 76 remains at the ground level. Consequently, there is no change in the voltages of the pen switch terminal 76 and of the switch signal line 79. The sensing electrode 72 and the signal line 78 therefore have no induced noise signal affecting the coordinate sensing operations. If the sensing pen 70 remains pressed against the coordinate input area 11, as soon as the next pen switch sensing period T1 starts, the pen switch terminal 76 is connected to the +5 volt voltage through the resistor Rs1, and the potential of the pen switch terminal 76 rises into the high level. Consequently, it is sensed that the pen switch 73 is turned on.

On the other hand, if the sensing pen 70 is taken off from the coordinate input area 11 during the non-T1 period, the flag 75 moves out of between the light emitting element and the phototransistor and thus allows the light emitted from the light emitting element to reach the phototransistor. However, the potential of the pen switch terminal 76 remains at the ground level, because the pen switch terminal 76 is grounded. Therefore, there is no change in the voltages of the pen switch terminal 76 and of the switch signal line 79. The sensing electrode 72 and the signal line 78 therefore have no induced noise signal affecting the coordinate sensing operations. The pen switch terminal 76 remains in the low level in the next pen switch sensing period T1. Consequently, it is sensed that the pen switch 73 is turned off.

It is possible to separate, with respect to time, the coordinate sensing signals and the noise signals caused by the voltage changes upon the turning-on and -off of the pen switch 73 by adopting a time sharing method, or more specifically, by dividing the operation time into the pen switch sensing period T1 and the coordinate sensing period. It is thus possible to prevent the noise signals caused upon the turning-on and -off of the pen switch 73 from being mistakenly processed as the coordinate sensing signals. The conventional problem of the discontinuous sensed coordinates is thus eliminated.

Figure 7:
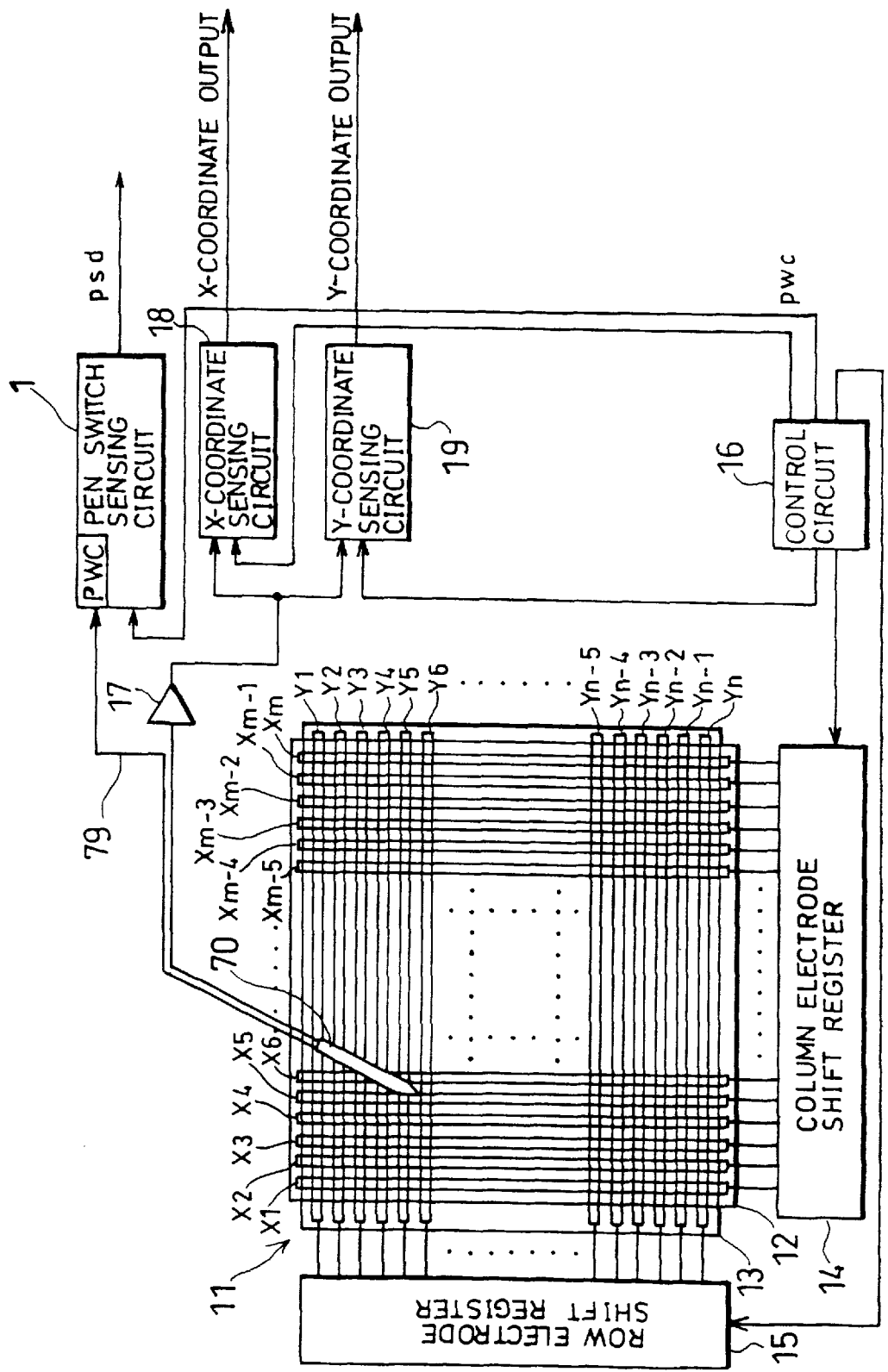
FIG. 7 is a block diagram showing another arrangement of the coordinate input device of the first embodiment.

Note that in the present embodiment, the pen switch control circuit 2 controls the pen switch sensing circuit 1. However, the control function by the pen switch control circuit 2 may be incorporated into the control circuit 16. The control circuit 16' in FIG. 7 is arranged as follows to produce the same effects as the pen switch control circuit 2. The control circuit 16', connected to the non-PWC input terminal of the pen switch sensing circuit 1, controls the pen switch sensing circuit 1 through the pen switch control signal pwc. The control circuit 16' does not need the pen switch control circuit 2, thereby reducing the number of components and cutting the costs.

When the control circuit 16' is used, the pen switch sensing circuit 1 is controlled by a coordinate sensing period control signal for controlling the coordinate sensing period. With the arrangement, the ordinary coordinate sensing period control signal can control the pen switch sensing circuit 1. As a result, it is possible to realize the effects of the present embodiment by adding the pen switch sensing circuit 1 with no more change in the component arrangement of the main body of the conventional coordinate input device.

Figure 35:
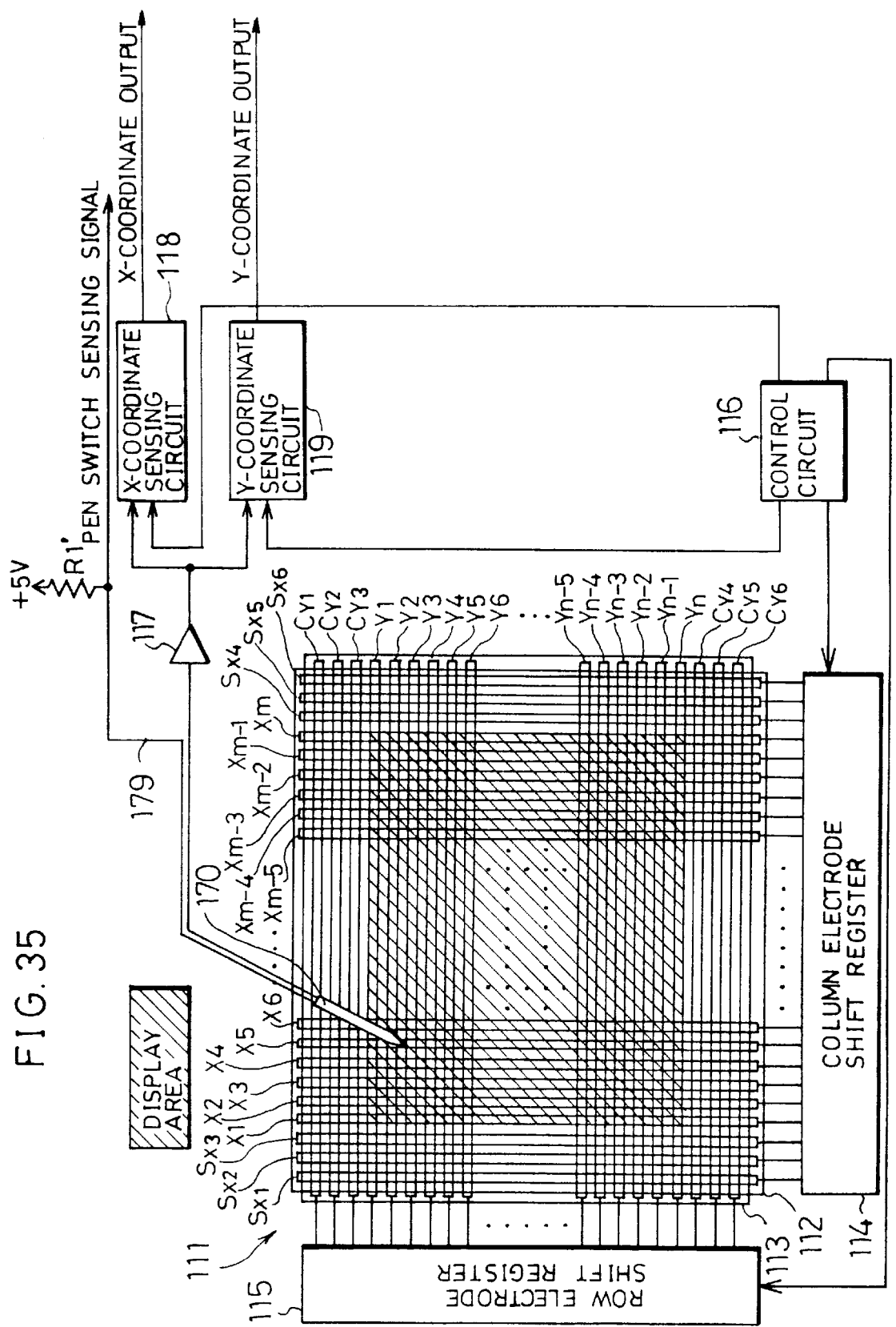
FIG. 35 is a block diagram showing another arrangement of the conventional coordinate input device of an electrostatic induction type.
Figure 36:
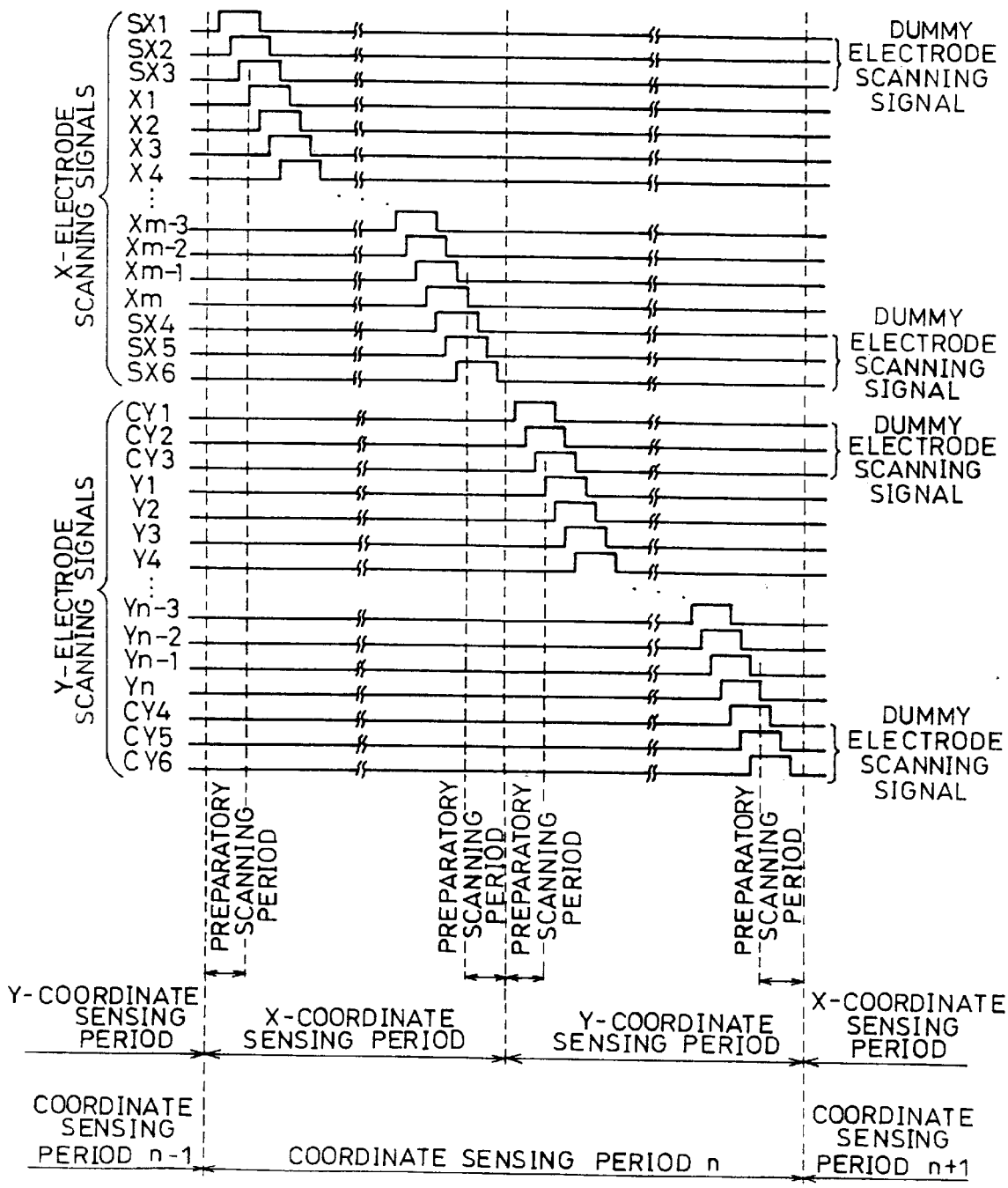
FIG. 36 is a timing chart showing electrode scanning signals of the coordinate input device shown in FIG. 35.
Figure 37:
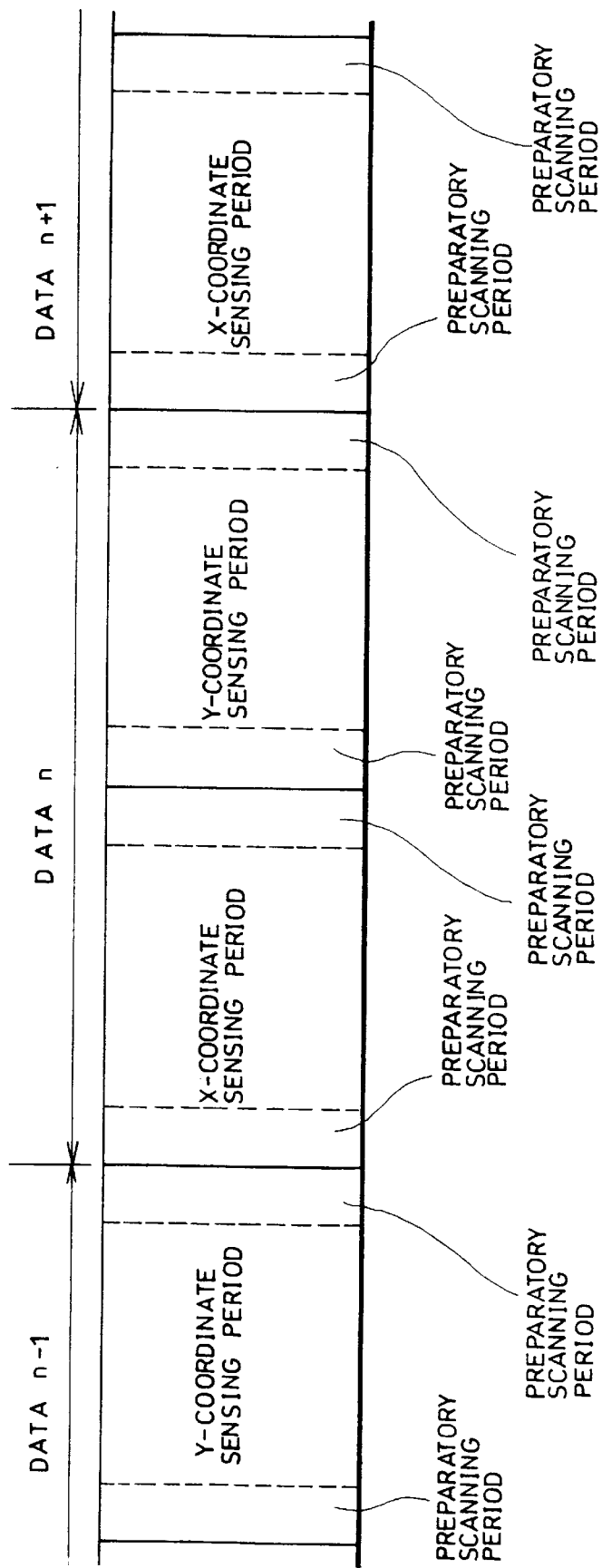
FIG. 37 is an explanatory drawing showing a relation between coordinate sensing periods and preparatory scanning periods of the coordinate input device shown in FIG. 35.

Note also that in the present embodiment, the pen switch sensing operations are carried out during the pen switch sensing period T1 after the coordinate sensing period. However, if in the coordinate sensing period, there is a scanning period irrelevant to the accuracy of the coordinate sensing, the pen switch sensing operations may be carried out during such a scanning period. This method is effective with, for example, the conventional tablet shown in FIG. 35. The preparatory scanning period (see FIGS. 36 and 37) is irrelevant to the sensing accuracy because only the dummy electrodes are scanned during the preparatory scanning period. Therefore, the preparatory scanning period may be utilized as the pen switch sensing period. In other words, the pen switch sensing period may be set during the preparatory scanning period during which the preparatory scanning area provided in the periphery of the coordinate input area 11 is scanned in order to compensate for the irregular coordinate sensing in the periphery of the coordinate input area 11.

Figure 8:
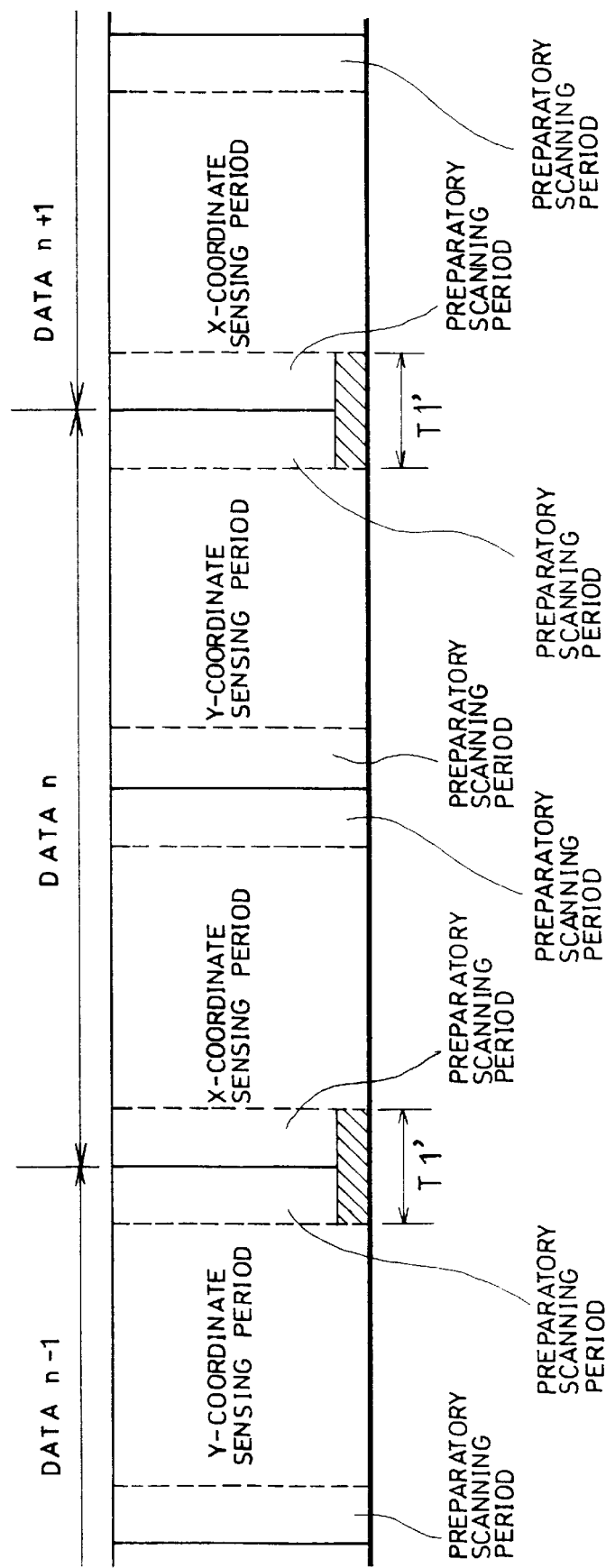
FIG. 8 is an explanatory drawing showing a relation between coordinate sensing periods and pen switch sensing periods in a further arrangement of a coordinate input device of the first embodiment.

The preparatory scanning period is set before and/or after the coordinate sensing period. For example, as shown in FIG. 8, a pen switch sensing period T1' is composed of the preparatory scanning period after the Y-coordinate sensing period of the data n−1 and the preparatory scanning period before the X-coordinate sensing period of the data n.

Similarly, another pen switch sensing period T1' is composed of the preparatory scanning period after the Y-coordinate sensing period of the data n and the preparatory scanning period before the X-coordinate sensing period of the data n+1.

With the above arrangement, the coordinate signals obtained during the preparatory scanning periods are discarded. Therefore, the coordinate signals obtained during the preparatory scanning periods, including possible noise signals occurring during the preparatory scanning period, do not affect the coordinate sensing accuracy. The pen switch sensing period T1' may be therefore set in the preparatory scanning period. Hence, since the pen switch sensing period T1' is not necessarily provided separately, the coordinate sensing operations are carried out faster.

Note also that in the present embodiment, the pen switch terminal 77 on the light emitting element side of the photocoupler is always connected through the resistor R2 to the +5 volt voltage. However, the light emitting element may be arranged to be provided with a power supply only during the pen switch sensing period T1.

Figure 9:
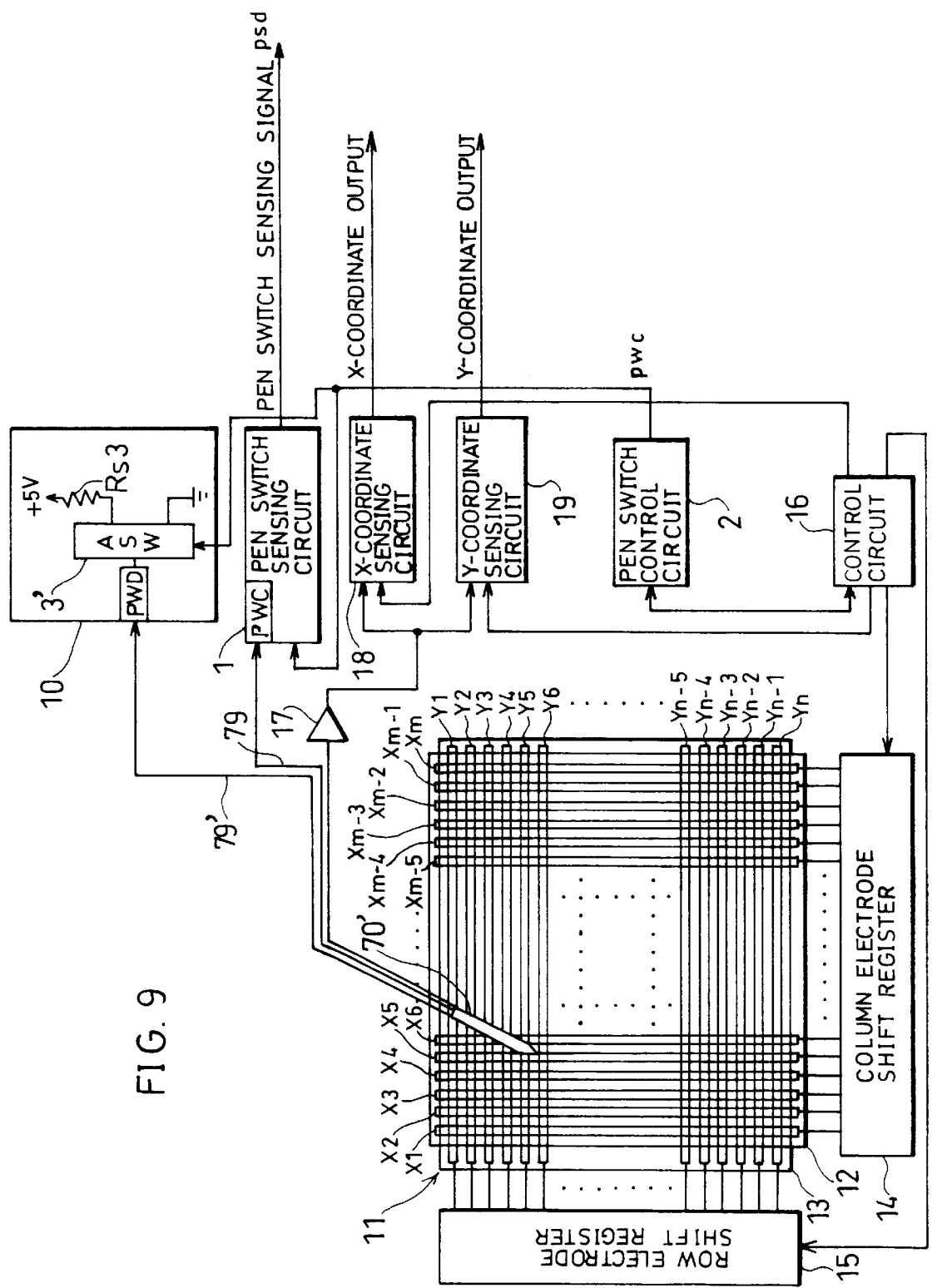
FIG. 9 is a block diagram showing a still further arrangement of the coordinate input device of the first embodiment.
Figure 10:
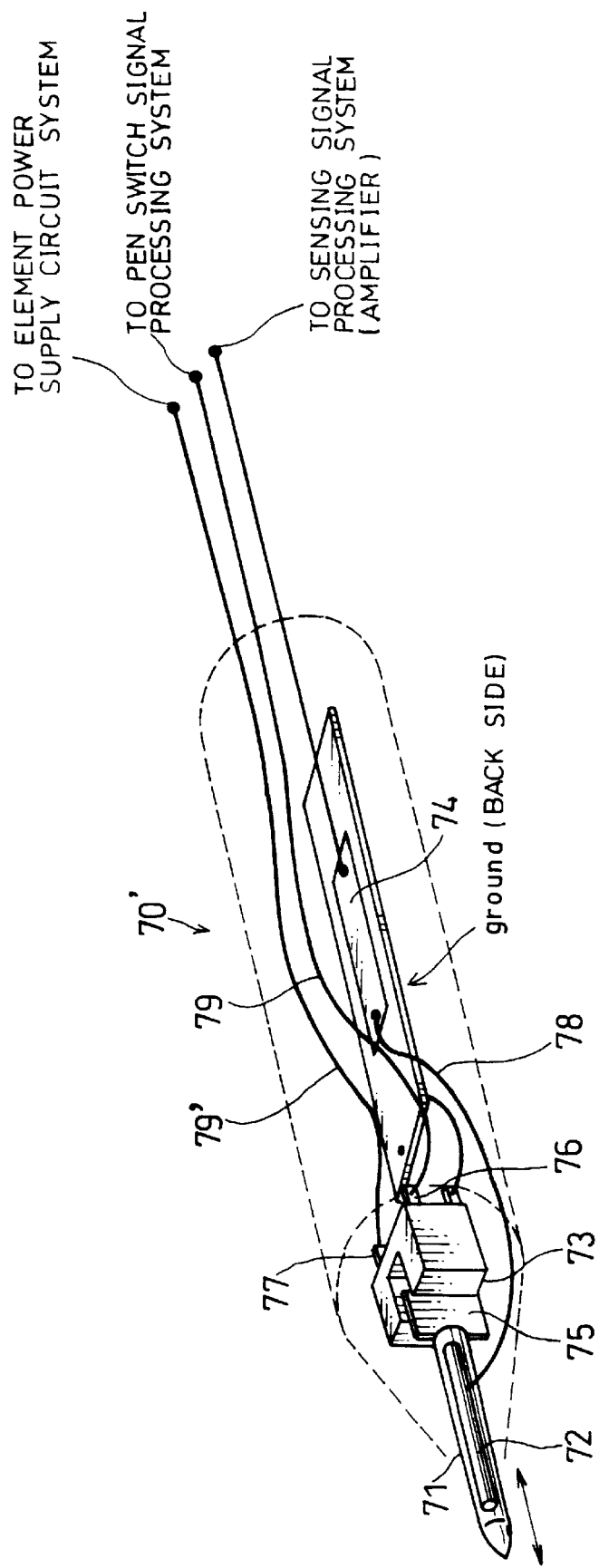
FIG. 10 is a schematic view showing an inside arrangement of a sensing pen of the coordinate input device shown in FIG. 9.

FIG. 9 shows an example of such an coordinate input device, which has a sensing pen 70' in lieu of the sensing pen 70 and is added with an element power supply circuit (element power supply means) 10 for providing a power supply to the light emitting element. The sensing pen 70', as shown in FIG. 10, has a light emitting element power supply line 79' connecting a pen switch terminal 77 on the light emitting element side to a terminal PWD of the element power supply circuit 10. The element power supply circuit 10 is composed of an analogue switch (selecting means) 3' and a resistor Rs3. An input terminal of the analogue switch 3' is connected to the terminal PWD, whereas one of the output terminals of the analogue switch 3' is connected to a voltage of +5 volts through the resistor Rs3, and the other output terminal thereof is grounded.

Figure 11:
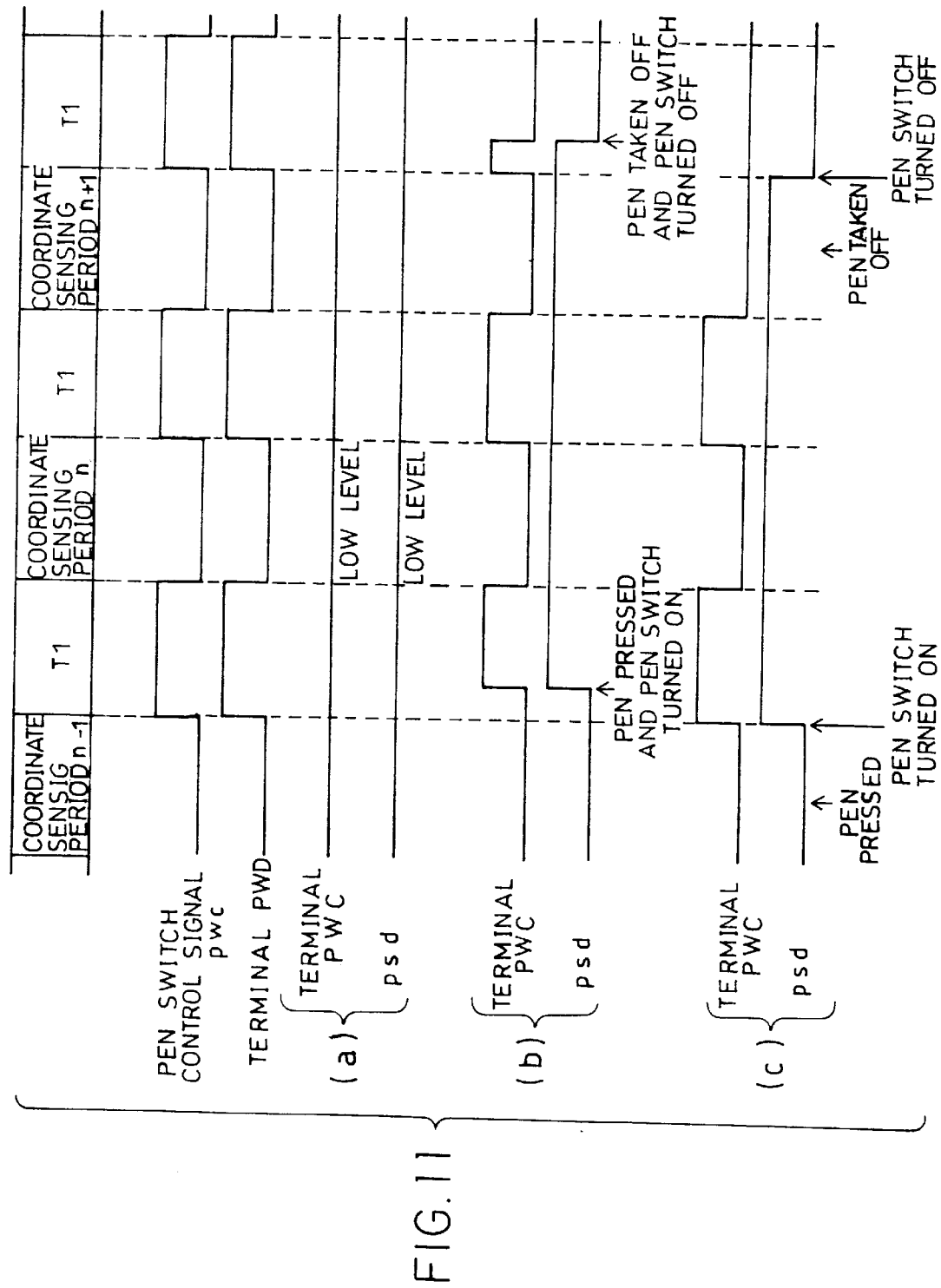
FIG. 11 is a timing chart showing pen switch sensing operations and light emitting element drive operations of the coordinate input device shown in FIG. 9.

The element power supply circuit 10 is controlled by the pen switch control circuit 2 through the pen switch control signal pwc so as to carry out the operations shown in the timing chart in FIG. 11. The terminal PWD is switched by a high-level pen switch control signal pwc to be connected to a voltage of +5 volts through the resistor Rs3. On the other hand, the terminal PWD is switched by a low-level pen switch control signal pwc to be grounded. Apart from this, the coordinate input device carries out the same operations as shown in FIG. 6.

With the above arrangement, even when the light emitting element power supply line 79' carries a power source noise, and stray capacity induces a voltage to the sensing electrode 72 due to the power source noise, the induced noise signal does not affect the S/N ratio of the coordinate sensing signal. This is because the coordinate sensing operations are not carried out during the pen switch sensing period T1. Meanwhile, since the light emitting element is grounded and provided with no power supply during the coordinate sensing period, the sensing electrode 72 does not carry the power source noise affecting the S/N ratio of the coordinate sensing signal. Besides, since no power supply is provided to the light emitting element except during the pen switch sensing period T1, it is possible to cut the power consumption.

Figure 12:
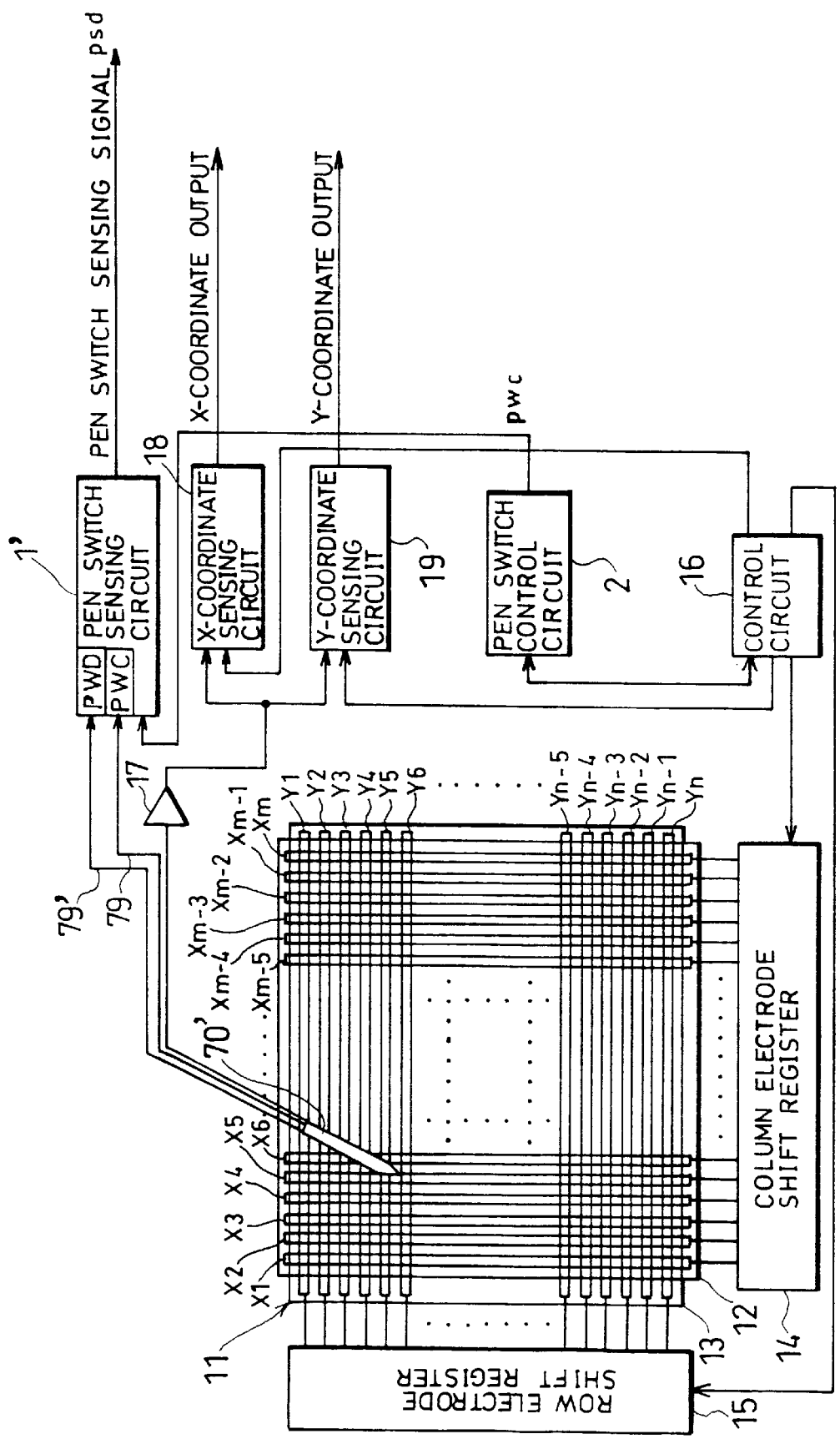
FIG. 12 is a block diagram showing an even further arrangement of the coordinate input device of the first embodiment.
Figure 13:
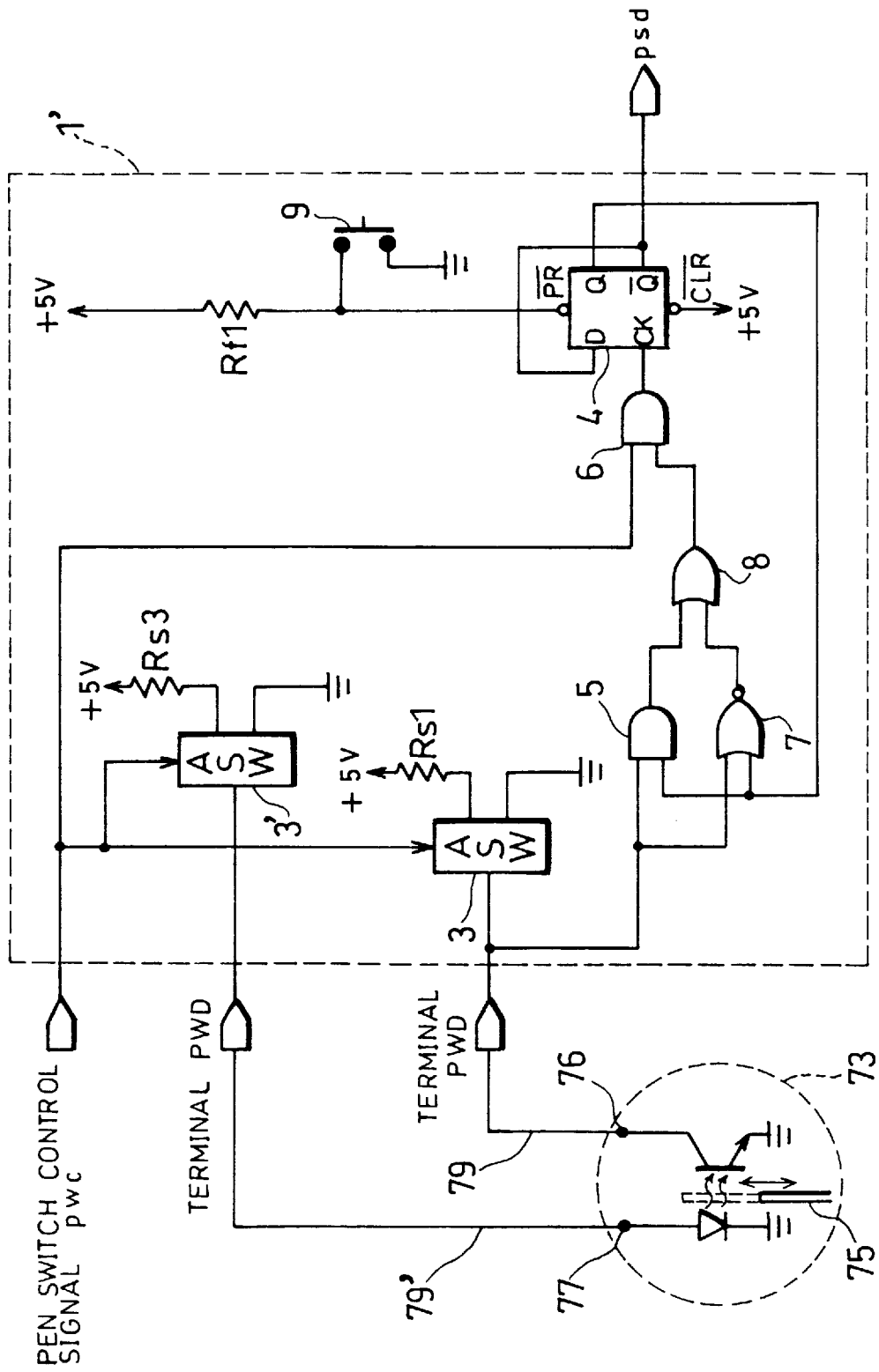
FIG. 13 is a circuit diagram showing an arrangement of a pen switch sensing circuit of the coordinate input device shown in FIG. 12.
Figure 14:
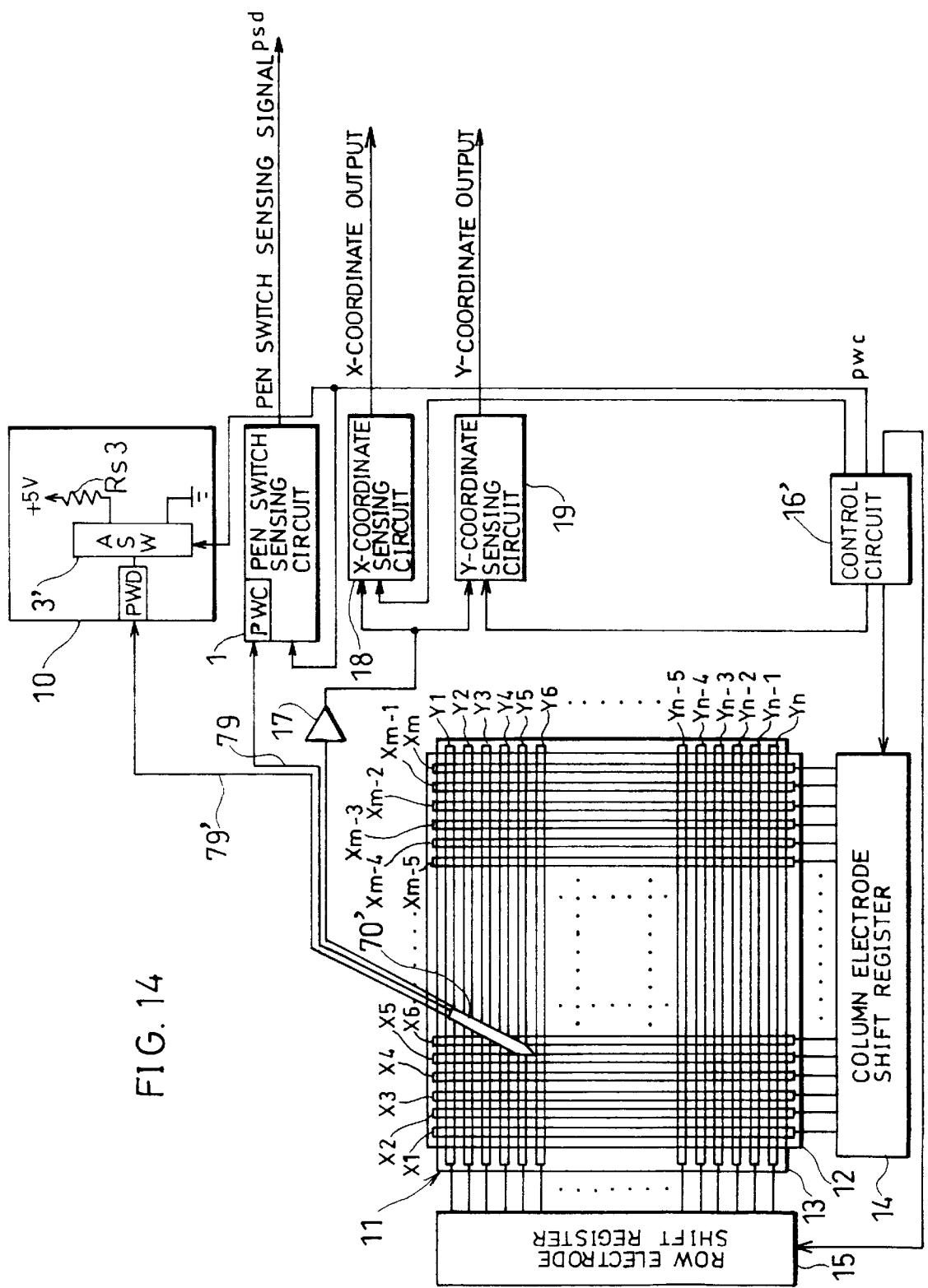
FIG. 14 is a block diagram showing a still another arrangement of the coordinate input device of the first embodiment.
Figure 15:
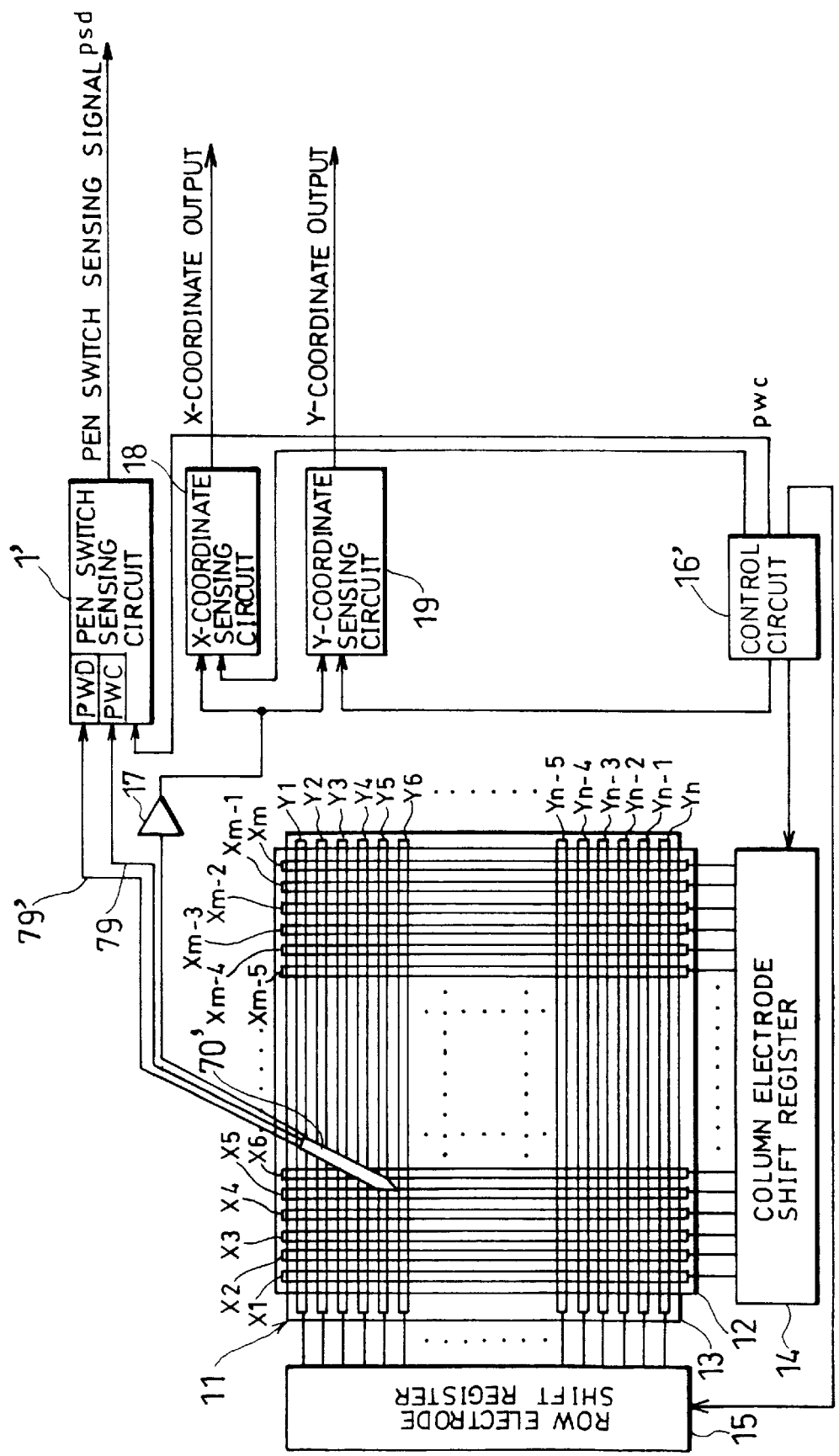
FIG. 15 is a block diagram showing even still another arrangement of the coordinate input device of the first embodiment.

Note also that in the present embodiment, the element power supply circuit 10 is provided separately. However, the functions of the element power supply circuit 10 may be incorporated into the pen switch sensing circuit 1. FIG. 12 shows such a pen switch sensing circuit 1'. In other words, the pen switch sensing circuit 1' supplies power to the light emitting element and the phototransistor only during the pen switch sensing period. FIG. 13 shows an arrangement of the pen switch sensing circuit 1'.

With the above arrangement, the pen switch sensing circuit 1' provides a power supply to the light emitting element and the phototransistor, and senses if the pen switch 73 is turned on or off. Consequently, there is no need to provide the element power supply circuit 10 separately. It is thus possible to reduce the number of components and to cut the costs.

Note also that similarly to the above case, one control circuit may control both the coordinate sensing circuit and the pen switch sensing circuit in the coordinate input devices shown in FIGS. 9 and 12. In the case of the coordinate input device shown in FIG. 9, the control circuit 16' controls both the element power supply circuit 10 and the pen switch sensing circuit 1 (see FIG. 14). In the case of the coordinate input device shown in FIG. 12, the control circuit 16' controls the pen switch sensing circuit 1' (see FIG. 15). It is thus possible to reduce the number of components and to cut the costs.

[SECOND EMBODIMENT]

Referring to FIGS. 5 and 16 through 25, the following description will discuss another embodiment of a coordinate input device of an electrostatic induction type integrated with a display device in accordance with the present invention. Here, for convenience, members of the present embodiment that have the same arrangement and function as members of the first embodiment, and that are mentioned in the first embodiment are indicated by the same reference numerals and description thereof is omitted.

Figure 16:
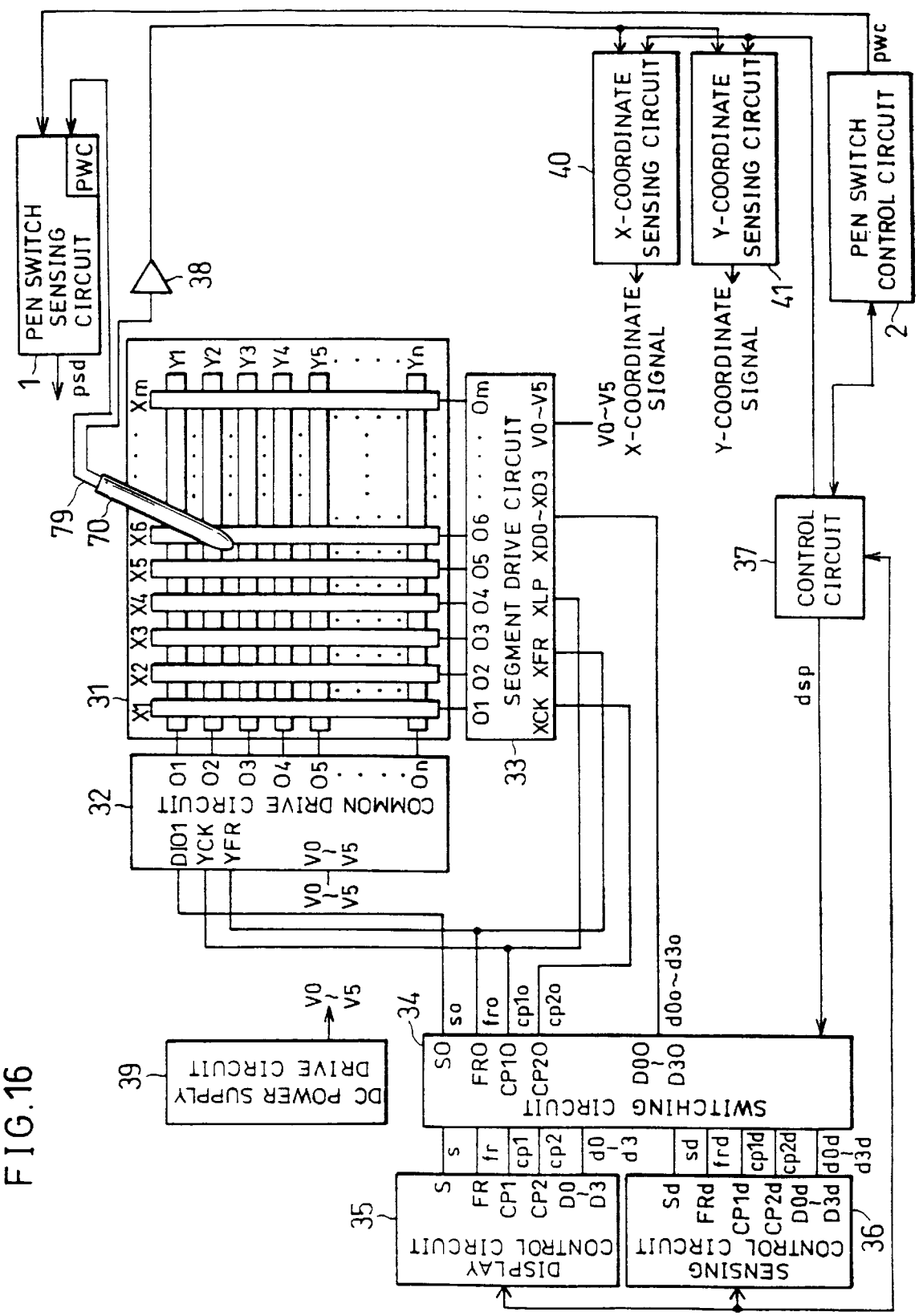
FIG. 16 is a block diagram showing an arrangement of a coordinate input device integrated with a display device of a second embodiment in accordance with the present invention.

The coordinate input device has a liquid crystal display panel 31 as shown in FIG. 16. The liquid crystal display panel 31 has pixels of n×m dots in a matrix form. Specifically, the liquid crystal display panel 31 has common electrodes Y, or namely, Y1, Y2, . . . and Yn; and segment electrodes X, or namely, X1, X2, . . . and Xm. The common and segment electrodes Y and X cross each other orthogonally and face each other with a small spacing in between filled with liquid crystal. The common and segment electrodes Y and X provide the pixels at the crossing points thereof.

The coordinate input device has, as well as the liquid crystal panel 31, a common drive circuit 32, a segment drive circuit 33, a switching circuit 34, a display control circuit 35, a sensing control circuit 36, a control circuit 37, an amplifier 38, a DC (direct current) power supply circuit 39, an X-coordinate sensing circuit 40, a Y-coordinate sensing circuit 41, a sensing pen 70, a pen switch sensing circuit 1 and a pen switch control circuit 2.

Terminals O1 to On of the common drive circuit 32 are connected to the respective common electrodes Y1 to Yn. The common drive circuit 32 drives the common electrodes Y. Terminals O1 to Om of the segment drive circuit 33 are connected to the respective segment electrodes X1 to Xm. The segment drive circuit 33 drives the segment electrodes X. The common and segment drive circuits 32 and 33 are connected through the switching circuit 34 to the display control circuit 35 and the sensing control circuit 36. The display control circuit 35, the sensing control circuit 36 and the switching circuit 34 are connected to the control circuit 37. The switching circuit (switching means) 34 is controlled by the control circuit 37 through a display and sensing switching control signal dsp.

The sensing pen 70 is connected to the amplifier 38 and to a terminal PWC of the pen switch sensing circuit 1 through a switch signal line 79. The amplifier 38 is connected to the X- and Y-coordinate sensing circuits 40 and 41. The pen switch control circuit 2, connected to the other input terminal (i.e., the non-PWC input terminal) of the pen switch sensing circuit 1, controls the pen switch sensing circuit 1 through a pen switch control signal pwc. The pen switch sensing circuit 1 outputs a pen switch signal psd in accordance with the pen switch control signal pwc and a voltage signal from a pen switch 73. The control circuit 37 is connected to and controls the X- and Y-coordinate sensing circuits 40 and 41, and the pen switch control circuit 2.

The present embodiment has the same feature that the pen switch sensing circuit 1 and the pen switch control circuit 2 are provided to carry out pen switch sensing operations in any desirable period as the first embodiment. The pen switch sensing circuit 1 and the pen switch control circuit 2 used in the present embodiment are the same as the ones used in the first embodiment. Therefore, no further explanation is given.

Figure 17:
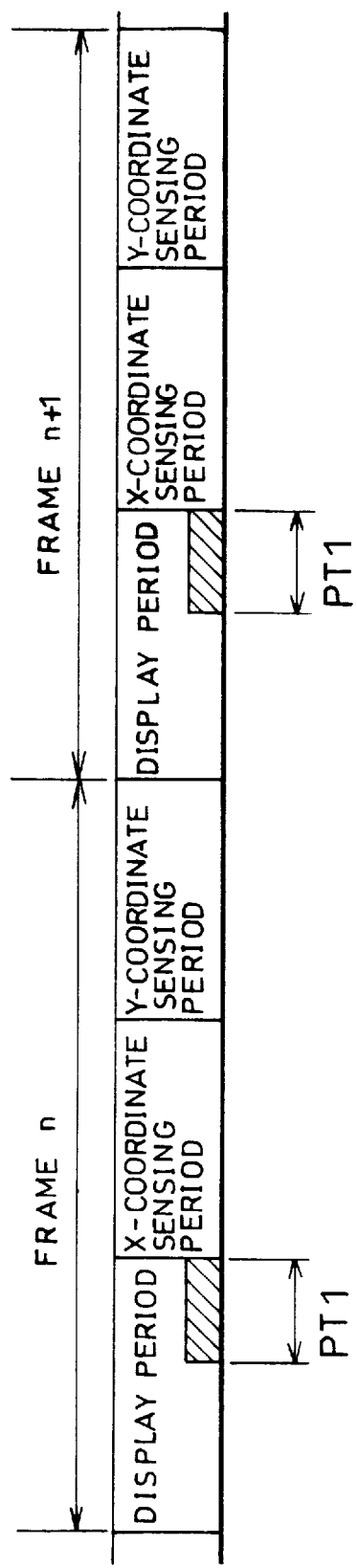
FIG. 17 is an explanatory drawing showing a relation among display periods, coordinate sensing periods, and pen switch sensing periods of the coordinate input device shown in FIG. 16.

The present example adopts the same time sharing method as the conventional example. Namely, each frame period of the present embodiment is divided into a display period for displaying an image and coordinate sensing periods for sensing coordinates indicated on the tablet. However, the present embodiment differs from the conventional example in that the present embodiment has a pen switch sensing period PT1 in the display period as shown in FIG. 17.

The following description will discuss in detail image displaying operations and coordinate sensing operations of the coordinate input device having the foregoing arrangement.

As shown in FIG. 16, during the display period for displaying an image on the liquid crystal panel 31, the display and sensing switching control signal dsp is in the high level, and the switching circuit 34 is switched to the display control circuit 35. The switching circuit 34 then transmits output signals of the display control circuit 35 to the common drive circuit 32 and the segment drive circuit 33. On the other hand, during the coordinate sensing periods for sensing X- and Y-coordinates, the display and sensing switching control signal dsp is in the low level, and the switching circuit 34 is switched to the sensing control circuit 36. The switching circuit 34 then transmits output signals of the sensing control circuit 36 to the common drive circuit 32 and the segment drive circuit 33.

During the display period, shift data s is outputted from a shift data output terminal S of the display control circuit 35. Likewise, a reversing signal fr is outputted from a reversing signal output terminal FR; a clock signal cp1 is outputted from a clock signal output terminal CP1; a clock signal cp2 is outputted from a clock signal output terminal CP2; display data d0 to d3 is outputted from data output terminal D0 to D3.

The clock signal cp1 is a clock signal with a frequency equal to a period during which pixels included in one line is displayed. The clock signal cp1 is outputted from an output terminal CP1O of the switching circuit 34 as a clock signal cplo, and inputted to a clock signal input terminal YCK of the common drive circuit 32 and to a latch pulse input terminal XLP of the segment drive circuit 33.

The shift data s, a pulse signal for selecting a certain electrode out of the common electrodes Y, is outputted from an output terminal SO of the switching circuit 34 as shift data so, and inputted to a shift data input terminal DI01 of the common drive circuit 32 in synchronization with the clock signal cplo. When the shift data so is inputted to the common drive circuit 32, the pulse position of the shift data so is shifted by the shift register in synchronization with the clock signal cp1o. One of the output terminals O1 to On of the common drive circuit 32 corresponds to the shifted pulse position. The common drive circuit 32 then applies a drive pulse functioning as a common electrode drive signal to one of the common electrodes Y through the corresponding output terminal. The common electrode drive signal is generated in accordance with bias power supplies V0 to V5 provided from the DC power supply circuit 39.

The period during which pixels included in one line is displayed is divided into a few sub-periods. The clock signal cp2 is a clock signal with a frequency equal to that sub-period. The clock signal cp2 is outputted from an output terminal CP2O of the switching circuit 34 as a clock signal cp2o, and inputted to a clock signal input terminal XCK of the segment drive circuit 33.

The switching circuit 34 outputs the display data d0 to d3 through output terminals D0O to D3O as display data d0o to d3o, and inputted to input terminals XD0 to XD3 of the segment drive circuit 33. A register in the segment drive circuit 33 sequentially receives the display data d0o to d3o in synchronization with the clock signal cp2o. When the shift register have received display data equivalent to one line of pixels, the received display data is latched in synchronization with the clock signal cp1o inputted through a latch pulse input terminal XLP. The segment drive circuit 33 applies drive pulses functioning as electrode drive signals corresponding to respective pieces of the display data through the output terminals O1 to Om to the segment electrodes X1 to Xm. The segment electrode drive signals are also generated in accordance with bias power supplies V0 to V5 provided from the DC power supply circuit 39.

The reversing signal fr prevents the liquid crystal from degrading through electrolysis by regularly reversing the direction of a voltage applied to the liquid crystal during the display period. The reversing signal fr is inputted to a reversing signal input terminal YFR of the common drive circuit 32 and a reversing signal input terminal XFR of the segment drive circuit 33 through a reversing signal output terminal FRO of the switching circuit 34 as a reversing signal fro.

In this way, the pixels in the matrix are driven by the common drive circuit 32 and the segment drive circuit 33 sequentially in the order of the row electrodes of the liquid crystal panel 31. Pixels in accordance with the display data d0 to d3 are thus displayed on the liquid crystal panel 31.

Meanwhile, in the coordinate sensing period, the sensing control circuit 36 outputs shift data sd through a shift data output terminal Sd, a reversing signal frd through a reversing signal output terminal FRd, a clock signal cp1d through a clock signal output terminal CP1d, a clock signal cp2d through a clock signal output terminal CP2d and drive data d0d to d3d through a data output terminals D0d to D3d.

The clock signal cp1d, having a frequency equal to the scanning period for scanning one of the common electrodes Y, is inputted to the clock input terminal YCK of the common drive circuit 32 and to the latch pulse input terminal XLP of the segment drive circuit 33 through an output terminal CP1O of the switching circuit 34 as the clock signal cp1o. The shift data sd (namely, pulse signals for selecting a particular common electrode out of the common electrodes Y) are inputted to a shift data input terminal DI01 of the common drive circuit 32 through an output terminal SO of the switching circuit 34 as the shift data so in synchronization with the clock signal cp1o. As a result, similarly to the display period, the pulse positions of the shift data so are shifted by the shift register of the common drive circuit 32 in synchronization with the clock signal cp1o. Then, the common drive circuit 32 sequentially applies common electrode scanning signals y, or namely, y1 to yn, through the output terminals O1 to On corresponding to the shift positions to the common electrodes Y1 to Yn (see FIG. 18). The common electrode scanning signals y are generated in accordance with bias power supplies V0 to V5 provided from the DC power supply circuit 39.

The clock signal cp2d, having a frequency equal to the scanning period for scanning one of the segment electrodes X, is inputted to the clock input terminal XCK of the segment drive circuit 33 through the output terminal CP2O of the switching circuit 34 as the clock signal cp2o. The drive data d0d to d3d is inputted through the output terminals D0O to D3O of the switching circuit 34 to the input terminals XD0 to XD3 of the segment drive circuit 33. The register in the segment drive circuit 33 then sequentially receives the drive data d0d to d3d in synchronization with the clock signal cp2o. As a result, scanning pulses functioning as the segment electrode scanning signals x, or namely x1 to xm, which correspond to the drive data d0d to d3d are outputted through the output terminals O1 to Om of the segment drive circuit 33 and inputted to the segment electrodes X1 to Xm (see FIG. 18). The segment electrode scanning signals x are also generated in accordance with bias power supplies V0 to V5 provided from the DC power supply circuit 39.

Figure 18:
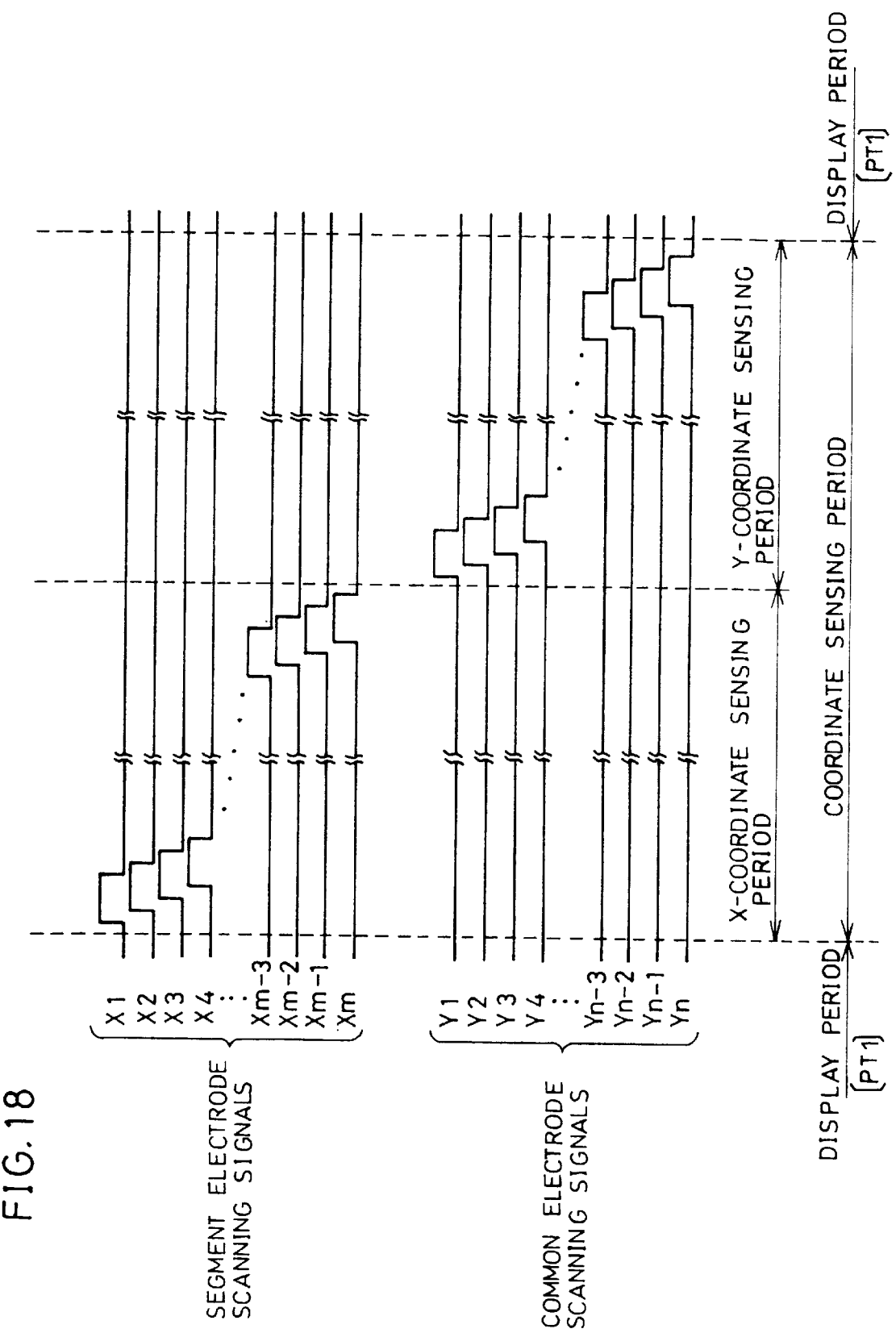
FIG. 18 is a timing chart showing segment electrode scanning signals and common electrode scanning signals.

As mentioned above, the scanning pulses shown in FIG. 18 are applied to the electrodes X and Y during the coordinate sensing periods. FIG. 18 is a timing chart showing the segment and common electrode scanning signals x and y during the coordinate sensing period of the coordinate input device. Pulse voltage signals functioning as the segment electrode scanning signals x are sequentially applied to the segment electrodes X during the X-coordinate sensing period. Pulse voltage signals functioning as the common electrode scanning signals y are sequentially applied to the common electrodes Y during the Y-coordinate sensing period.

When the pulse voltages are applied as above, capacities between a sensing electrode 72 of the sensing pen 70 and the segment and common electrodes X and Y (see FIG. 5) induce voltages to the sensing pen 70. The voltage induced to the sensing pen 70 is amplified by the amplifier 38 and inputted into the X- and Y-coordinate sensing circuits 40 and 41.

In accordance with an output signal of the amplifier 38 and a timing signal from the control circuit 37, the X- and Y-coordinate sensing circuits 40 and 41 measure time since the first pulse voltage signal is applied until the induced voltage reaching the maximum value. Thus, the X- and Y-coordinate sensing circuits 40 and 41 sense respectively an X-coordinate signal and a Y-coordinate signal of the position indicated with the sensing pen 70.

The following description will discuss the pen switch sensing operations during the pen switch sensing period PT1 provided in the display period.

The pen switch control circuit 2, interlocked with the control circuit 37, sends the pen switch control signal pwc to the pen switch sensing circuit 1. In the same manner with the first embodiment, during the pen switch sensing period PT1, the pen switch control signal pwc is a high-level control signal. However, during the non-PT1 period, the pen switch control signal pwc is a low-level control signal.

As shown in FIG. 4, when the pen switch control signal pwc is in the high-level, the pen switch terminal 76 is connected to a voltage of +5 volts through a resistor in the pen switch sensing circuit 1. Meanwhile, when the pen switch control signal pwc is in the low-level, the pen switch terminal 76 is grounded.

The pen switch terminal 76 is connected to the +5 volt voltage during the pen switch sensing period PT1. If the sensing pen 70 is pressed against the liquid crystal display panel 31 during the pen switch sensing period PT1, a pen tip 71 slides inwards, and a flag 75 on the backside of the pen tip 71 moves in between a light emitting element and a phototransistor to block the light emitted from the light emitting element. The phototransistor ceases to conduct, and the potential of the pen switch terminal 76 changes from the ground level to +5 volts. Consequently, the pen switch 73 is tuned on. The pen switch sensing circuit 1 thus senses through the terminal PWC that the sensing pen 70 is pressed against the surface of the liquid crystal display panel 31, and raises the pen switch signal psd, which is to be sent to the main body, into the high level.

A turning-on of the pen switch 73 causes an abrupt change in the voltage at the pen switch terminal 76 of the pen switch 73 and in the voltage of the switch signal line 79 connected to the pen switch terminal 76 in the same manner as the conventional examples. Since the sensing electrode 72 and a signal line 78 have high impedances and are provided closely to the pen switch terminal 76 and the switch signal line 79, such an noise signal causes the same induced noise signal to the sensing electrode 72 and the signal line 78 as in the conventional examples (see FIG. 38 used for the description of the conventional examples).

If the sensing pen 70 is taken off from the liquid crystal display panel 31 during the pen switch sensing period PT1, the pen tip 71 slides outwards. The flag 75 then moves out of between the light emitting element and the phototransistor to allow the light emitted from the light emitting element to reach the phototransistor. The phototransistor thus conducts, and the potential of the pen switch terminal 76 changes from +5 volts to the ground level. Consequently, the pen switch 73 is turned off. The pen switch sensing circuit 1 thus senses through the terminal PWC that the sensing pen 70 is taken off from the surface of the liquid crystal display panel 31, and drops the pen switch signal psd, which is to be sent to the main body, into the low level.

A turning-off of the pen switch 73 causes an abrupt change in the voltage at the pen switch terminal 76 of the pen switch 73 and in the voltage of the switch signal line 79 connected to the pen switch terminal 76 in the same manner as above. Since the sensing electrode 72 and the signal line 78 have high impedances and are provided closely to the pen switch terminal 76 and the switch signal line 79, such a noise signal is induced to the sensing electrode 72 and the signal line 78. However, since the coordinate sensing operations are not carried out during the pen switch sensing period PT1, the above noise signals are not mistakenly processed as the coordinate sensing signals, thereby not affecting the coordinate sensing operations.

Meanwhile, the pen switch terminal 76 is connected to the ground during the non-PT1 period (i.e., during the coordinate sensing period). Therefore, even if the sensing pen 70 is pressed against the liquid crystal display panel 31, the pen switch sensing operations are not carried out. More specifically, even if the pen tip 71 slides inwards, and the flag 75 moves into between the light emitting element and the phototransistor, the potential of the pen switch terminal 76 remains at the ground level. Consequently, there is no change in the voltages of the pen switch terminal 76 and of the switch signal line 79. The sensing electrode 72 and the signal line 78 therefore have no induced noise signal affecting the coordinate sensing operations. If the sensing pen 70 remains pressed against the liquid crystal display panel 31, as soon as the pen switch terminal 76 is connected to the +5 volt voltage through the resistor during the next pen switch sensing period PT1, the potential of the pen switch terminal 76 rises into the high level. Consequently, it is sensed that the pen switch 73 is turned on.

On the other hand, if the sensing pen 70 is taken off from the liquid crystal display panel 31 during the non-PT1 period, the flag 75 moves out of between the light emitting element and the phototransistor and thus allows the light emitted from the light emitting element to reach the phototransistor. However, the potential of the pen switch terminal 76 remains at the ground level, because the pen switch terminal 76 is grounded. Therefore, there is no change in the voltages of the pen switch terminal 76 and of the switch signal line 79. The sensing electrode 72 and the signal line 78 therefore have no induced noise signal affecting the coordinate sensing operations. The pen switch terminal 76 remains in the low level in the next pen switch sensing period PT1. Consequently, it is sensed that the pen switch 73 is turned off.

It is possible through the operations above to prevent the noise signals occurring upon the turning-on and-off of the pen switch 73 from being mistakenly processed as the coordinate input signals. The conventional problem of the discontinuous sensed coordinates is thus eliminated.

Figure 19:
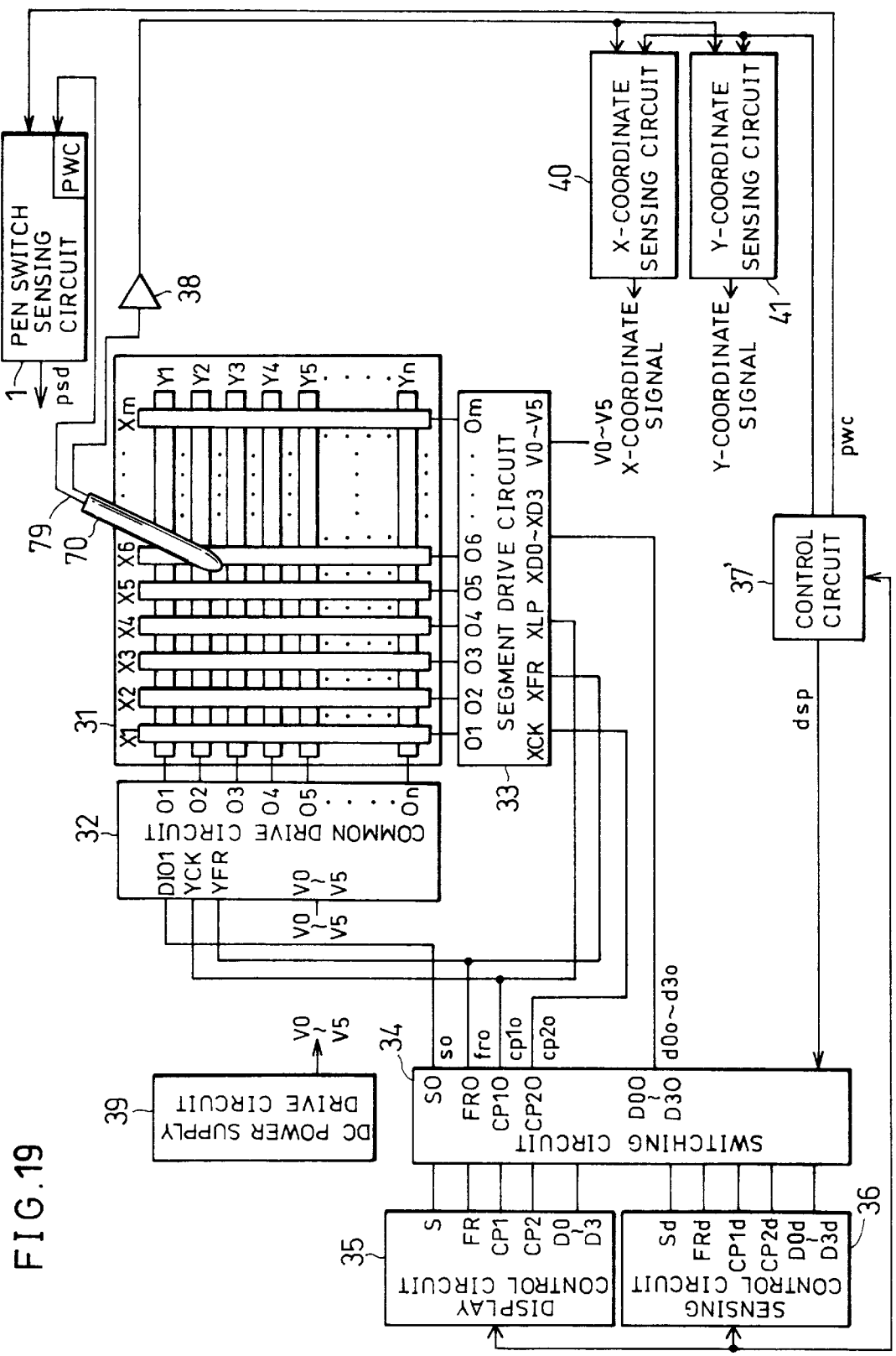
FIG. 19 is a block diagram showing another arrangement of the coordinate input device of the second embodiment.

Note that in the present embodiment, the pen switch control circuit 2 controls the pen switch sensing circuit 1 as shown in FIG. 16. However, the control function by the pen switch control circuit 2 may be incorporated into the control circuit 37. The control circuit 37' in FIG. 19 is arranged as follows to produce the same effects as the pen switch control circuit 2. The control circuit 37', connected to the non-PWC input terminal of the pen switch sensing circuit 1, controls the pen switch sensing circuit 1 through the pen switch control signal pwc. The control circuit 37' does not need the pen switch control circuit 2, thereby reducing the number of components and cutting the costs.

Figure 20:
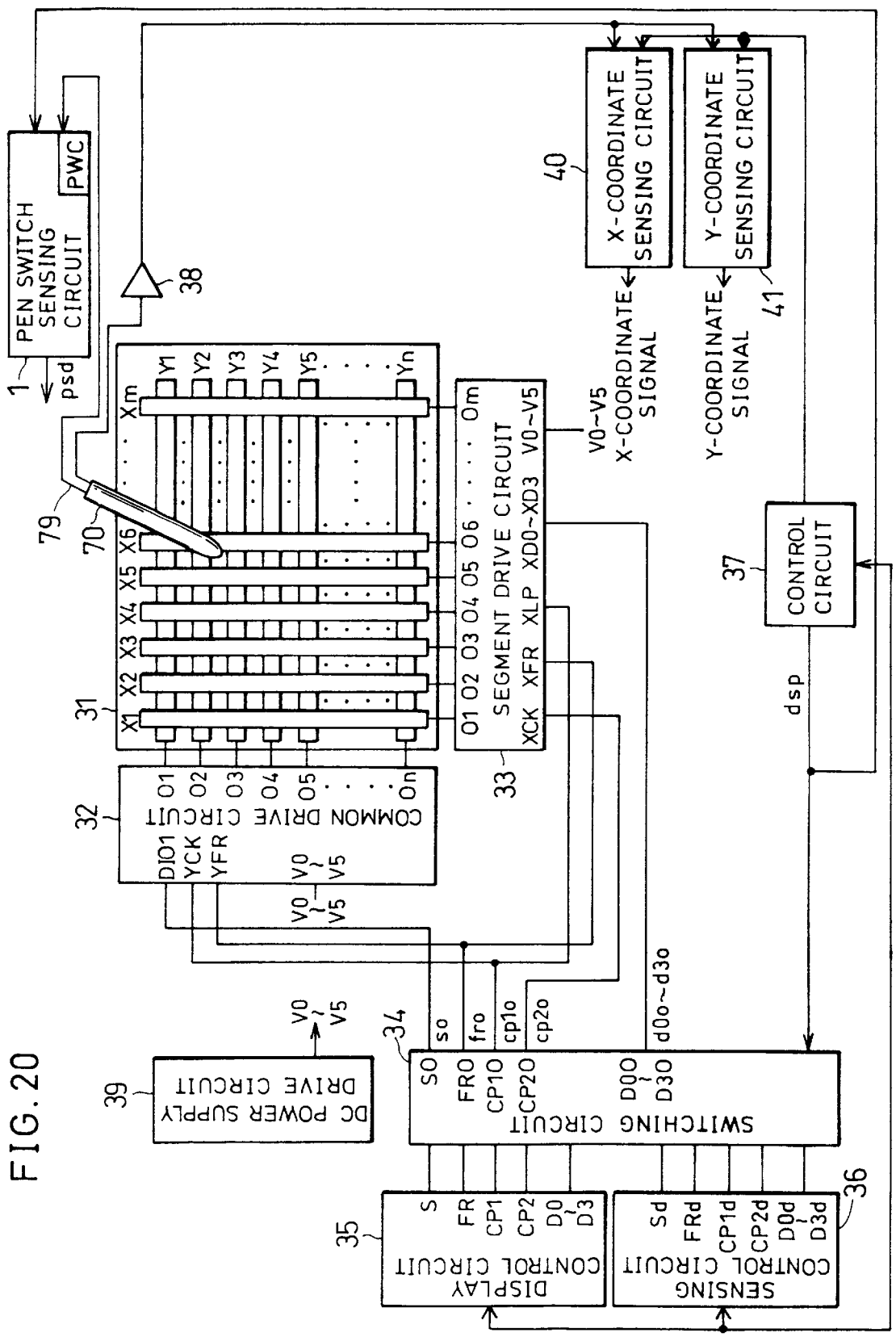
FIG. 20 is a block diagram showing a further arrangement of the coordinate input device of the second embodiment.

Note also that in the present embodiment, the pen switch signal pwc controls the pen switch sensing circuit 1 as shown in FIG. 19. However, as shown in FIG. 20, the display and sensing switching control signal (coordinate sensing period control signal) dsp, which is outputted from the control circuit 37 to the switching circuit 34, in lieu of the pen switch control signal pwc, may control the pen switch sensing circuit 1. The control signal used for the conventional display-integrated tablet can be used for this purpose. Therefore, the effects of the present invention are achieved by adding the pen switch sensing circuit 1 to the conventional display-integrated tablet with no change in the control circuit 37.

Figure 21:
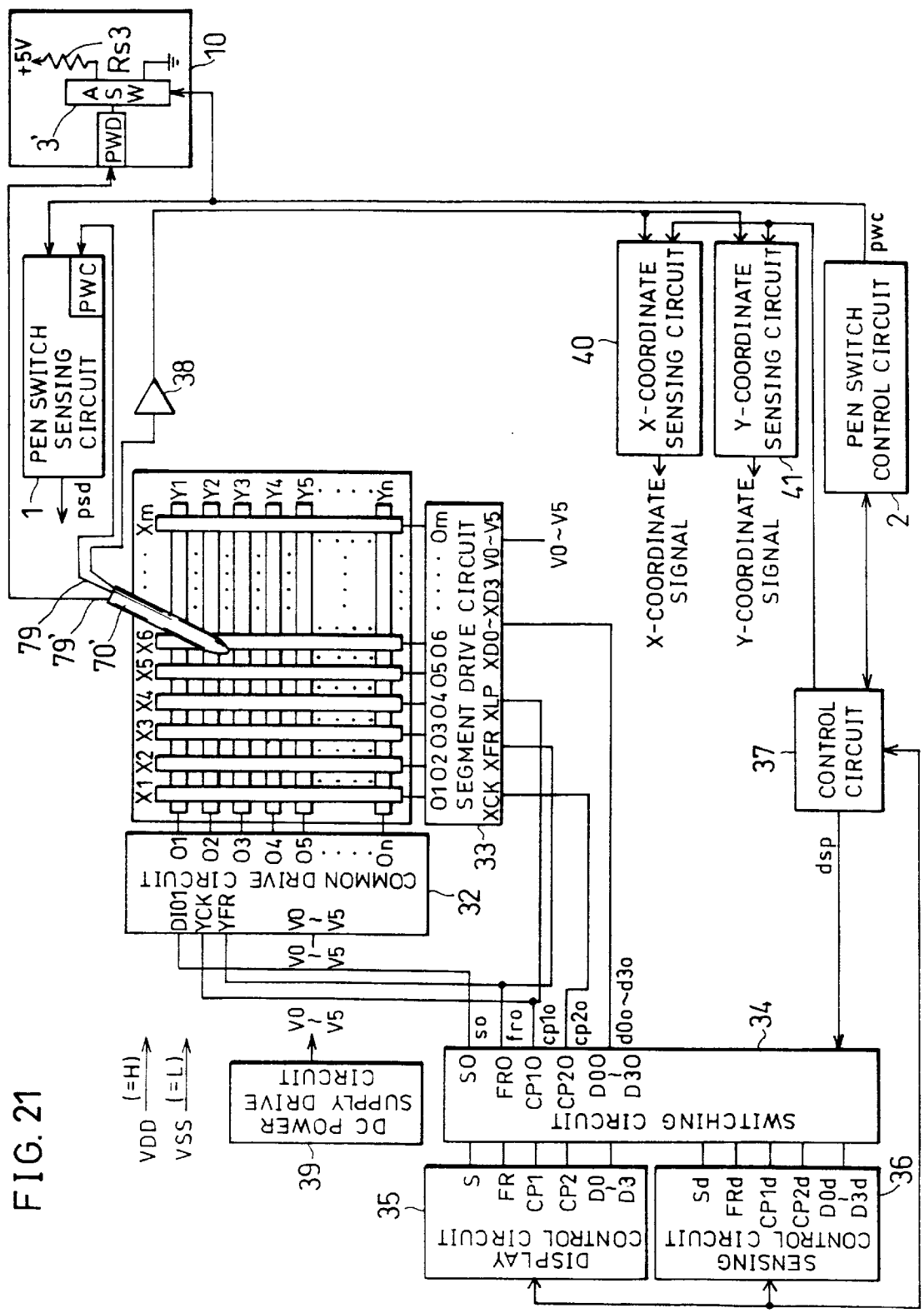
FIG. 21 is a block diagram showing a still further arrangement of the coordinate input device of the second embodiment.
Figure 22:
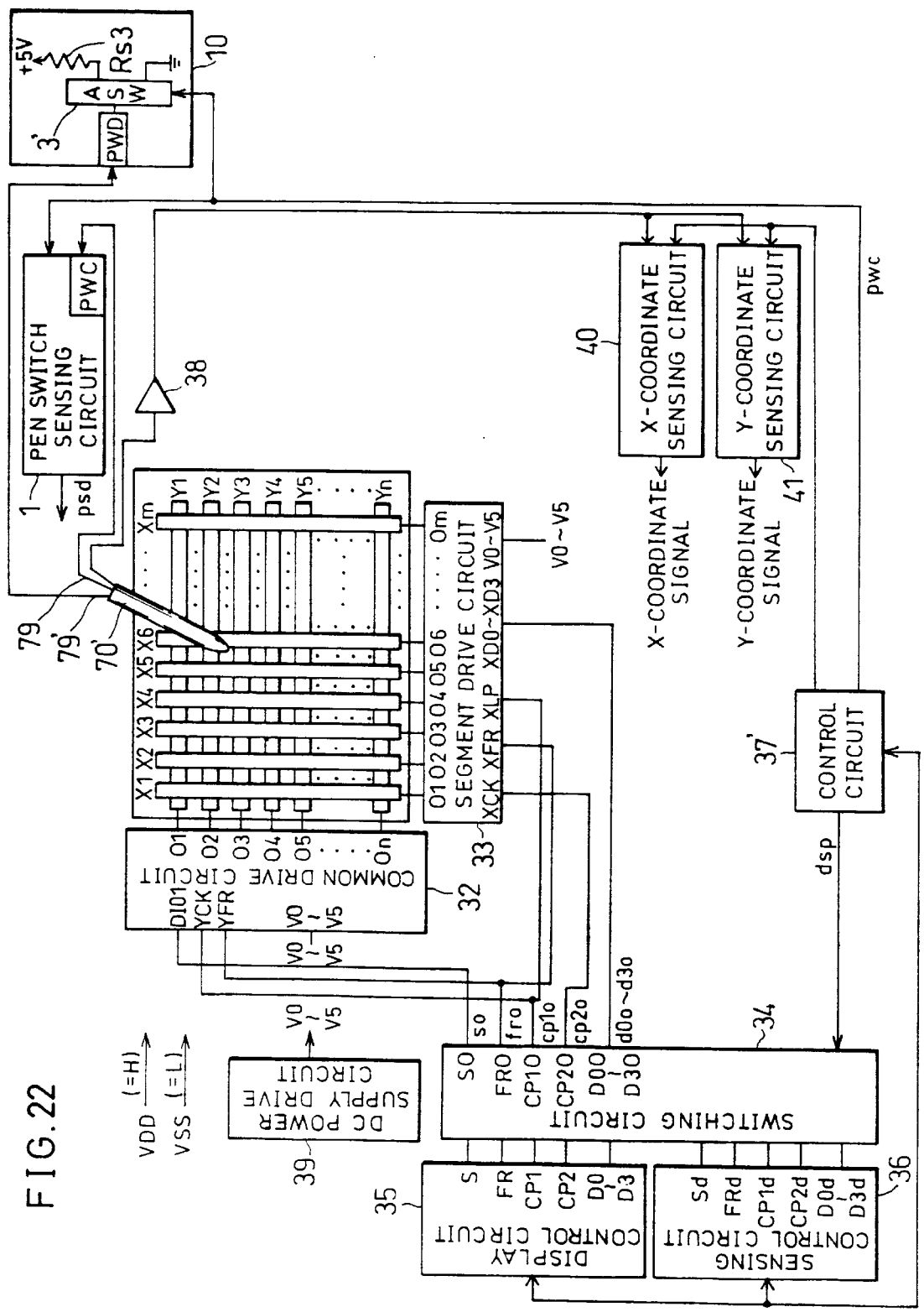
FIG. 22 is a block diagram showing an even further arrangement of the coordinate input device of the second embodiment.
Figure 23:
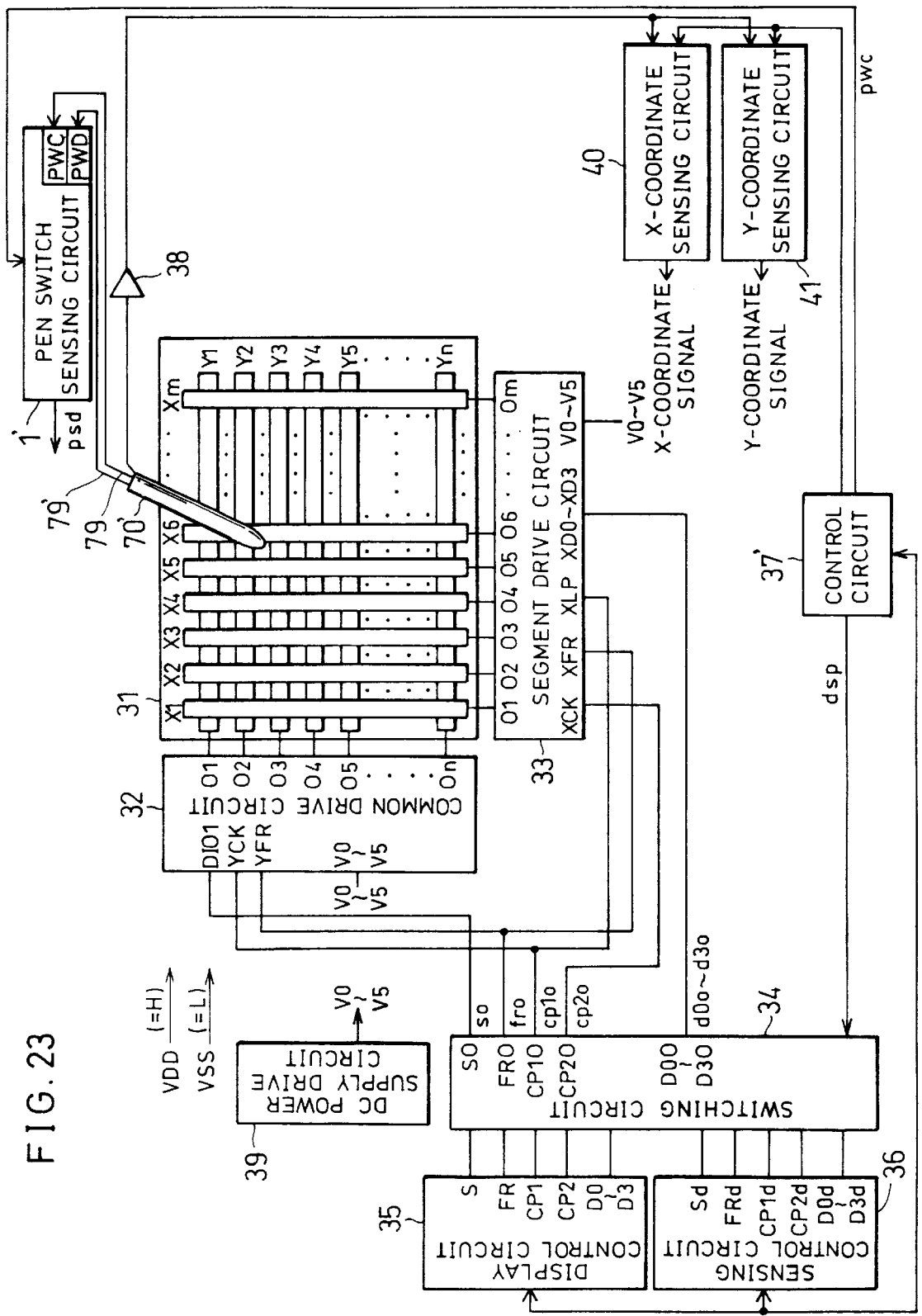
FIG. 23 is a block diagram showing a yet further arrangement of the coordinate input device of the second embodiment.
Figure 24:
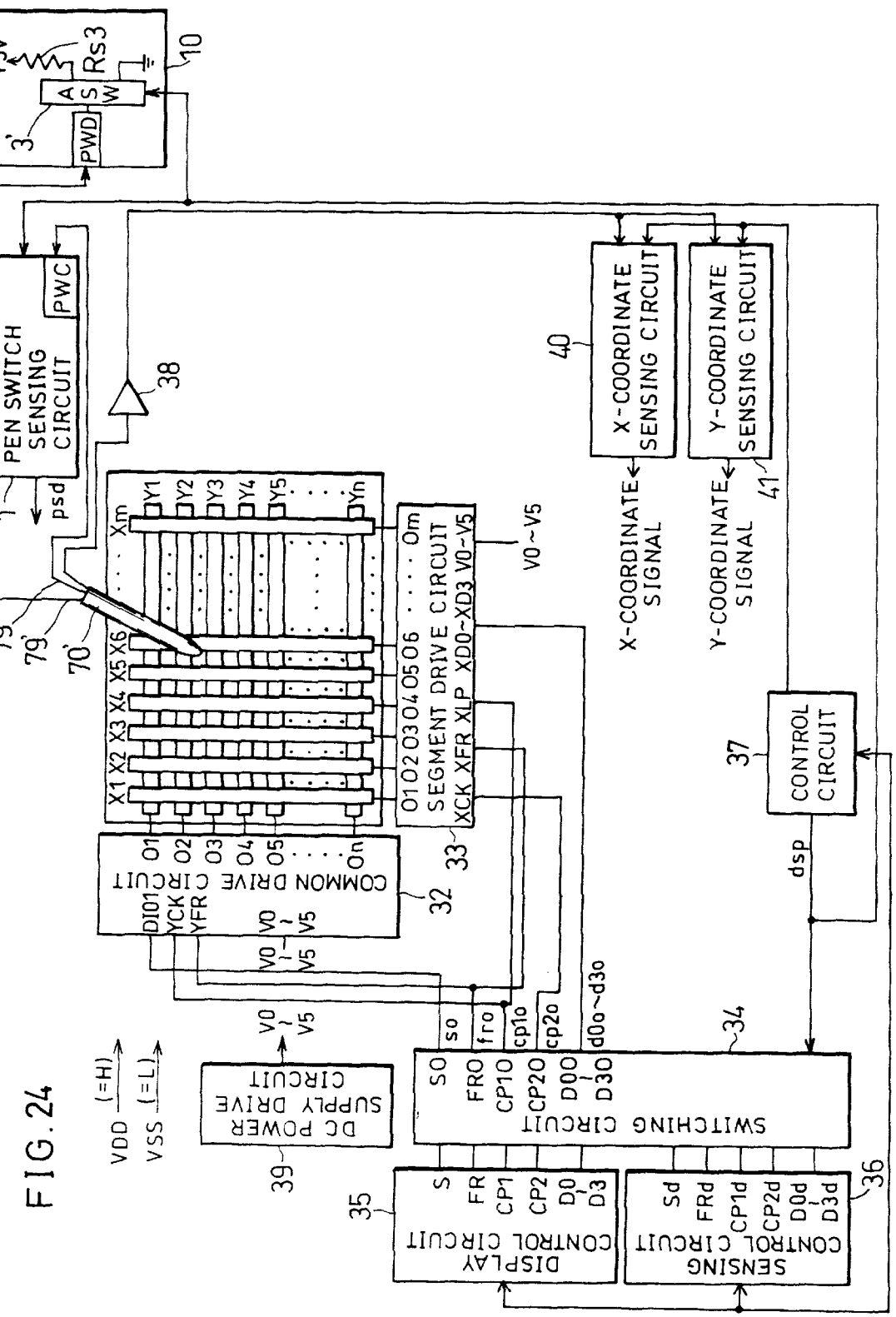
FIG. 24 is a block diagram showing still another arrangement of the coordinate input device of the second embodiment.
Figure 25:
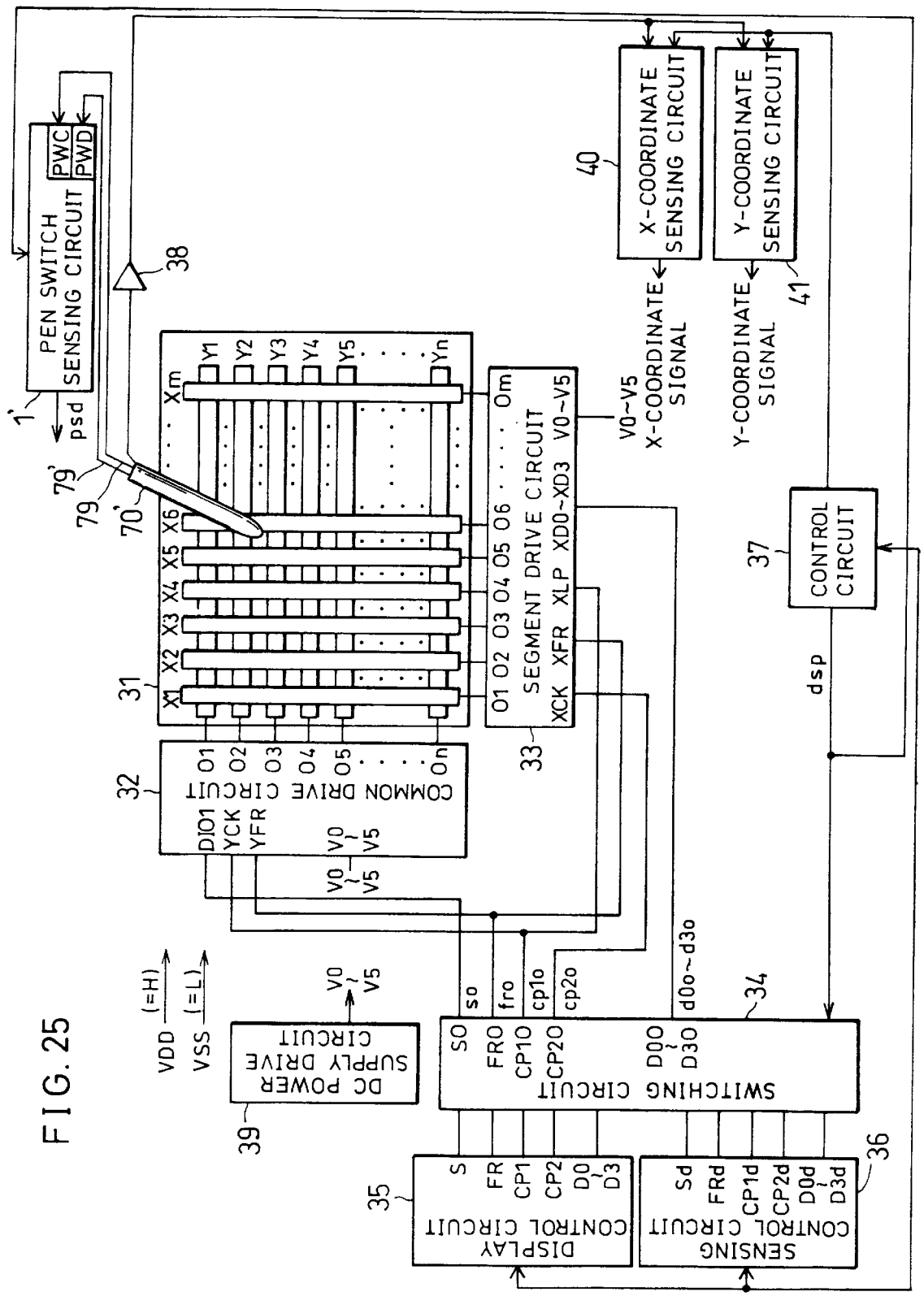
FIG. 25 is a block diagram showing even still another arrangement of the coordinate input device of the second embodiment.
Figure 26:
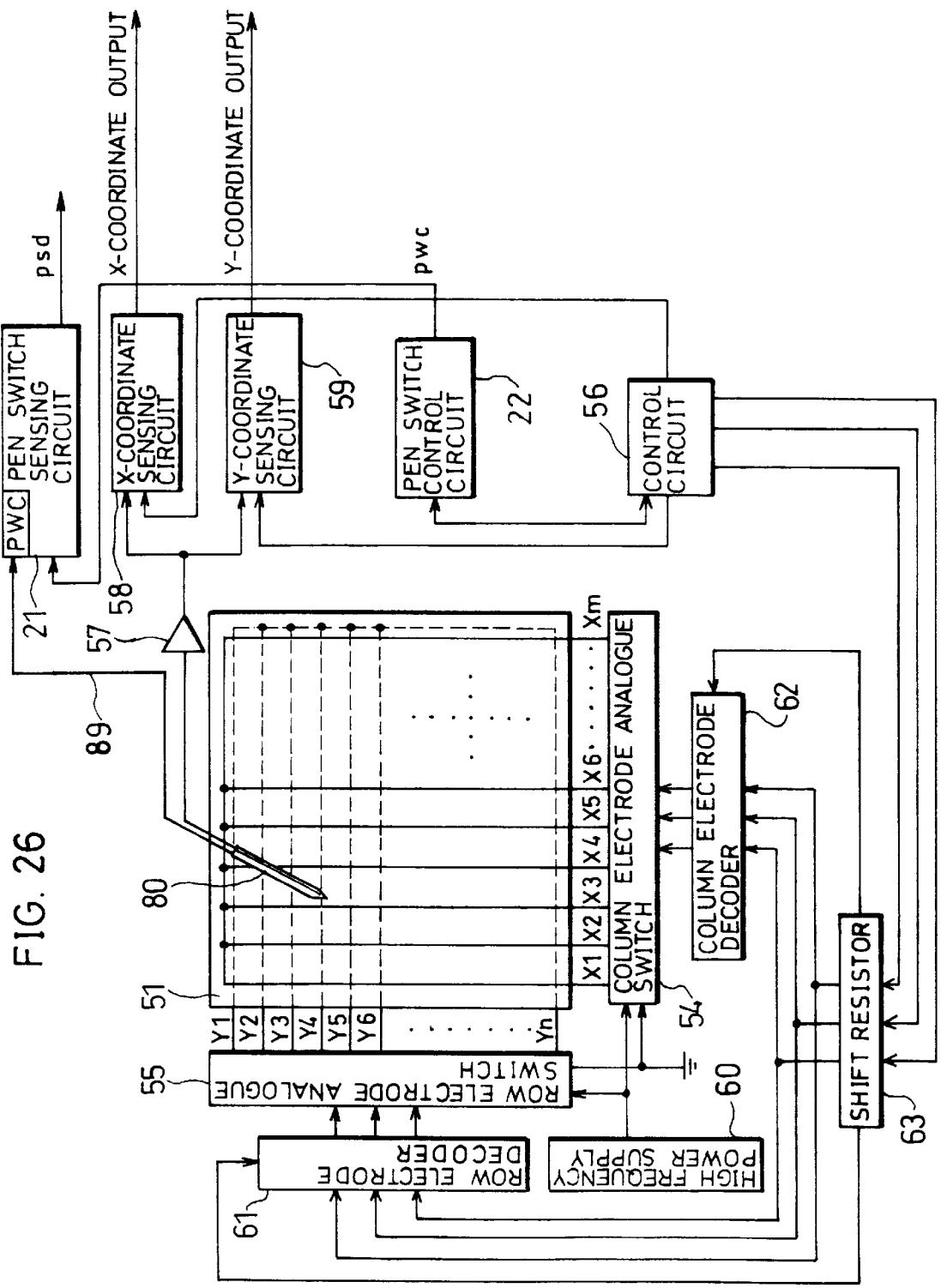
FIG. 26 is a block diagram showing an arrangement of a coordinate input device of an electromagnetic induction type of a third embodiment in accordance with the present invention.

Note also that in the present embodiment, since the pen switch is composed of a photocoupler, the light emitting element may be arranged to be provided with power supply only during the pen switch sensing period PT1 in the same manner as the first embodiment. FIG. 21 shows such an arrangement. Note also that the pen switch sensing circuit 1 may incorporate the function of an element power supply circuit 10. In these cases, the pen switch control signal pwc from the control circuit 37' may control the element power supply circuit 10 and the pen switch sensing circuit 1 (see FIG. 22), and the pen switch sensing circuit 1' (see FIG. 23) in the same manner as the first embodiment. It is thus possible to reduce the number of components and to cut the costs in the same manner as in the first embodiment. Moreover, the pen switch sensing circuits 1 and 1' may be controlled by the display and sensing switching control signal dsp instead of the pen switch control signal pwc (see FIGS. 24 and 25). In these cases, the effects of the present invention are achieved by only adding either the element power supply circuit 10 and the pen switch sensing circuit 1, or the pen switch sensing circuit 1' to the conventional display-integrated tablet with no change in the arrangement of the control circuit 37.

[THIRD EMBODIMENT]

Referring to FIGS. 26 through 32, the following description will discuss another embodiment of a coordinate input device of an electromagnetic induction type in accordance with the present invention. Here, for convenience, members of the present embodiment that have the same arrangement and function as members of the previous embodiments, and that are mentioned in the previous embodiments are indicated by the same reference numerals and description thereof is omitted.

A coordinate input device of the present embodiment includes a coordinate input area (panel) 51. The coordinate input area 51, provided under a liquid crystal display (not shown), is composed of a substrate. The substrate has electrodes X, or namely, X1, X2, . . . and Xm on the front side thereof; and electrodes Y, or namely, Y1, Y2, . . . and Yn on the back side thereof.

The coordinate input device further includes a position sensing pen (hereafter, will be referred to simply as a sensing pen) 80, a column electrode analogue switch 54, a row electrode analogue switch 55, a control circuit 56, an amplifier 57, an X-coordinate sensing circuit 58, a Y-coordinate sensing circuit 59, a high-frequency power source 60, a row electrode decoder 61, a column electrode decoder 62, a shift register 63, a pen switch sensing circuit 21 and a pen switch control circuit 22.

Each one of the electrodes X is connected, at one of the ends thereof, to the column electrode analogue switch 54 and at the other end thereof, to the other electrodes X. Any two of the electrodes X (e.g., the electrodes X1 and X2) thus form a loop, which, hereafter, will be referred to as a scanning electrode loop X. One of the two electrodes forming the scanning electrode loop X (e.g., the electrode X1) is connected through the column electrode analogue switch 54 to the high-frequency power source 60, and the other electrode (e.g., the electrode X2) is grounded.

Similarly, each one of the electrodes Y is connected, at one of the ends thereof, to the row electrode analogue switch 55 and at the other end thereof, to the other electrodes Y. Any two of the electrodes Y (e.g., the electrodes Y1 and Y2) thus form a loop, which, hereafter, will be referred to as a scanning electrode loop Y. One of the two electrodes forming the scanning electrode loop Y (e.g., the electrode Y1) is connected through the row electrode analogue switch 55 to the high-frequency power source 60, and the other electrode (e.g., the electrode Y2) is grounded.

The analogue switch 54 is connected to the shift register 63 through the column electrode decoder 62. The analogue switch 55 is connected to the shift register 63 through the row electrode decoder 61. The shift register 63 is connected to the control circuit 56.

Meanwhile, the sensing pen 80 is connected to the amplifier 57, and to a terminal PWC of the pen switch sensing circuit 21 through a switch signal line 89. The amplifier 57 is connected to the X- and Y-coordinate sensing circuits 58 and 59. The pen switch sensing circuit 22, connected to the other terminal (i.e., the non-PWC terminal) of the pen switch sensing circuit 21, controls the pen switch sensing circuit 21 through a pen switch sensing signal pwc. The pen switch sensing circuit 21 outputs a pen switch signal psd in accordance with a voltage signal from a pen switch 83 (see FIG. 30) and the pen switch control signal pwc.

The control circuit 56 is connected to the X- and Y-coordinate sensing circuits 58 and 59, and the pen switch control circuit 22. The control circuit 56 sends a shift clock signal and a latch clock signal to the shift register 63. The column and row electrode decoders 62 and 61 then scan each electrode by sending selecting signals to the analogue switches 54 and 55 in accordance with the shift clock and latch clock signals.

As mentioned earlier, the analogue switches 54 and 55 are connected to the ground and the high-frequency power source 60. The analogue switches 54 and 55 select respectively two of the electrodes X1, X2, . . . and Xm; and two of the electrodes Y1, Y2, . . . and Yn sequentially either in these orders or in the reverse orders. The selected scanning electrode loops X and Y receive high-frequency signals and thus generate AC (alternating current) magnetic fields. The electrodes X and Y are thus scanned through the magnetic fields.

Figure 27:
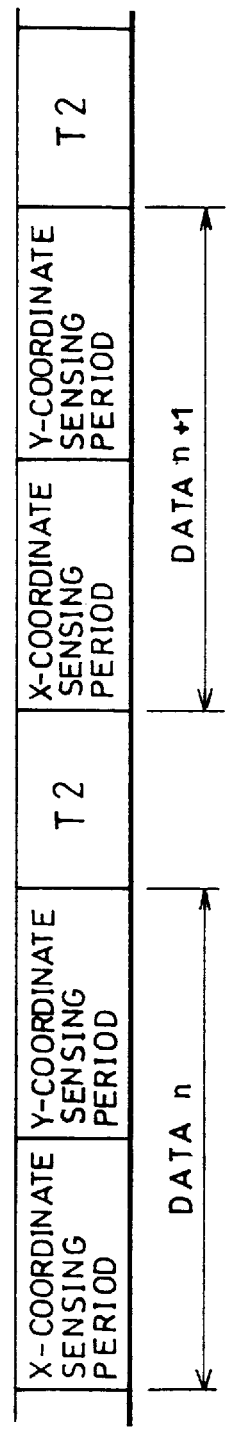
FIG. 27 is an explanatory drawing showing a relation between coordinate sensing periods and pen switch sensing periods of the coordinate input device shown in FIG. 26.

A feature of the present embodiment is that the pen switch sensing circuit 21 and the pen switch control circuit 22 are provided to carry out the pen switch sensing operations in any desirable period. To be more specific, a pen switch sensing period T2 is provided after the coordinate sensing periods. For example, as shown in FIG. 27, the pen switch sensing period T2 is provided after the X- and Y-coordinates of the data n are sensed. The pen switch sensing period T2 is again provided after the X- and Y-coordinates of the data n+1 are sensed.

With the above arrangement, as the sensing pen 80 moves close to the coordinate input area 51, a voltage is induced to a sensing coil 82 (see FIG. 30) of the sensing pen 80 by the AC magnetic fields generated along the scanning electrode loops X and Y. The voltage induced to the sensing pen 80 is amplified by the amplifier 57 and inputted to the X-coordinate sensing circuit 58 and the Y-coordinate sensing circuit 59. The X- and Y-coordinate sensing circuits 58 and 59 sense respectively an X-coordinate signal and a Y-coordinate signal in accordance with an output signal of the amplifier 57. The liquid crystal display (not shown) then displays the position indicated with the sensing pen 80 in accordance with the X- and Y-coordinate signals.

Figure 28:
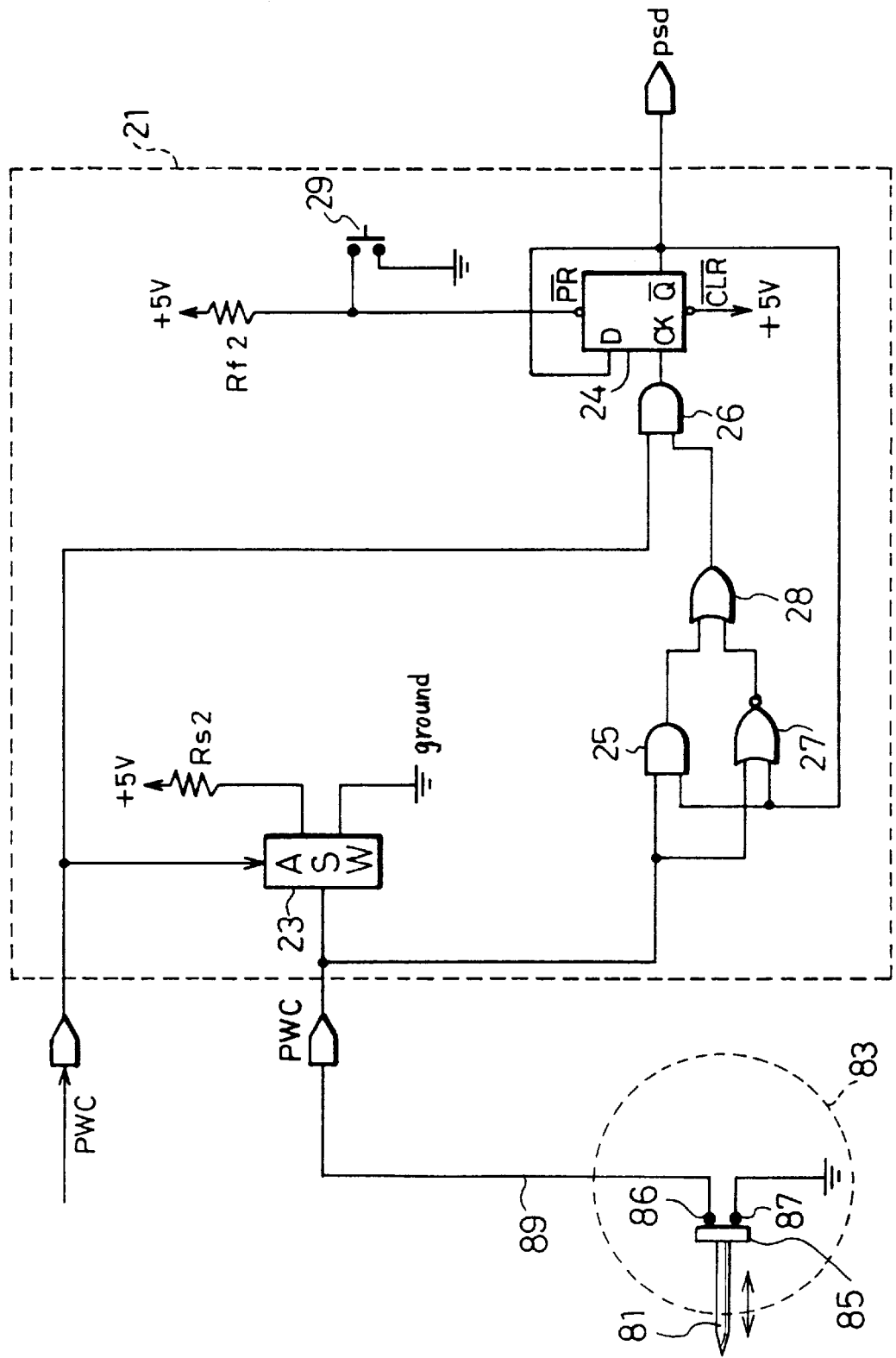
FIG. 28 is a circuit diagram showing a pen switch sensing circuit.
Figure 30:
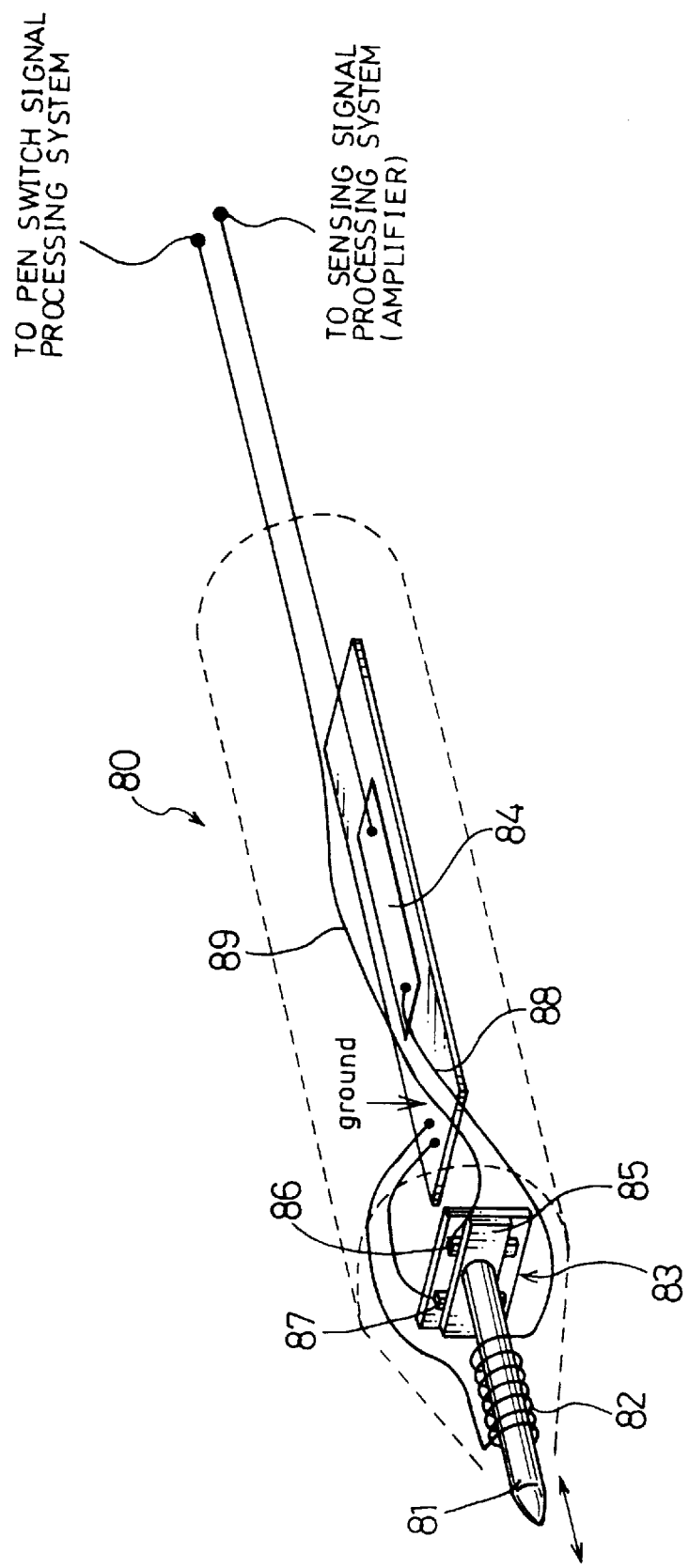
FIG. 30 is a schematic view showing an inside arrangement of a sensing pen.

Referring to FIGS. 28 and 30, the following description will discuss an inside arrangement of the sensing pen 80.

The sensing pen 80 is, mainly, composed of a pen tip 81, the sensing coil 82, the pen switch 83 and an amplifier 84.

The pen tip 81 slides in the axial direction of the sensing pen 80. The back side of the pen tip 81 inside the sensing pen 80 is connected to a conductive rubber (electric conductor) 85 of the pen switch 83. The pen switch 83 has the conductive rubber 85 and pen switch terminals 86 and 87. The pen switch terminal 86 is connected through the pen switch signal line 89 to the terminal PWC of the pen switch sensing circuit 21. The pen switch terminal 87 is grounded. The pen tip 81 is an axis for the sensing coil 82.

FIG. 28 shows an arrangement of the pen switch sensing circuit 21.

The pen switch sensing circuit 21 is composed of an analogue switch 23, a flip-flop 24, AND circuits 25 and 26, an NAND circuit 27, an OR circuit 28, a reset switch 29, resistors Rs2 and Rf2.

An input terminal of the analogue switch 23 is connected to the terminal PWC whereas one of the two output terminals is connected to the resistor Rs2 and the other output terminal is grounded. The analogue switch 23 is controlled by the pen switch control circuit 22 through the pen switch control signal pwc. If the pen switch control signal pwc is in a high-level, the terminal PWC is switched to be connected to a voltage of +5 volts through the resistor Rs2. On the other hand, if the pen switch control signal pwc is in a low-level, the terminal PWC is switched to be grounded.

The terminal PWC is connected to, as well as the analogue switch 23, one of the two input terminals of the AND circuit 25 and to one of the two input terminals of the NAND circuit 27. The other input terminals of the AND circuit 25 and of the NAND circuit 27 are connected respectively to an output terminal Bar Q of the flip-flop 24. Output terminals of the AND circuit 25 and of the NAND circuit 27 are connected to respective input terminals of the OR circuit 28.

One of the two input terminals of the AND circuit 26 is connected to an output terminal of the OR circuit 28. The other input terminal of the AND circuit 26, connected to the pen switch control circuit 22, receives the pen switch sensing signal pwc. An output terminal of the AND circuit 26 is connected to a clock input terminal CK of the flip-flop 24.

A terminal Bar PR of the flip-flop 24 is connected to one of the two terminals of the reset switch 29 and to a voltage of +5 volts through the resistor Rf2. A terminal Bar CLR is connected to a voltage of +5 volts. A data input terminal D is connected to the output terminal Bar Q. The pen switch signal psd is outputted from the output terminal Bar Q. The other terminal of the reset switch 29 is grounded. The flip-flop 24 is reset by reducing the voltage applied to the terminal Bar PR to the low-level with the reset switch 29. Under a normal operation condition, the terminal Bar PR of the flip-flop 24 is used in a high level. The pen switch circuit 21 may be any logical circuit having the functions mentioned below.

The following description will discuss in detail operations of the pen switch sensing circuit 21 having the foregoing arrangement.

The pen switch control circuit 22, interlocked with the control circuit 56, sends the pen switch control signal pwc to the pen switch sensing circuit 21. During the pen switch sensing period T2, the pen switch control signal pwc is a high-level control signal. However, during the non-T2 period, the pen switch control signal pwc is a low-level control signal.

The pen switch sensing circuit 21 connects the pen switch terminal 86 to the +5 volt voltage through the resistor Rs2 when the pen switch control signal pwc is in the high level. On the other hand, the pen switch sensing circuit 21 grounds the pen switch terminal 86 when the pen switch control signal pwc is in the low level.

Figure 29:
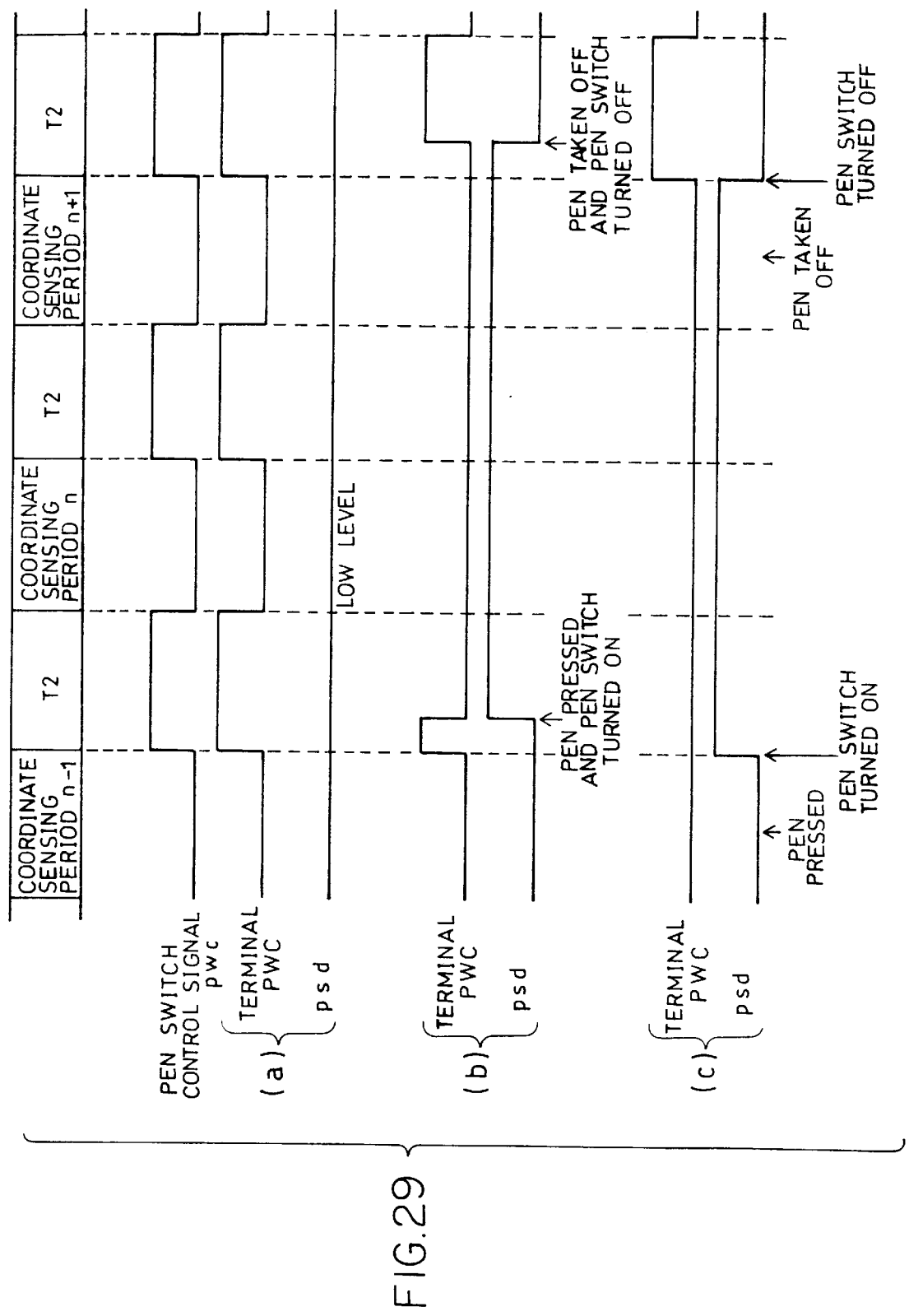
FIG. 29 is a timing chart showing pen switch sensing operations by the pen switch sensing circuit.

The timing chart in FIG. 29 shows the resulting operations of the pen switch sensing circuit 21: (a) Assume that the pen switch 83 is turned off and that the sensing pen 80 is neither pressed against nor taken off from a liquid crystal display panel (not shown). In this case, as the pen switch control signal pwc rises and drops between the high level and the low level, the voltage level of the terminal PWC also rises and drops between the high level and the low level. However, the pen switch signal psd remains low regardless of the level of the pen switch control signal pwc.

(b) Assume that the pen switch 83 is pressed against the liquid crystal display panel during the pen switch sensing period T2. In this case, only if (1) the pen switch control signal pwc is in the high level, (2) the voltage of the terminal PWC changes from the high level to the low level, and (3) the pen switch signal psd is in the low level, the pen switch signal psd rises from the low level to the high level. Therefore, the pen switch 83 is turned on. The pen switch signal psd does not change with other combinations of the high level and the low level.

Next, assume that the pen switch 73 is taken off during the pen switch sensing period T2. In this case, only if (1) the pen switch control signal pwc is in the high level, (2) the voltage of the terminal PWC changes from the low level to the high level, and (3) the pen switch signal psd is in the high level, the pen switch signal psd rises from the low level to the high level. Therefore, the pen switch 83 is turned off. The pen switch signal psd does not change with other combinations of the high level and the low level.

(c) Assume that the pen switch 73 is pressed during the coordinate sensing period. In this case, the voltage of the terminal PWC remains in the low level both before and after the pen switch control signal pwc rises from the low level to the high level, including during the pen switch sensing period T2. Therefore, the pen switch signal psd changes from the low level to the high level. Consequently, the pen switch 83 is turned on. Next, assume that the pen switch 83 is taken off during the coordinate sensing period. In this case, the pen switch signal psd remains in the high level until the coordinate sensing period is over. However, as soon as the pen switch control signal pwc rises from the low level to the high level (i.e., the pen switch sensing period T2 starts), the voltage of the terminal PWC rises from the low level to the high level. Furthermore, since the pen switch signal psd is in the high level, the pen switch signal psd drops from the high level to the low level. Therefore, the pen switch 73 is turned off.

With the foregoing arrangement, the following description will discuss in detail the pen switch sensing operations during the pen switch sensing period T2.

The pen switch terminal 86 is connected to the +5 volt voltage during the pen switch sensing period T2. If the sensing pen 80 is pressed against the liquid crystal panel surface (not shown) during the pen switch sensing period T2, the pen tip 81 slides inwards, and the conductive rubber 85 touches the pen switch terminals 86 and 87. This changes the potential of the pen switch terminal 86 from +5 volts to the ground level. Consequently, the pen switch 83 is turned on. The pen switch sensing circuit 21 thus senses through the terminal PWC that the sensing pen 80 is pressed against the surface of the liquid crystal panel, and raises the pen switch signal psd, which is to be outputted to the main body, into the high level.

Figure 45:
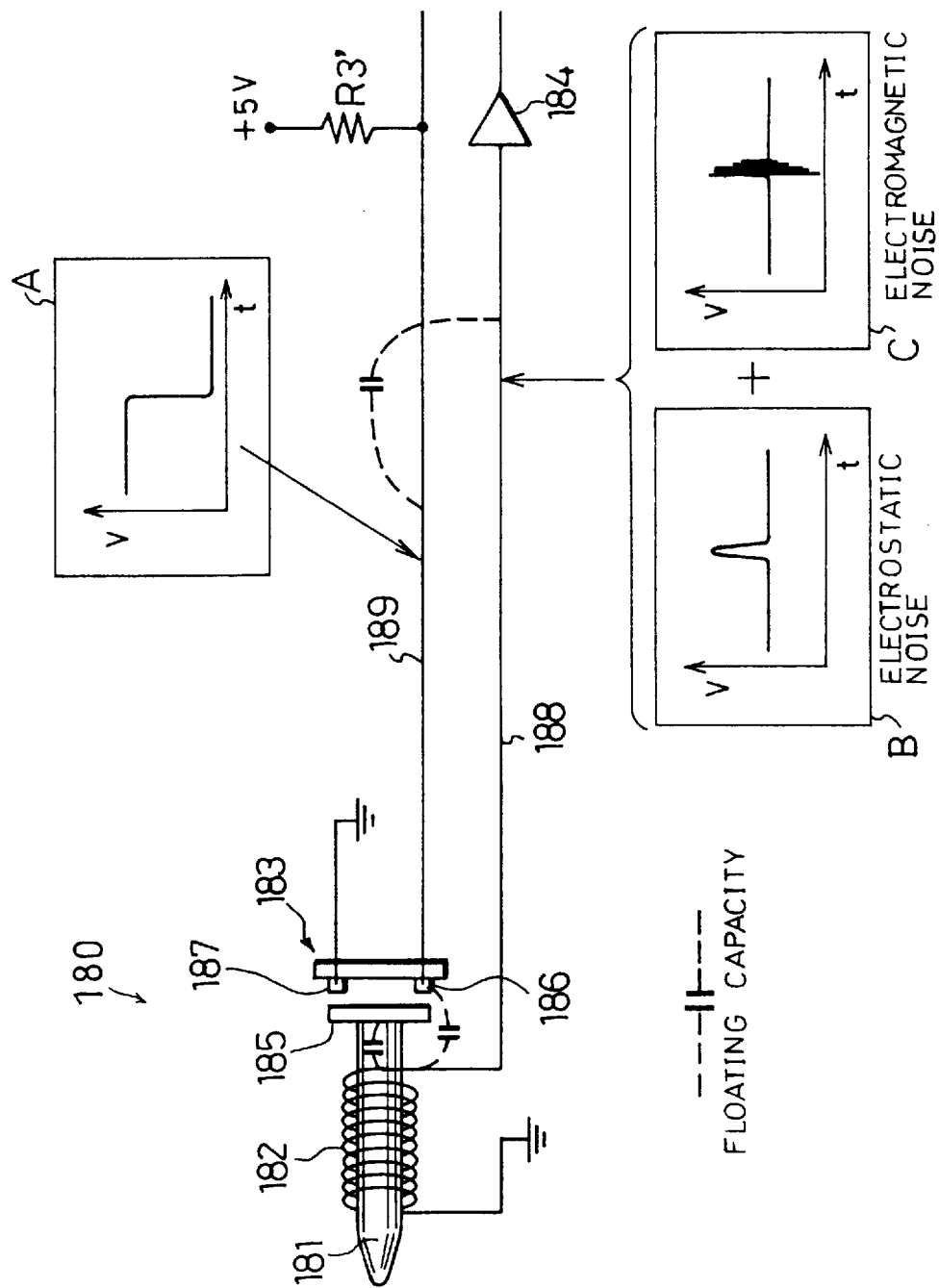
FIG. 45 is an explanatory drawing showing an arrangement of a sensing pen of the coordinate input device shown in FIG. 42.

A turning-on of the pen switch 83 causes chattering and an abrupt change in the voltage at the pen switch terminal 86 of the pen switch 83 and in the voltage of the switch signal line 89 connected to the pen switch terminal 86 in the same manner as the conventional examples. Since the sensing coil 82 and the signal line 88 are provided closely to the pen switch terminal 86 and the switch signal line 89, the same electrostatic and electromagnetic noises are induced to the sensing coil 82 and the signal line 88 as in the conventional examples (see FIG. 45 used for the description of the conventional examples).

On the other hand, if the sensing pen 80 is taken off from the liquid crystal panel during the pen switch sensing period T2, the pen tip 81 slides outwards. The conductive rubber 85 then comes off from the pen switch terminals 86 and 87. As a result, the potential of the pen switch terminal 86 changes from the ground level to +5 volts. Consequently, the pen switch 83 is turned off. The pen switch sensing circuit 21 thus senses through the terminal PWC that the sensing pen 80 is taken off from the liquid crystal panel, and drops the pen switch signal psd, which is to be outputted to the main body, into the low level.

A turning-off of the pen switch 83 causes chattering and an abrupt change in the voltage at the pen switch terminal 86 and in the voltage of the switch signal line 89 connected to the pen switch terminal 86 in the same manner as above. Since the sensing coil 82 and the signal line 88 are provided closely to the pen switch terminal 86 and the switch signal line 89, a noise signal is induced to the sensing coil 82 and the signal line 88. However, since the coordinate sensing operations are not carried out during the pen switch sensing period T2, the above noise signal is not mistakenly processed as the coordinate sensing signal, thereby not affecting the coordinate sensing operations.

Meanwhile, the pen switch terminal 86 is connected to the ground during the non-T2 period (i.e., during the coordinate sensing period). Therefore, even if the sensing pen 80 is pressed against the liquid crystal panel surface, the pen switch sensing operations are not carried out. More specifically, even if the pen tip 81 slides inwards, and the conductive rubber 85 touches the pen switch terminals 86 and 87, the potential of the pen switch terminal 86 remains at the ground level. Consequently, there is no change in the voltages of the pen switch terminal 86 and of the switch signal line 89. The sensing coil 82 and the signal line 88 therefore have no induced noise signal affecting the coordinate sensing operations. If the sensing pen 80 remains pressed against the liquid crystal panel until the next pen switch sensing period T2, the pen switch terminal 86 remains at the low level during the next pen switch sensing period T2. Consequently, it is sensed that the pen switch 83 is turned on.

On the other hand, if the sensing pen 80 is taken off from the liquid crystal panel surface during the non-T2 period (i.e., during the coordinate sensing period), the pen switch terminal 86 is grounded. Therefore, even if the the conductive rubber 85 comes off from the pen switch terminals 86 and 87, the potential of the pen switch terminal 86 remains at the ground level. Therefore, there is no change in the voltages of the pen switch terminal 86 and of the switch signal line 89. The sensing coil 82 and the signal line 88 therefore have no induced noise signal affecting the coordinate sensing operations. Consequently, it is sensed that the pen switch 83 is turned off, because the pen switch terminal 86 rises into the high level when the pen switch terminal 86 is connected to a voltage of +5 volts through the resistor Rs2 during the next pen switch sensing period T2.

It is thus possible to prevent the noise signals caused upon the turning-on and -off of the pen switch 83 from being mistakenly processed as coordinate signals. The conventional problem of the discontinuous sensed coordinates is thus eliminated.

Figure 31:
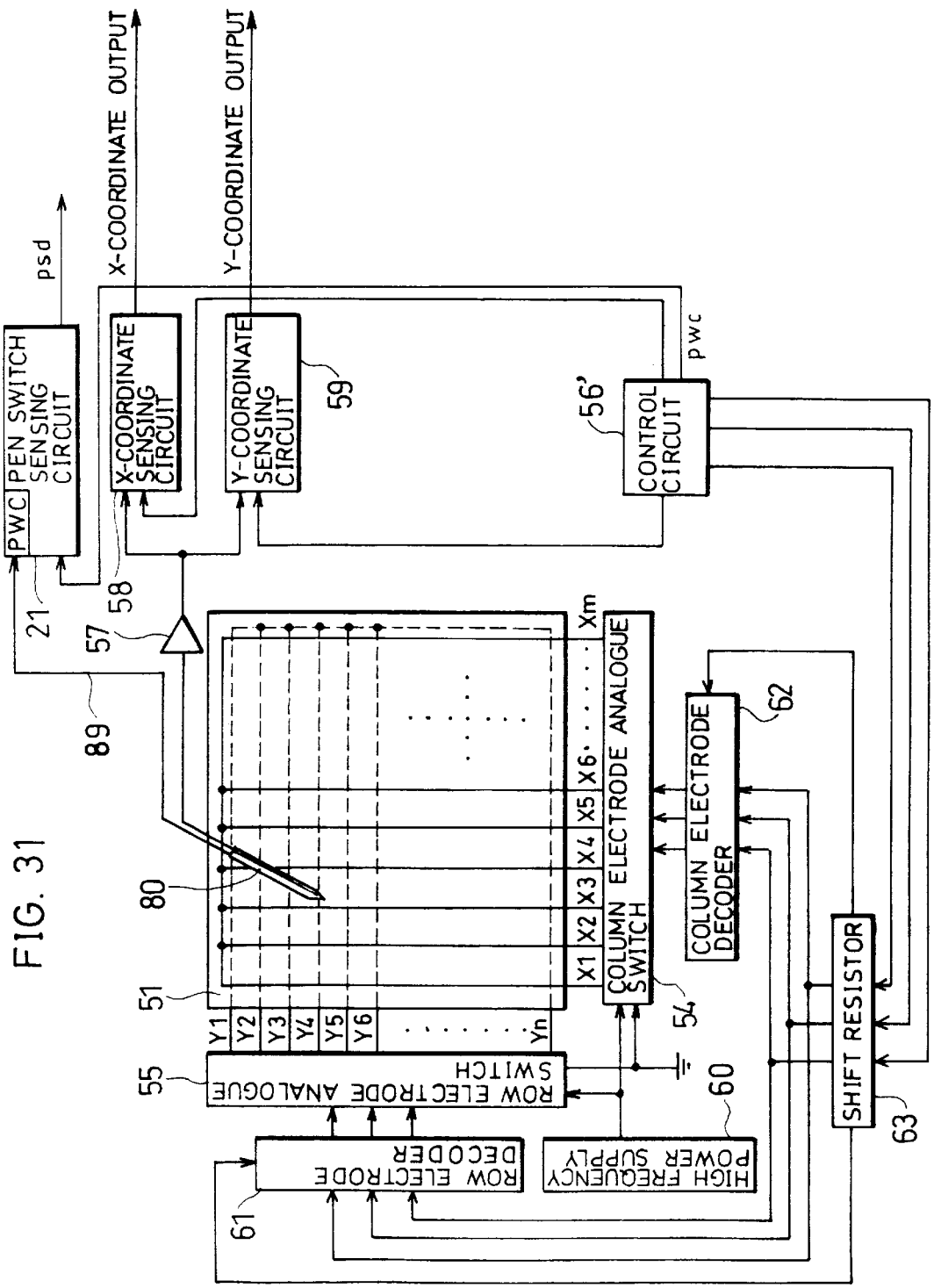
FIG. 31 is a block diagram showing another arrangement of the coordinate input device of the third embodiment.

Note that in the present embodiment, the pen switch control circuit 22 controls the pen switch sensing circuit 21. However, the control function by the pen switch control circuit 22 may be incorporated into the control circuit 56. The control circuit 56' in FIG. 31 is arranged as follows to produce the same effects as the pen switch control circuit 22. The control circuit 56', connected to the non-PWC input terminal of the pen switch sensing circuit 21, controls the pen switch sensing circuit 21 through the pen switch control signal pwc. The control circuit 56' does not need the pen switch control circuit 22, thereby reducing the number of components and cutting the costs.

Figure 44:
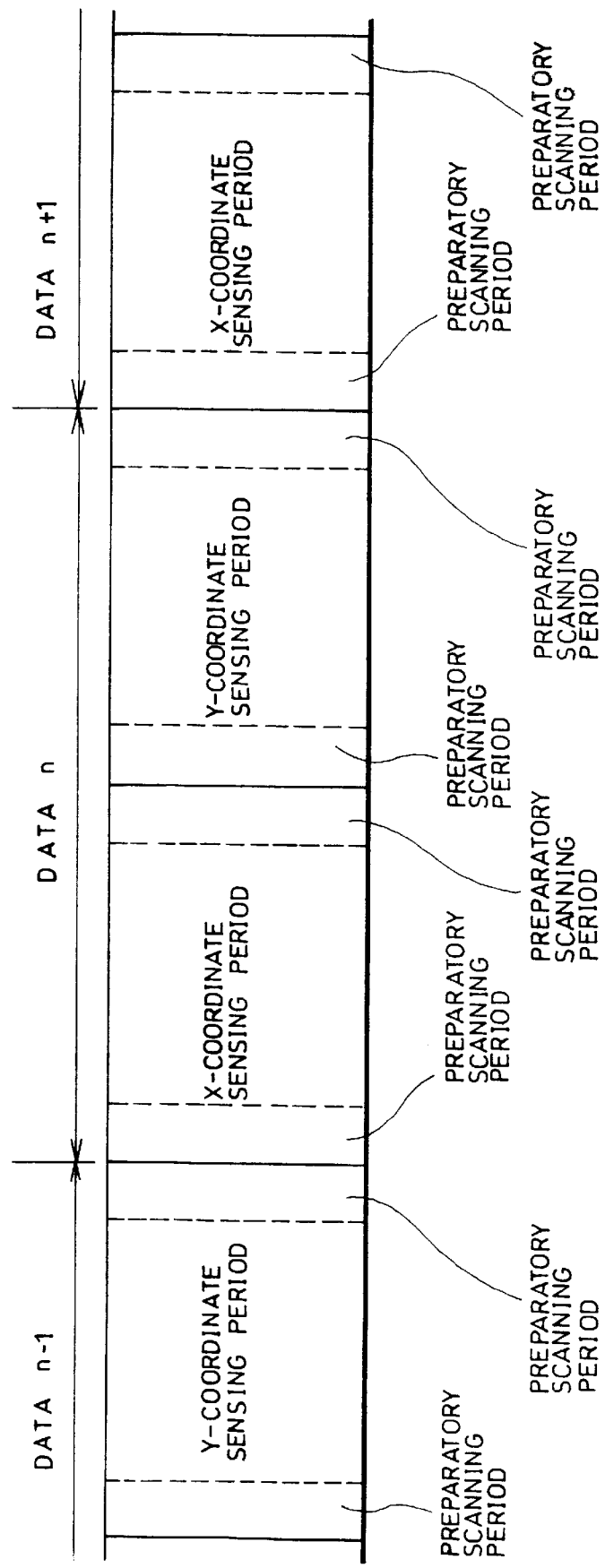
FIG. 44 is an explanatory drawing showing a relation between coordinate sensing periods and preparatory scanning periods in another arrangement of the conventional coordinate input device of an electromagnetic induction type.

Note also that in the present embodiment, the pen switch sensing operations are carried out during the pen switch sensing period T2 after the coordinate sensing period. However, if in the coordinate sensing period, there is a scanning period irrelevant to the sensing accuracy, the pen switch sensing operations may be carried out during such a scanning period. The preparatory scanning period (see FIG. 44) is irrelevant to the sensing accuracy because only the dummy electrodes are scanned during the preparatory scanning period. Therefore, the preparatory scanning period may be utilized as the pen switch sensing period.

Figure 32:
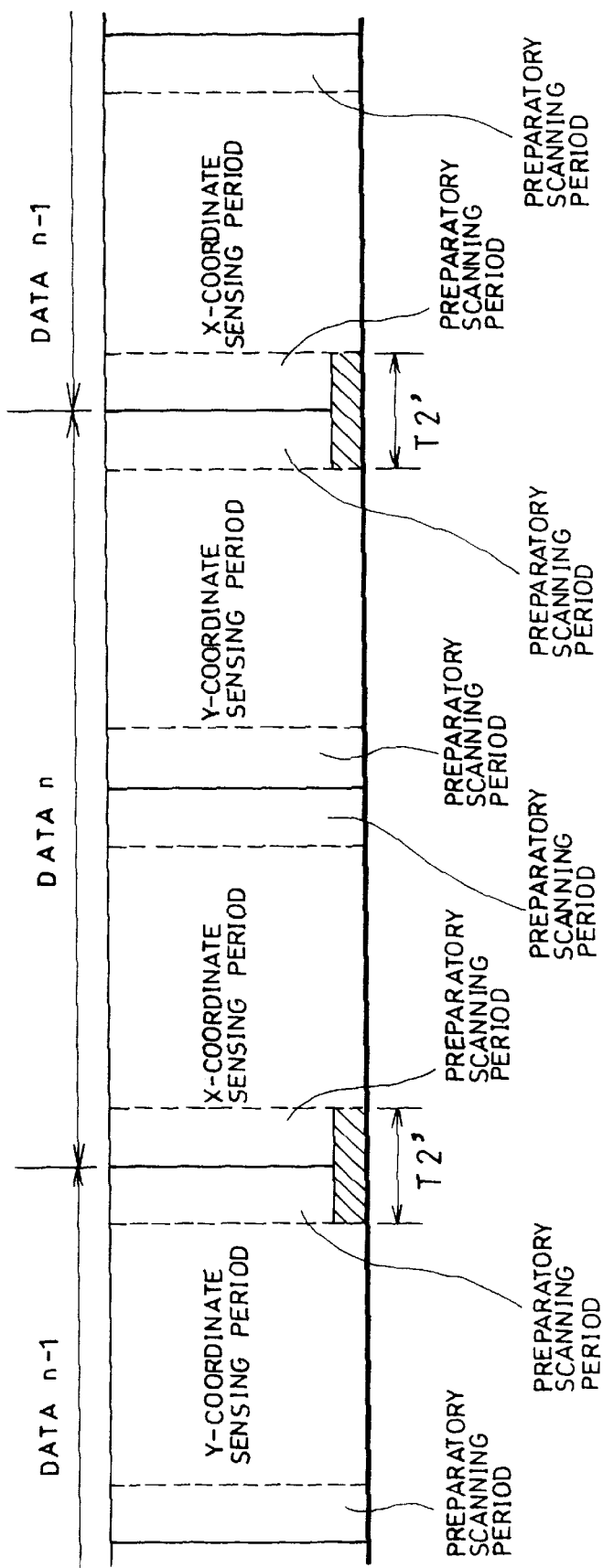
FIG. 32 is an explanatory drawing showing a relation of coordinate sensing periods and pen switch sensing periods in a further arrangement of the coordinate input device shown in FIG. 31.
Figure 33:
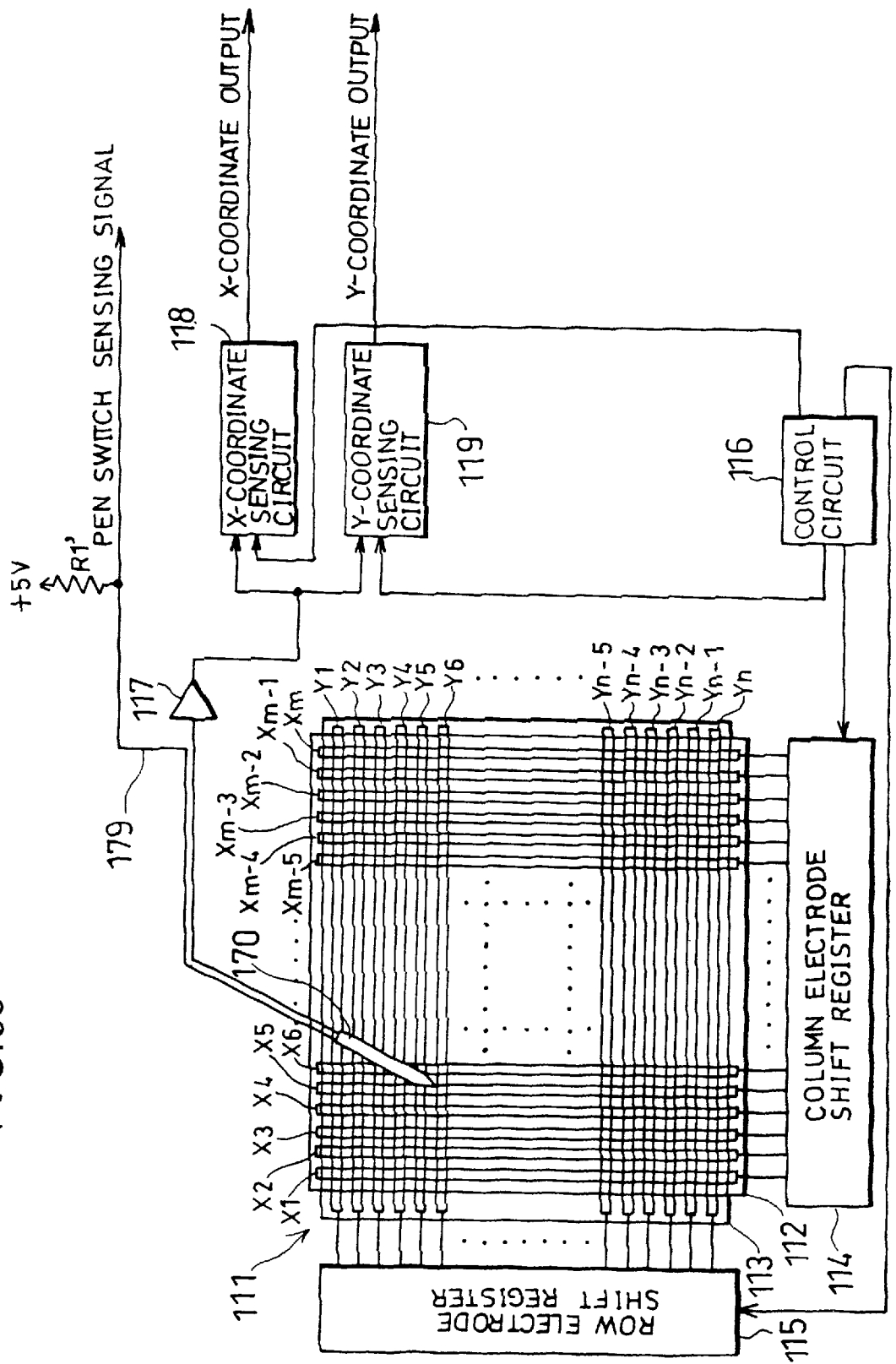
FIG. 33 is a block diagram showing an arrangement of a conventional coordinate input device of an electrostatic induction type.

For example, as shown in FIG. 32, a pen switch sensing period T2' is composed of the preparatory scanning period after the Y-coordinate sensing period of the data n−1 and the preparatory scanning period before the X-coordinate sensing period of the data n. Similarly, another pen switch sensing period T2' is composed of the preparatory scanning period after the Y-coordinate sensing period of the data n and the preparatory scanning period before the X-coordinate sensing period of the data n+1.

Note also that the arrangements of the coordinate input device of the present invention is also effective with a display-integrated tablet of a electromagnetic induction type. Such an arrangement includes the pen switch sensing period of the second embodiment and the sensing pen and the switch sensing circuit of the third embodiment.

The arrangements discussed in the previous embodiments are illustrative and not restrictive. For example, although a photocoupler has been used for the pen switch in the first and second embodiments, the pen switch may be arranged to include a conductive rubber. On the other hand, although a conductive rubber has been used for the pen switch in the third embodiment, the pen switch may be arranged to include a photocoupler. Other kinds of pen switch is also possible, such as a lead switch and a micro switch.

Note also that in the present embodiment, the turning-on and -off of the pen switch correspond respectively to the high and low levels of the pen switch signal. However, this is not the only possible correspondence. The turning-on and -off of the pen switch may be arranged to correspond respectively to the low and high levels of the pen switch signal. Such a correspondence is available, for example, when the pen switch signal is arranged to be outputted from the other terminal (the terminal Q) of the flip-flop used in the present embodiment. This arrangement easily changes the correspondence between the voltage levels of the pen switch signal and the turning-on and -off of the pen switch.

Besides, the pen switch sensing circuit and the element power supply circuit of the present embodiment are provided to the main body of the device. However, the pen sensing circuit and the element power supply circuit may be provided in the pen. Such an arrangement still achieves the same effects. The arrangements of the pen sensing circuit and the element power supply circuit in the present embodiment are illustrative and not restrictive.

Note also that the coordinate input device of the present embodiment may be incorporated in a coordinate input panel of an electrostatic induction type and of an electromagnetic type adopting a method other than the methods discussed in the present embodiment, and still achieves the same effects. An example of such a coordinate input panel of an electrostatic induction type senses coordinates by utilizing an output level change due to a resistance change of an electrode and a phase change of a detected signal depending on the indicated place. Another example senses coordinates by utilizing electrodes X and Y simultaneously. An example of such a coordinate input panel of an electromagnetic induction type, apart from the one in the present embodiment forming an electrode loop from adjacent electrodes, forms an electrode loop from alternate electrodes. Another example forms a double loop from four electrodes. A further example senses coordinates by interaction of three members (i.e., a sensing pen, an electrode loop X and an electrode loop Y). Even another example, provided with electrodes X and Y diagonally, not orthogonally, crossing with each other at a predetermined angle, senses coordinates with a phase change of a detected signal.

Furthermore, although a liquid crystal panel of duty type has been used for the display panel in the second embodiment, it is also possible to use other kinds of display device, such as a TFT liquid crystal panel, a plasma display and an EL panel. Such a device still achieves the same effects through arrangement in accordance with the present invention.

The invention being thus described, it will be obvious that the same may be varied in many ways. Such variations are not to be regarded as a departure from the spirit and scope of the invention, and all such modifications as would be obvious to one skilled in the art intended to be include within the scope of the following claims.

What is claimed is:

1. A coordinate input device, comprising:
   a panel having a coordinate input area;
   indicating means for indicating a point on said panel;
   coordinate sensing means for sending coordinates of the point indicated by said indicating means;
   switch means disposed in said indicating means and switched; when provided with an operational power supply, depending on whether or not said indicating means is pressed against said panel;
   switch condition sensing means for providing said switch means with said operational power supply, and for sensing whether said switch means is in an 'ON' state or in an 'OFF' state; and
   switch control means, connected to said switch condition sensing means, for controlling said switch condition sensing means, so that said switch condition sensing means senses whether said switch means is in the 'ON' state or in the 'OFF' state, by providing the operational power supply to said switch means only during the switch sensing period that is irrelevant to the accuracy in sensing by said coordinate sensing means.

2. The coordinate input device as defined in claim 1, wherein said switch condition sensing means includes:
   selecting means for selecting, in accordance with a control signal from said switch control means, whether said switch means is grounded or provided with the operational power supply; and
   means for outputting a first signal when said indicating means touches said panel during the switch sensing period, during which said switch means is provided with the operational power supply, for outputting a second signal when said indicating means is taken off from said panel during the switch sensing period, during which said switch means is provided with the operational power supply, for outputting, when said indicating means has been touched since a non-switch sensing period during which said switch means is grounded, the first signal as soon as the switch sensing period starts, and for outputting, when said indicating means is taken off during the non-switch sensing period during which said switch means is grounded, the second signal as soon as the switch sensing period starts.

3. The coordinate input device as defined in claim 1, wherein said switch means includes:
   a light emitting element;
   a photo sensor for receiving light emitted by said light emitting element when said indicating means is away from said panel; and
   blocking means for blocking the light emitted by said light emitting element toward said photo sensor when said indicating means touches said panel, said switch condition sensing means providing said photo sensor with the operational power supply.

4. The coordinate input device as defined in claim 3, further comprising:
   element power supply means for providing said light emitting element with an operational power supply only during the switch sensing period.

5. The coordinate input device as defined in claim 4, wherein said element power supply means includes:
   selecting means for selecting, in accordance with a control signal from said switch control means, whether said light emitting element is grounded or provided with the operational power supply.

6. The coordinate input device as defined in claim 3, wherein said switch condition sensing means provides said light emitting element with an operational power supply only during the switch sensing period.

7. The coordinate input device as defined in claim 6, wherein said switch condition sensing means includes:
   selecting means for selecting, in accordance with a control signal from said switch control means, whether said light emitting element is grounded or provided with the operational power supply.

8. A coordinate input device, comprising:
   a panel having a coordinate input area;
   indicating means for indicating a point on said panel;
   coordinate sensing means for sensing coordinates of the point indicated by said indicating means;
   switch means, disposed in said indicating means and which is switched, when provided with an operational power supply, depending on whether or not said indicating means is pressed against said panel;
   switch condition sensing means for providing said switch means with said operational power supply, and for sensing whether said switch means is in an 'ON' state or in an 'OFF' state; and
   switch control means, connected to said coordinate sensing means and said switch condition sensing means, for controlling a coordinate sensing period during which said coordinate sensing means senses the coordinates, and for controlling said switch condition sensing means so that said switch condition sensing means senses whether said switch means is in the 'ON' state or in the 'OFF' state, by providing the operational power supply to said switch means only during the switch sensing period that is irrelevant to the accuracy in sensing by said coordinate sensing means.

9. The coordinate input device as defined in claim 8, wherein said control means controls the switch sensing period in accordance with a coordinate sensing period control signal for controlling the coordinate sensing period, and controls said switch condition sensing means through the coordinate sensing period control signal.

10. The coordinate input device as defined in claim 1, wherein said panel includes a preparatory scanning area, provided around the coordinate input area, for compensating for irregularity in coordinate sensing around the coordinate input area, and the switch sensing period is provided within a preparatory scanning period during which the preparatory scanning area is scanned.

11. The coordinate input device as defined in claim 1, wherein said panel includes:
   a first group of electrodes for sensing a first coordinate; and
   a second group of electrodes for sensing a second coordinate, each electrode of said second group of electrodes being insulated from each electrode of said first group of electrodes, and
   an electrostatically-induced voltage being induced to said indicating means by applying scanning voltages to the said first or second group of electrodes, said indicating means having a sensing electrode on a tip thereof and being electrostatically connected to said first and second groups of electrodes.

12. The coordinate input device as defined in claim 1, wherein said panel displays an image,
   said device, further comprising:
      switching means for switching, according to a time sharing method, said panel between an image display operation and a coordinate sensing operation,
      the switch sensing period being provided within a display period during which the image is displayed.

13. The coordinate input device as defined in claim 12, further comprising:
   control means, connected to said coordinate sensing means and said switching means, for outputting a control signal for controlling a timing at which said coordinate sensing means senses the coordinates, and for outputting a switching control signal for controlling a timing at which said switching means switches said panel between the image display operation and the coordinate sensing operation, wherein said control means controls said switch condition sensing means in accordance with the switching control signal.

14. The coordinate input device as defined in claim 1, wherein said switch means includes:
   a conductive substance; and
   terminals provided to be away from said conductive substance when said indicating means is away from said panel, and to touch said conductive substance when said indicating means touches said panel,
   said switch condition sensing means providing said terminals with the operational power supply.

15. The coordinate input device as defined in claim 1, wherein said panel includes:
   a first group of electrodes for sensing a first coordinate, a plurality of electrodes of said first group providing an electrode loop; and
   a second group of electrodes for sensing a second coordinate, a plurality of electrodes of said second group providing an electrode loop, each electrode of said second group being insulated from each electrode of said first group, and
   an electromagnetically-induced voltage being induced to said indicating means by generating a magnetic field in any of said electrode loops, said indicating means having a sensing electrode on a tip thereof and being electromagnetically connected to said first and second groups of electrodes.

* * * * *